United States Patent
Anasis et al.

(10) Patent No.: US 9,581,185 B2
(45) Date of Patent: Feb. 28, 2017

(54) BLIND FASTENER

(71) Applicant: PRECISION TOWER PRODUCTS, LLC, Delaware, OH (US)

(72) Inventors: George M. Anasis, Lewis Center, OH (US); David W. Hawkins, Columbus, OH (US)

(73) Assignee: PRECISION TOWER PRODUCTS, LLC, Delaware, OH (US)

( * ) Notice: Subject to any disclaimer, the term of this patent is extended or adjusted under 35 U.S.C. 154(b) by 81 days.

(21) Appl. No.: 14/622,023

(22) Filed: Feb. 13, 2015

(65) Prior Publication Data
US 2016/0053799 A1    Feb. 25, 2016

Related U.S. Application Data

(60) Provisional application No. 62/039,939, filed on Aug. 21, 2014.

(51) Int. Cl.
| | |
|---|---|
| *F16B 13/06* | (2006.01) |
| *F16B 29/00* | (2006.01) |
| *F16B 13/08* | (2006.01) |
| *F16B 37/14* | (2006.01) |
| *F16B 43/00* | (2006.01) |

(52) U.S. Cl.
CPC .......... *F16B 29/00* (2013.01); *F16B 13/0858* (2013.01); *F16B 37/14* (2013.01); *F16B 43/002* (2013.01)

(58) Field of Classification Search
CPC ......... F16B 13/066; F16B 29/00; F16B 13/06
USPC ....................................................... 411/60.1
See application file for complete search history.

(56) References Cited

U.S. PATENT DOCUMENTS

| | | |
|---|---|---|
| 127,934 A | 6/1872 | Stone |
| 462,601 A | 11/1891 | Thinnes |
| 976,096 A | 11/1910 | Pansch |
| 1,075,759 A | 10/1913 | Burridge |
| 1,158,633 A | 11/1915 | Carpenter |
| 1,340,470 A | 5/1920 | Whitmore |

(Continued)

OTHER PUBLICATIONS

International Search Report and Written Opinion of the International Searching Authority for International Application No. PCT/US2015/043711, Mailed Oct. 23, 2015, nine pages.

(Continued)

*Primary Examiner* — Roberta Delisle
(74) *Attorney, Agent, or Firm* — Gallagher & Dawsey Co. LPA; David J. Dawsey; Michael J. Gallagher

(57) ABSTRACT

A blind fastener device for fastening at least two workpieces, including a sleeve, an expander having a tensioning section, a locking section, and an expansion section, and a nut. A portion of the expander passes through the sleeve to cooperate with the nut so that relative rotation of the expander and nut draws the expander's distal end toward the sleeve's proximal end thereby drawing a portion of the expansion section of the expander into a structural region located on the sleeve and expanding at least a portion of the sleeve's structural region, and drawing a portion of the locking section past the sleeve's distal end toward the sleeve's proximal end and deforming at least a portion of the sleeve's distal end to a locked state. The sleeve may be configured as a multi-section sleeve having a sleeve retainer to locate the sections in a predetermined relationship.

20 Claims, 36 Drawing Sheets

(56) References Cited

U.S. PATENT DOCUMENTS

| | | | |
|---|---|---|---|
| 1,346,578 A | 7/1920 | Windsor | |
| 1,404,914 A | 1/1922 | Winkle | |
| 1,410,042 A | 3/1922 | Watt | |
| 1,469,667 A | 10/1923 | Pleister | |
| 1,516,347 A | 11/1924 | Pataky | |
| 1,621,598 A | 3/1927 | Phillips | |
| 1,808,318 A | 6/1931 | Pleister | |
| 2,296,470 A | 11/1942 | Keehn | |
| 2,319,376 A | 5/1943 | Wallace | |
| 2,365,372 A | 12/1944 | Allen | |
| 2,435,876 A | 2/1948 | Swart | |
| 2,469,349 A | 5/1949 | Zeidler | |
| 2,570,003 A | 10/1951 | Palmer | |
| 2,578,515 A | 12/1951 | Crafton | |
| 2,632,354 A | 3/1953 | Black | |
| 2,765,699 A | 10/1956 | Torre | |
| 2,875,674 A | 3/1959 | Devine | |
| 3,082,657 A | 3/1963 | Fischer | |
| 3,171,322 A * | 3/1965 | Kaplan | F16B 13/065 411/60.1 |
| 3,202,034 A | 8/1965 | Korenchan | |
| 3,213,744 A | 10/1965 | Wagner | |
| 3,267,793 A | 8/1966 | Devine | |
| 3,279,303 A | 10/1966 | Shackelford et al. | |
| 3,285,121 A | 11/1966 | Siebol | |
| 3,460,429 A | 8/1969 | Torre | |
| 3,468,091 A | 9/1969 | Gerhard | |
| 3,515,028 A | 6/1970 | Patton | |
| 3,667,341 A * | 6/1972 | Kaplan | F16B 13/065 411/60.1 |
| 3,702,088 A | 11/1972 | Schmitt | |
| 3,861,268 A | 1/1975 | Jaggers | |
| 4,100,834 A * | 7/1978 | Harris | F16B 13/065 148/648 |
| 4,203,346 A | 5/1980 | Hall et al. | |
| 4,287,807 A | 9/1981 | Pacharis et al. | |
| 4,407,619 A | 10/1983 | Siebol | |
| 4,516,378 A | 5/1985 | Fischer | |
| 4,519,735 A * | 5/1985 | Machtle | F16B 13/066 405/259.3 |
| 4,537,541 A | 8/1985 | Giannuzzi | |
| 4,688,977 A * | 8/1987 | Seetaram | F16B 13/066 411/45 |
| 4,702,654 A | 10/1987 | Frischmann et al. | |
| 4,752,169 A | 6/1988 | Pratt | |
| 5,141,373 A | 8/1992 | Kendall | |
| 5,176,481 A | 1/1993 | Schiefer | |
| 5,178,502 A | 1/1993 | Sadri | |
| 5,215,418 A | 6/1993 | Trainer et al. | |
| 5,288,190 A * | 2/1994 | Winkeljann | F16B 13/00 411/55 |
| 5,383,753 A | 1/1995 | Palm | |
| 5,464,311 A | 11/1995 | Hiraguri et al. | |
| 5,544,992 A | 8/1996 | Ciobanu et al. | |
| 5,603,592 A | 2/1997 | Sadri et al. | |
| 5,651,649 A | 7/1997 | Sadri et al. | |
| 5,685,663 A | 11/1997 | Sadri | |
| 5,707,190 A | 1/1998 | Hiraguri et al. | |
| 5,716,177 A | 2/1998 | Schaffer | |
| 5,810,530 A | 9/1998 | Travis | |
| 5,865,581 A | 2/1999 | Sadri et al. | |
| 5,941,668 A | 8/1999 | Kaibach et al. | |
| 5,957,641 A | 9/1999 | Bogatz et al. | |
| 6,027,292 A | 2/2000 | Raber | |
| 6,065,918 A | 5/2000 | Adams | |
| 6,077,012 A | 6/2000 | Granese et al. | |
| 6,095,733 A | 8/2000 | Busby et al. | |
| 6,149,363 A | 11/2000 | March | |
| 6,233,802 B1 | 5/2001 | Fulbright | |
| 6,234,734 B1 | 5/2001 | Klippel | |
| 6,241,443 B1 | 6/2001 | Harbin et al. | |
| 6,247,883 B1 | 6/2001 | Monserratt | |
| 6,270,303 B1 | 8/2001 | Gauthier et al. | |
| 6,293,743 B1 | 9/2001 | Ernst et al. | |
| 6,325,582 B1 | 12/2001 | Sadri et al. | |
| 6,524,045 B2 | 2/2003 | Pourtier | |
| 6,551,040 B1 | 4/2003 | Terry et al. | |
| 6,702,684 B2 | 3/2004 | Harbin et al. | |
| 6,827,535 B2 | 12/2004 | Fuchs et al. | |
| 6,868,757 B2 | 3/2005 | Hufnagl et al. | |
| 6,874,985 B2 | 4/2005 | Hein et al. | |
| 6,942,439 B2 | 9/2005 | Rouger | |
| 7,025,550 B2 | 4/2006 | Monserratt et al. | |
| 7,033,120 B2 | 4/2006 | Hufnagl et al. | |
| 7,150,595 B2 | 12/2006 | Liebig et al. | |
| 7,195,438 B2 | 3/2007 | Harbin et al. | |
| 7,293,339 B2 | 11/2007 | Mercer et al. | |
| 7,308,842 B2 | 12/2007 | Hufnagl et al. | |
| 7,357,613 B2 | 4/2008 | Houck et al. | |
| 7,857,564 B2 * | 12/2010 | Wieser | F16B 13/065 411/354 |
| 7,891,924 B2 | 2/2011 | Mercer et al. | |
| 7,896,598 B2 | 3/2011 | Mercer et al. | |
| 7,921,530 B2 | 4/2011 | Mercer et al. | |
| 8,192,122 B2 * | 6/2012 | Gaudron | F16B 13/066 411/32 |
| 8,444,355 B2 | 5/2013 | Gaudron et al. | |
| 8,784,024 B2 | 7/2014 | Lison et al. | |
| 2002/0054805 A1 * | 5/2002 | Kaibach | F16B 13/065 411/60.1 |
| 2003/0108398 A1 * | 6/2003 | Sathianathan | F16B 5/065 411/60.1 |
| 2003/0123948 A1 * | 7/2003 | Fuchs | F16B 1/0071 411/60.1 |
| 2005/0281633 A1 | 12/2005 | Mercer | |
| 2006/0090321 A1 | 5/2006 | Haines, Jr. | |
| 2006/0182514 A1 | 8/2006 | Ito | |
| 2006/0219649 A1 | 10/2006 | Wolfford, Sr. | |
| 2007/0098518 A1 | 5/2007 | Rosenkranz | |
| 2011/0047770 A1 | 3/2011 | Mercer et al. | |
| 2011/0057398 A1 | 3/2011 | Mercer et al. | |

OTHER PUBLICATIONS

Lindapter International, Hollow-Bolt® by Lindapter® catalog, published at least as early as Dec. 31, 2012, United States.
Alcoa Fastening Systems, Huck Born® catalog, published at least as early as May 22, 2013, United States.
LNA Solutions—A Kee Safey Company, Steel Connection Solutions catalog, Box Bolt® product information, pp. 6-11, published at least as early as Dec. 31, 2012, United States.
All Fasteners, Tower Products Catalog—Edition 2, published at least as early as Jul. 31, 2013, United States.

* cited by examiner

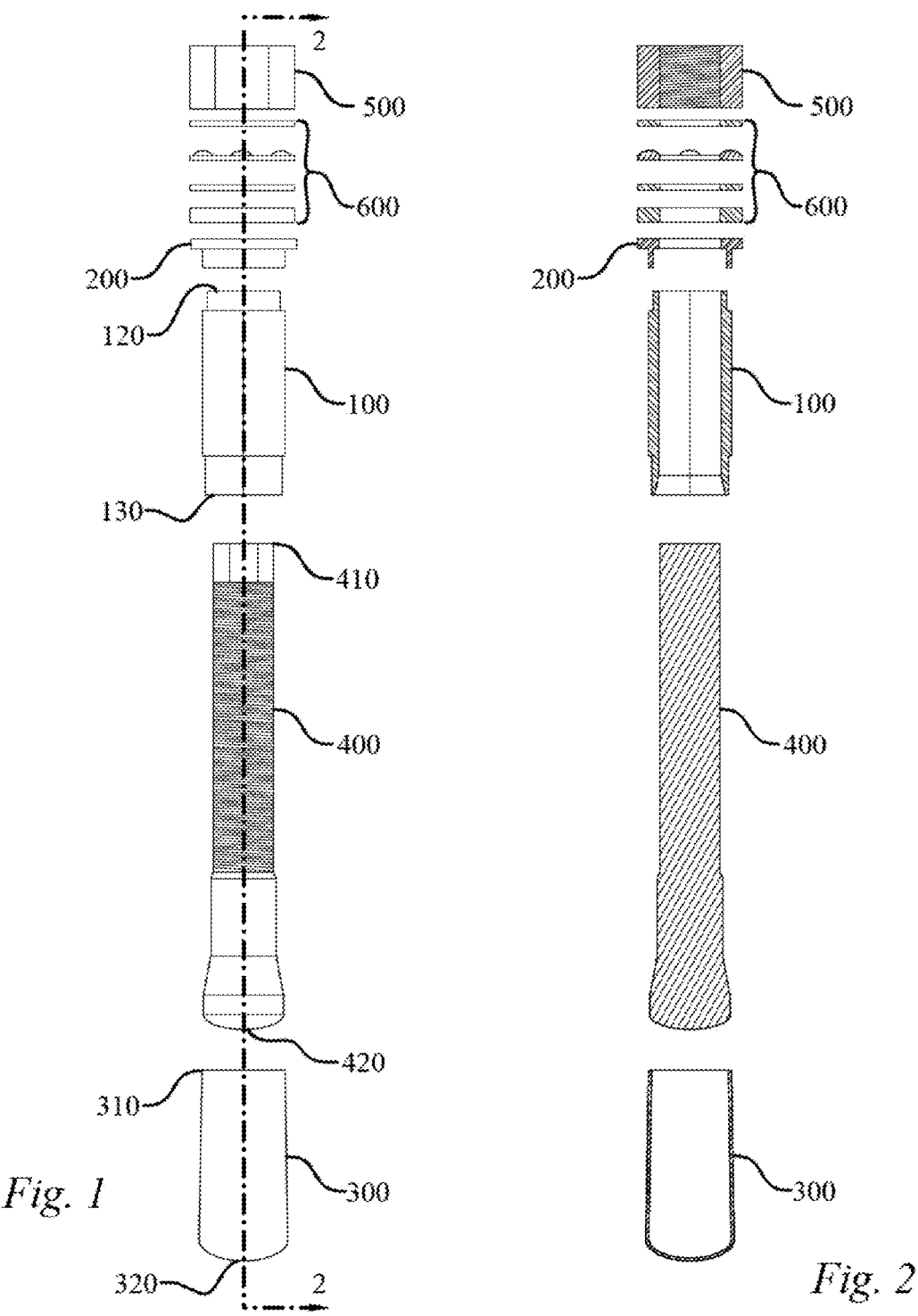

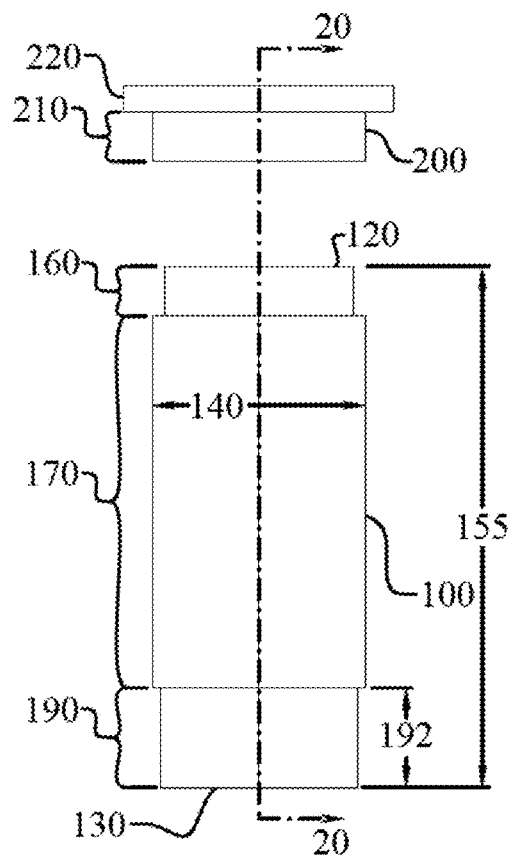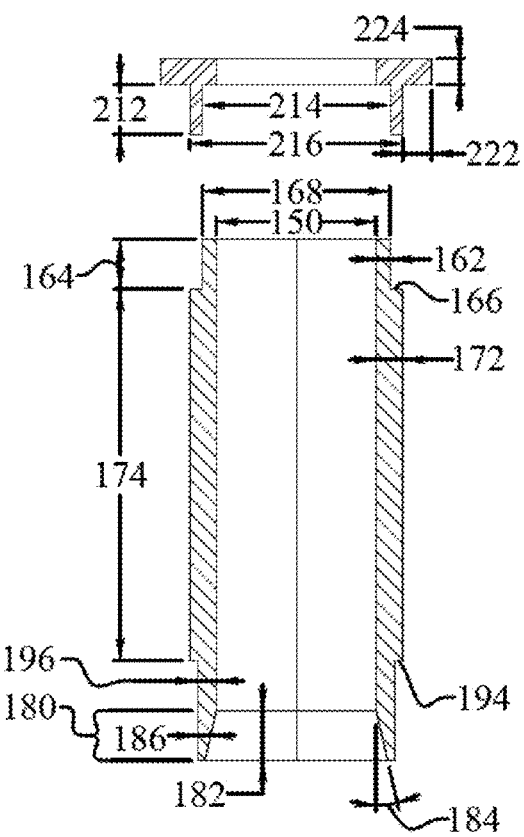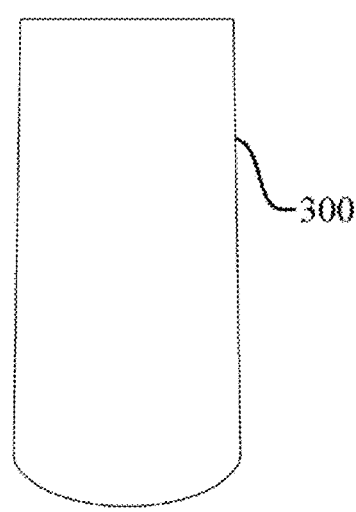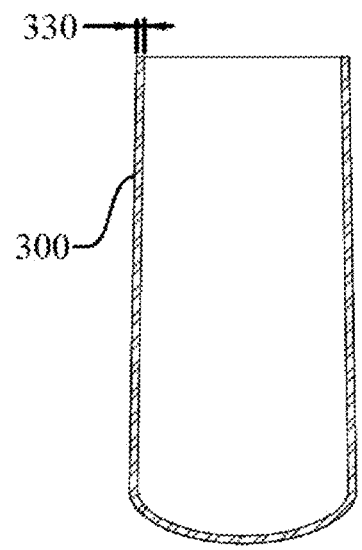
Fig. 19    Fig. 20

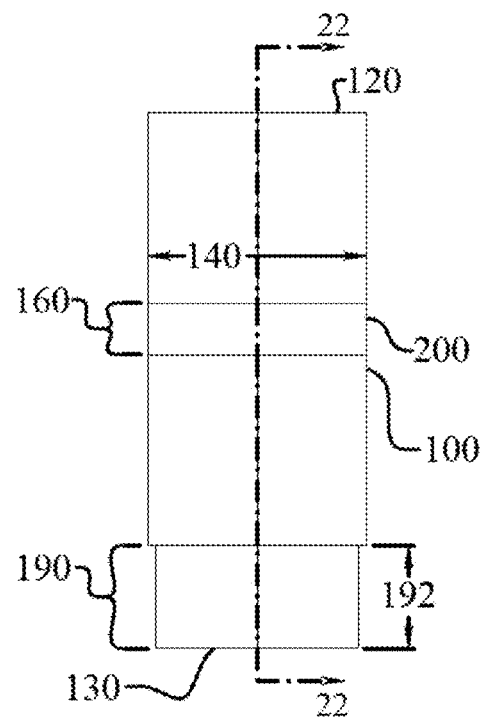
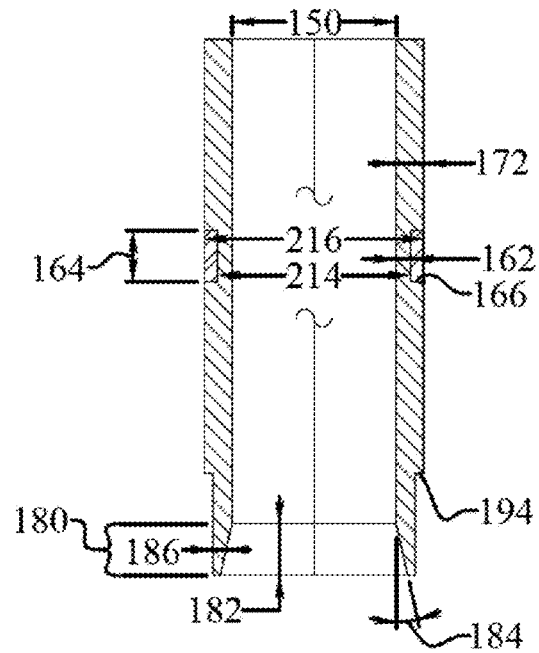
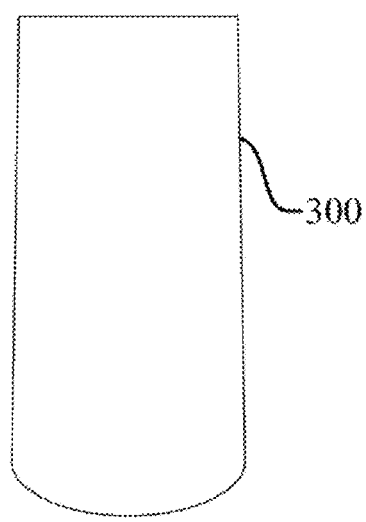
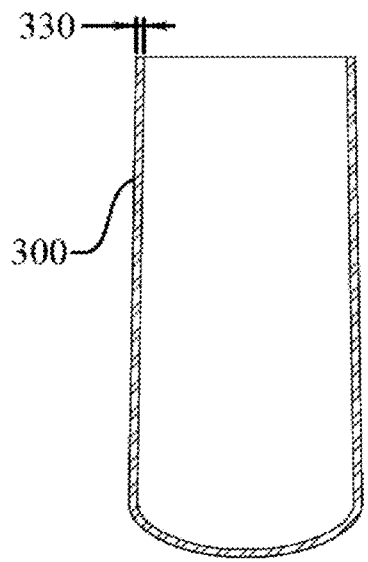
Fig. 21
Fig. 22

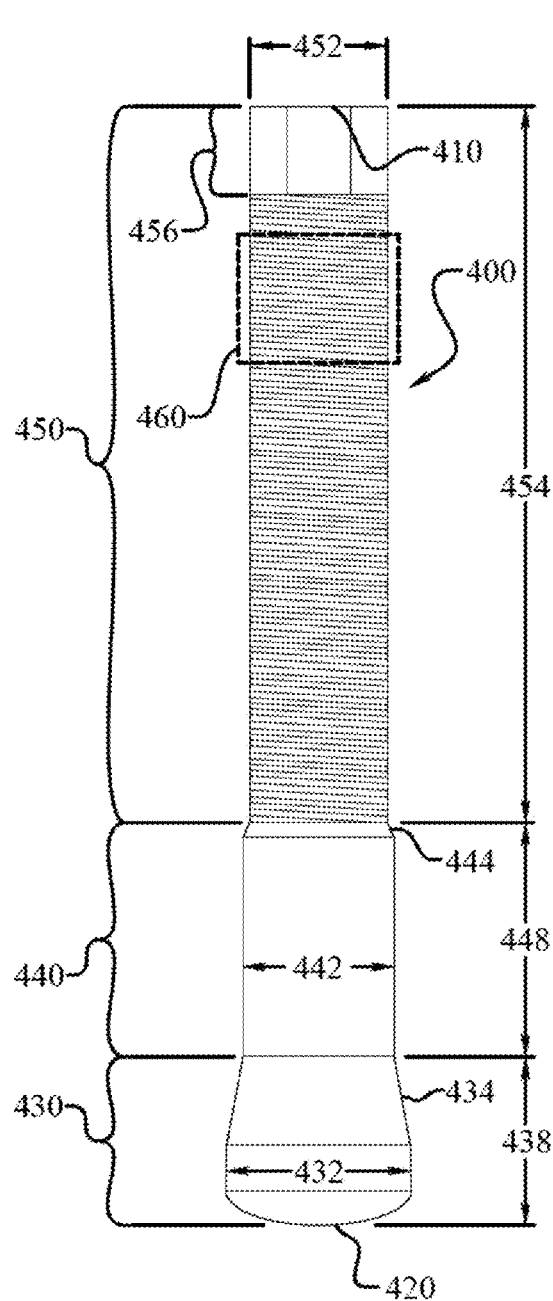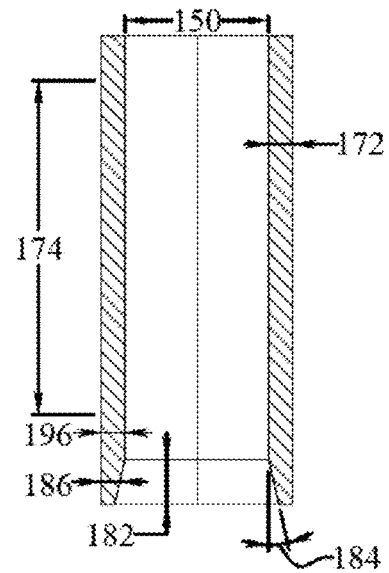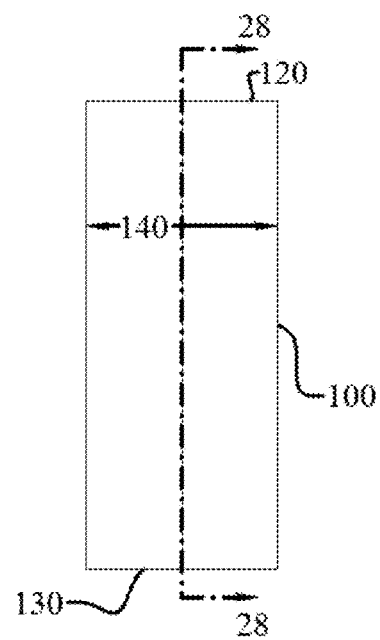
Fig. 26
Fig. 28
Fig. 27

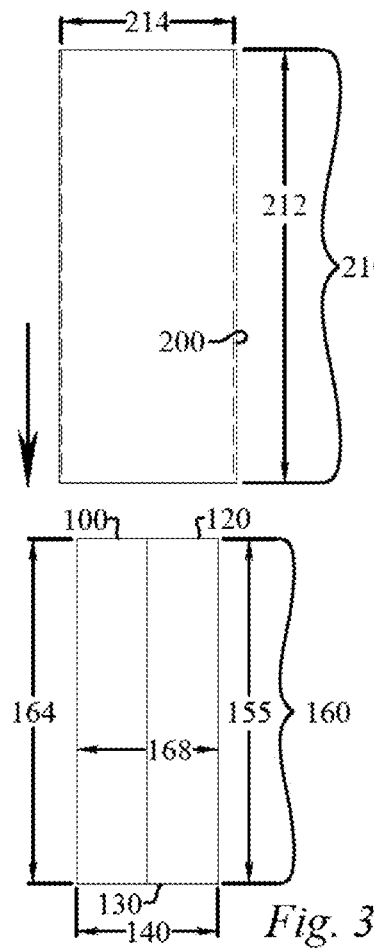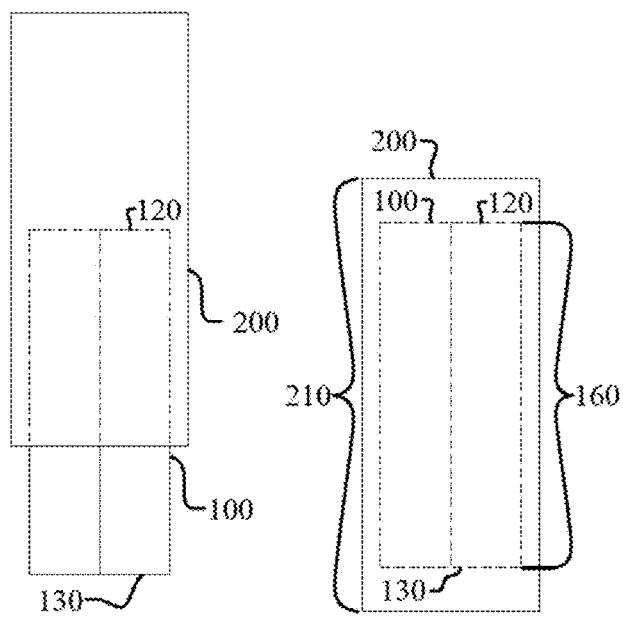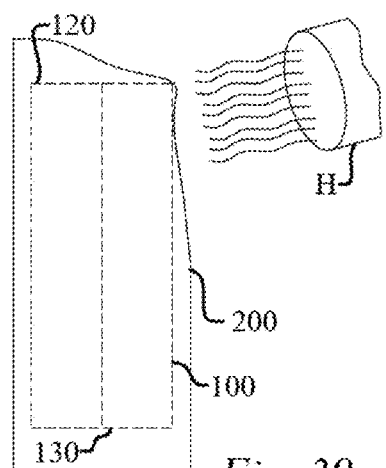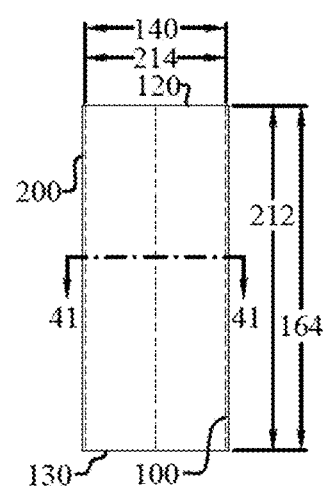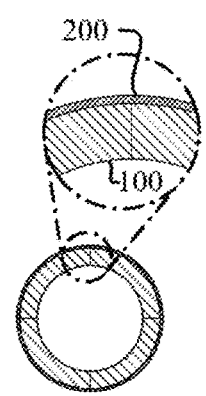
Fig. 36
Fig. 37
Fig. 38
Fig. 39
Fig. 40
Fig. 41

BLIND FASTENER

CROSS-REFERENCE TO RELATED APPLICATIONS

This application claims the benefit of U.S. provisional patent application Ser. No. 62/039,939, filed on Aug. 21, 2014, all of which are incorporated by reference as if completely written herein.

STATEMENT REGARDING FEDERALLY SPONSORED RESEARCH OR DEVELOPMENT

Not applicable.

TECHNICAL FIELD OF THE INVENTION

The present invention relates generally to blind fasteners which are capable of fastening structures which produce shear loading across the blind fastener; particularly structures comprised of structural plates, tubes, and other shapes that are commonly used in towers, poles, storage tanks, and other structures.

BACKGROUND OF THE INVENTION

Blind fasteners have generally incorporated a sleeve that expands and bends during installation often exposing sharp edges of the sleeve, as seen in U.S. Pat. No. 6,234,734. Exposing such sharp edges in an empty hollow structure may be acceptable, however exposed sharp edges in a structure filled with wires and/or cables can be disastrous, particularly when more wires and/or cables are pulled through the structure after the sharp edges have been exposed.

In addition to sharp edges found on the expanding sleeves of prior art blind fasteners, the blind fasteners in the prior art often requires preassembly and special tools to install them on various workstructures. Take for instance a technician that is assembling a tower structure suspended high above the ground. In this scenario, the technician must assemble the blind fastener in a certain order and use multiple tools to put the blind fastener into an engaged state. In this scenario the technician must be careful not to drop any of the blind fasteners components, or tools, out of inconvenience of recovering the dropped components and the safety risk to those that may below him. Additionally, the mere fact that the technician needs multiple specialized tools means that they have to carry additional weight while performing their work. Additionally, the extra tools required also increases the inconvenience and hazards of dropped tools.

SUMMARY OF THE INVENTION

A blind fastener to secure at least two workpieces enables a significant advance in the state of the art and greatly improves wire and cable protection, job site safety and simplifies blind fastener installation. A blind fastener device for fastening at least two workpieces, including a sleeve, an expander having a tensioning section, a locking section, and an expansion section, and a nut. A portion of the expander passes through the sleeve to cooperate with the nut so that relative rotation of the expander and nut draws the expander's distal end toward the sleeve's proximal end thereby drawing a portion of the expansion section of the expander into a structural region located on the sleeve and expanding at least a portion of the sleeve's structural region, and drawing a portion of the locking section past the sleeve's distal end toward the sleeve's proximal end and deforming at least a portion of the sleeve's distal end to a locked state. The sleeve may be configured as a multi-section sleeve having a sleeve retainer to locate the sections in a predetermined relationship.

BRIEF DESCRIPTION OF THE DRAWINGS

Without limiting the scope of the present invention as claimed below and referring now to the drawings and figures:

FIG. 1 is an embodiment of an exploded view of a blind fastener according to the present invention;

FIG. 2 is a cross-sectional exploded view of an embodiment of a blind fastener embodiment;

FIG. 19 is an exploded plan view of a sleeve, retainer and shroud assembly embodiment;

FIG. 20 is a cross-sectional exploded plan view of a sleeve, retainer and shroud assembly embodiment;

FIG. 21 is another embodiment of an exploded plan view of a sleeve, retainer and shroud assembly;

FIG. 22 is another embodiment of a cross-sectional exploded plan view of a sleeve, retainer and shroud assembly;

FIG. 26 is another embodiment of a plan view of an expander;

FIG. 27 is another embodiment of a plan view of a sleeve;

FIG. 28 is another embodiment of a cross-sectional plan view of a sleeve;

FIG. 36 is a plan view of another embodiment of a sleeve retainer and pre-inserted sleeve;

FIG. 37 is a plan view of another embodiment of a sleeve retainer and a partially inserted sleeve;

FIG. 38 is a plan view of another embodiment of a sleeve retainer and a fully inserted sleeve;

FIG. 39 is a plan view of another embodiment of a sleeve retainer undergoing contraction and a fully inserted sleeve;

FIG. 40 is a plan view of another embodiment of a fully contracted sleeve retainer and a fully inserted sleeve;

FIG. 41 is a cross-sectional and magnified view of another embodiment of a fully contracted sleeve retainer and a fully inserted sleeve;

Figure 3:
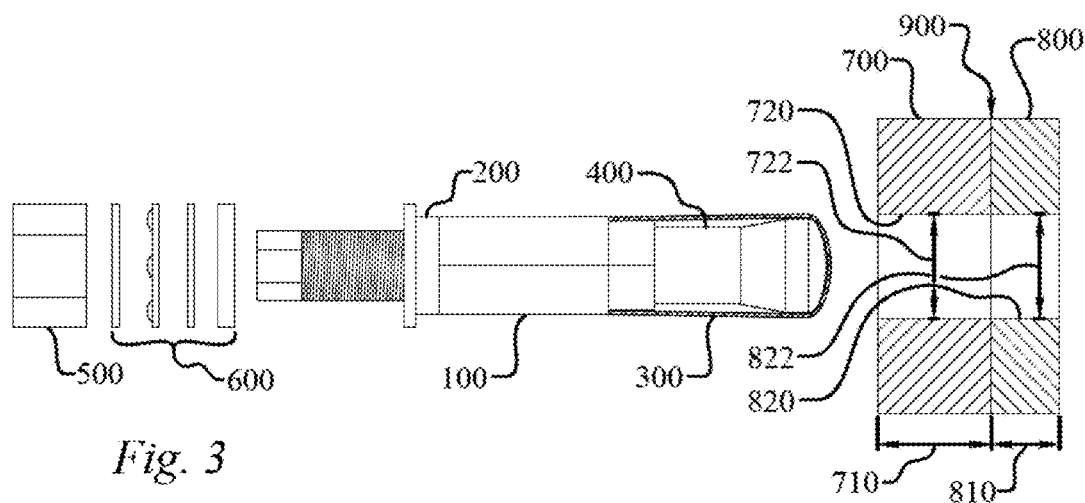
FIG. 3 is a plan view of an embodiment of a pre-insertion pre-actuation blind fastener with the shroud and workpieces shown in section for clarity.

These illustrations are provided to assist in the understanding of the exemplary embodiments of a blind fastener as described in more detail below and should not be construed as unduly limiting the specification. In particular, the relative spacing, positioning, sizing and dimensions of the various elements illustrated in the drawings may not be drawn to scale and may have been exaggerated, reduced or otherwise modified for the purpose of improved clarity. Those of ordinary skill in the art will also appreciate that a range of alternative configurations have been omitted simply to improve the clarity and reduce the number of drawings.

DETAILED DESCRIPTION OF THE INVENTION

With reference now to FIGS. 1 and 2, show an exploded view of an embodiment of a blind fastener. In this particular embodiment the main components of the blind fastener may include a sleeve (100), a sleeve retainer (200), an expander (400), a nut (500), and optionally a shroud (300) and/or a washer system (600).

Figure 12:
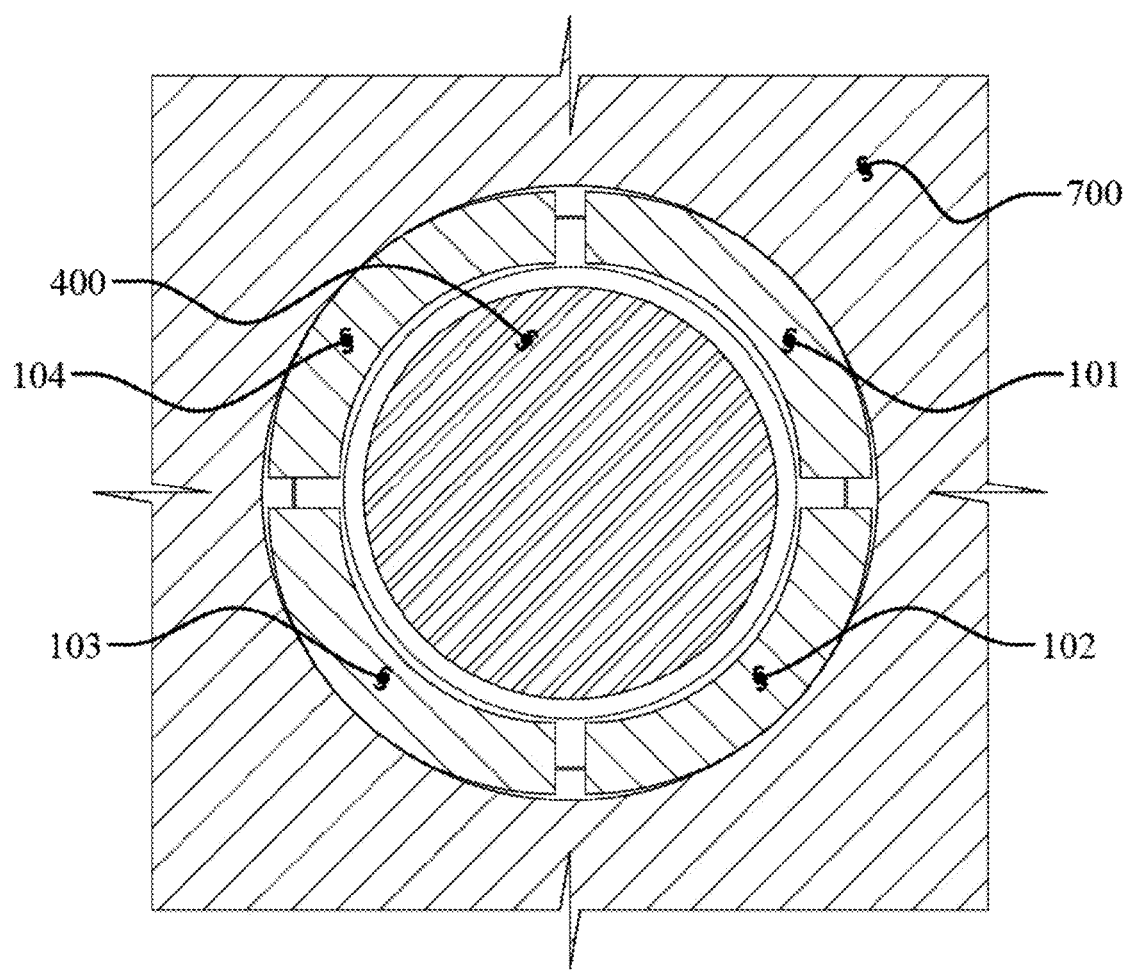
FIG. 12 is a cross-sectional view of an embodiment of a post-insertion partial-actuated blind fastener.
Figure 14:
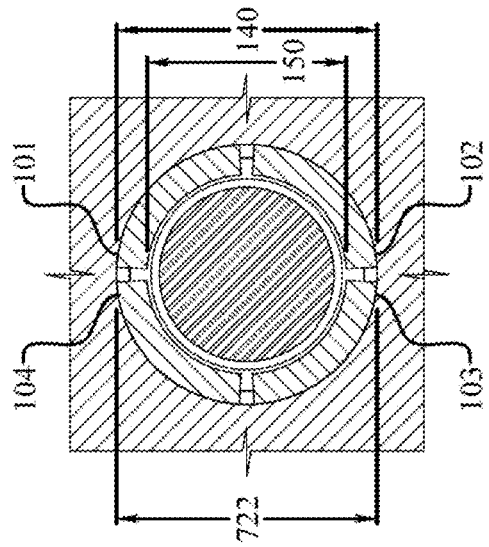
FIG. 14 is a cross-sectional view of an embodiment of a post-insertion fully-actuated blind fastener.
Figure 13:
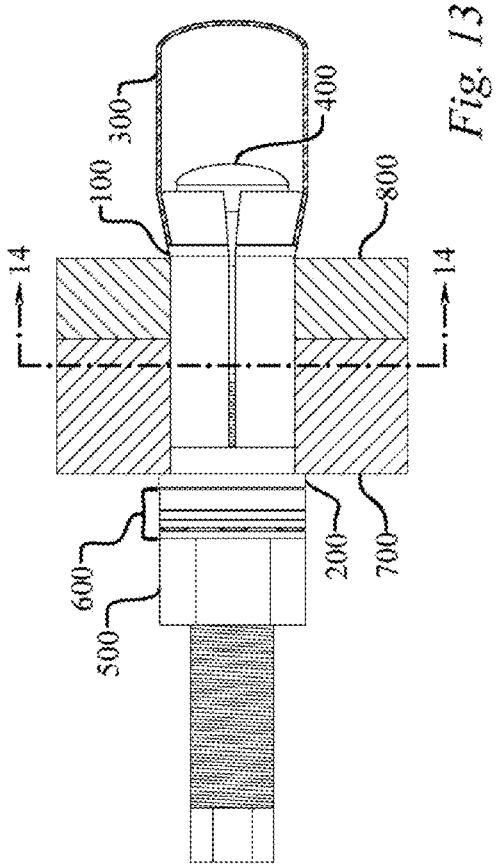
FIG. 13 is a plan view of an embodiment of a post-insertion fully-actuated blind fastener with the shroud and workpieces shown in section for clarity.
Figure 15:
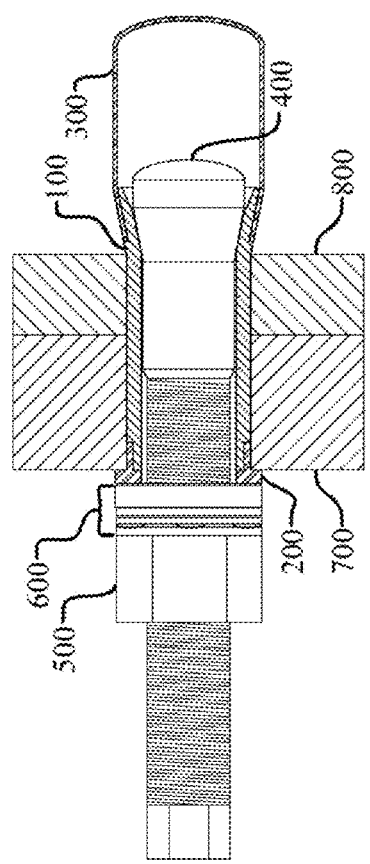
FIG. 15 is a partial cross-sectional view of an embodiment of a post-insertion fully-actuated blind fastener.
Figure 30:
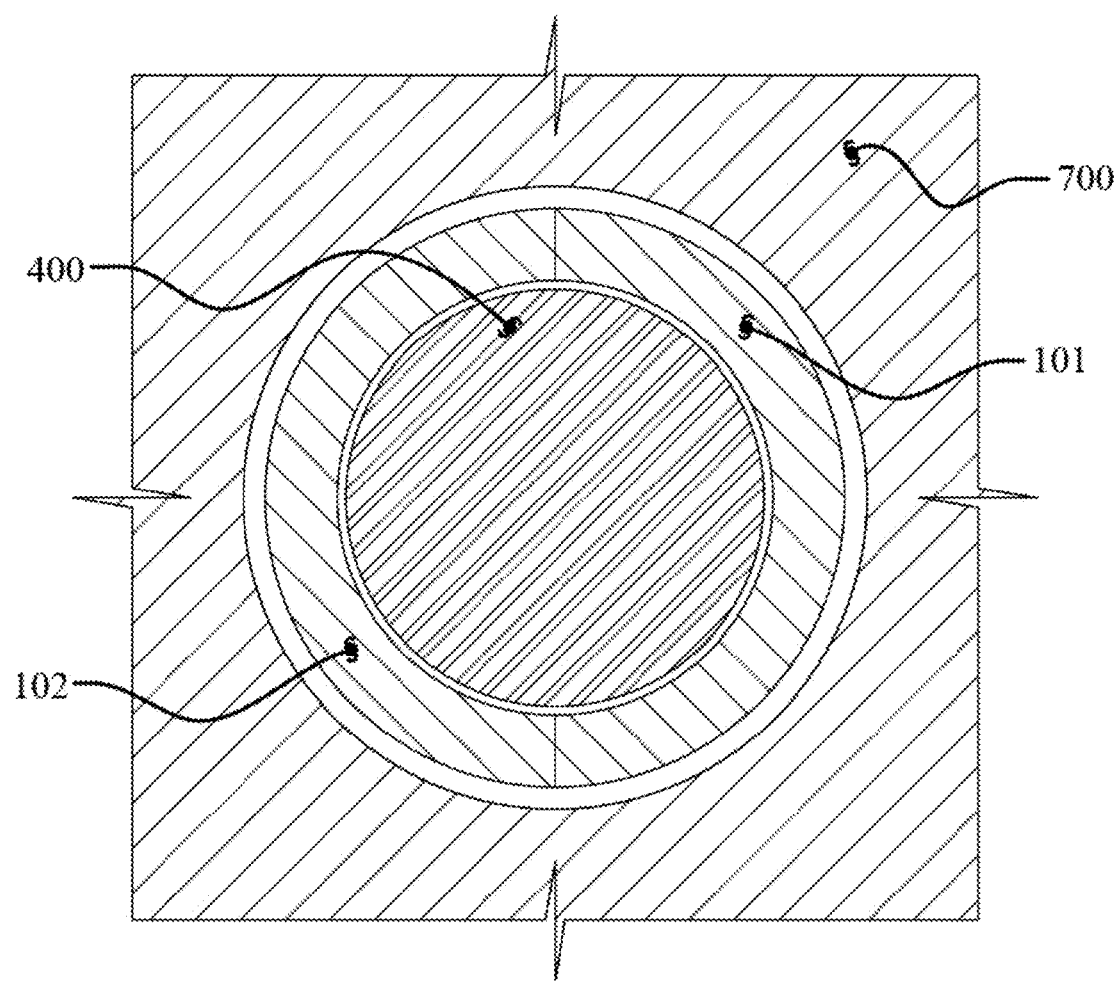
FIG. 30 is another embodiment of a cross-sectional view of a post-insertion pre-actuation blind fastener.
Figure 32:
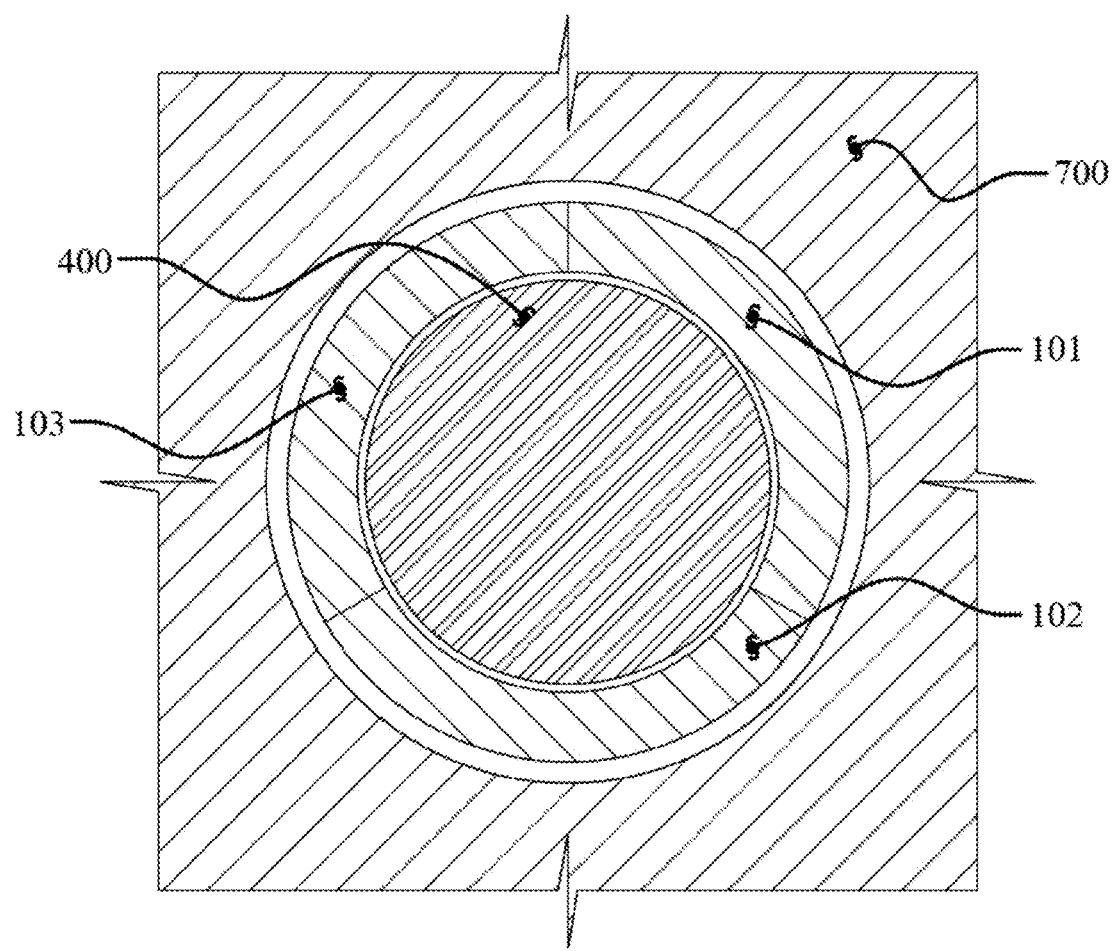
FIG. 32 is another embodiment of a cross-sectional view of a post-insertion pre-actuation blind fastener.
Figure 56:
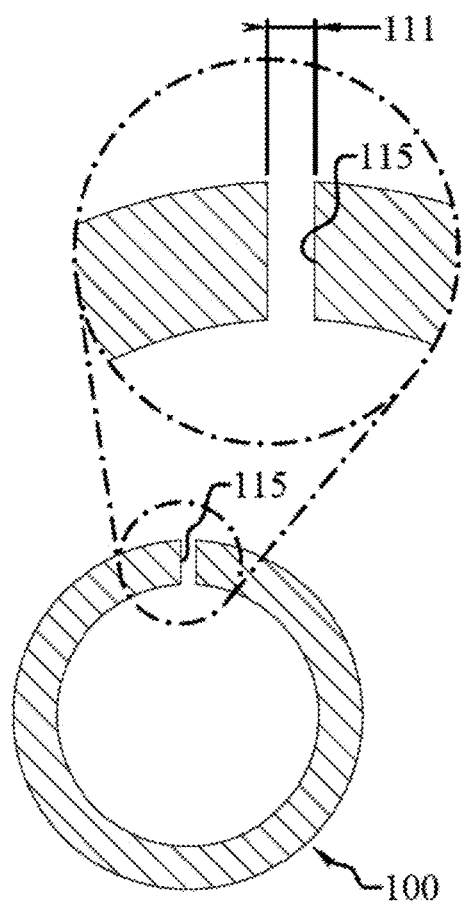
FIG. 56 is a cross-sectional view of another embodiment of a sleeve.

The sleeve (100) will first be disclosed in detail. The sleeve (100) serves the role of expanding radially in order to fill openings located in workpieces being fastened together. The expanding sleeve (100) serves to eliminate any movement in the workpieces in relation to one another due to loose fitting fasteners; the sleeve (100) reduces the likelihood of fasteners failing due to shear loading on the fastener; and sleeve (100) facilitates the blind fastener locking in place. Now with reference to FIGS. 19 and 20, the sleeve (100) has a sleeve proximal end (120), and a sleeve distal end (130). The sleeve (100) has a sleeve length (155) which is defined as the distance from the sleeve proximal end (120) to the sleeve distal end (130). Furthermore, the sleeve (100) has a sleeve outer diameter (140) that is adjacent the walls of a first workpiece opening (720), located in a first workpiece (700) having a first workpiece opening diameter (722) and a first workpiece thickness (710), and the walls of a second workpiece opening (820), located in a second workpiece (800) having a second workpiece opening diameter (822) and a second workpiece thickness (810), when the blind fastener is installed, as seen in FIGS. 3, 13 and 15. In some embodiments, the sleeve (100) may be composed of two or more distinct segments, or two or more segments that are formed when the sleeve (100) splits apart, as will be disclosed later in great detail. For instance, the embodiments of in FIGS. 6, 8, 10, 12, 14, 16, 34 and 35 have a first sleeve section (101), a second sleeve section (102), a third sleeve section (103), and a forth sleeve section (104), however the embodiment of FIG. 56 illustrates a single sleeve section embodiment, while FIG. 30 illustrates a two sleeve section embodiment, and FIG. 32 illustrates a three sleeve section embodiment.

Figure 43:
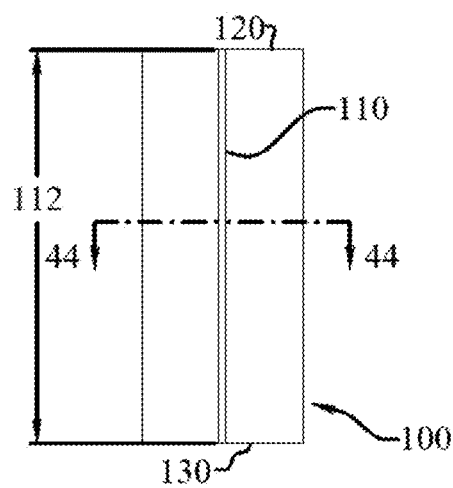
FIG. 43 is a plan view of another sleeve embodiment having a channel.
Figure 44:
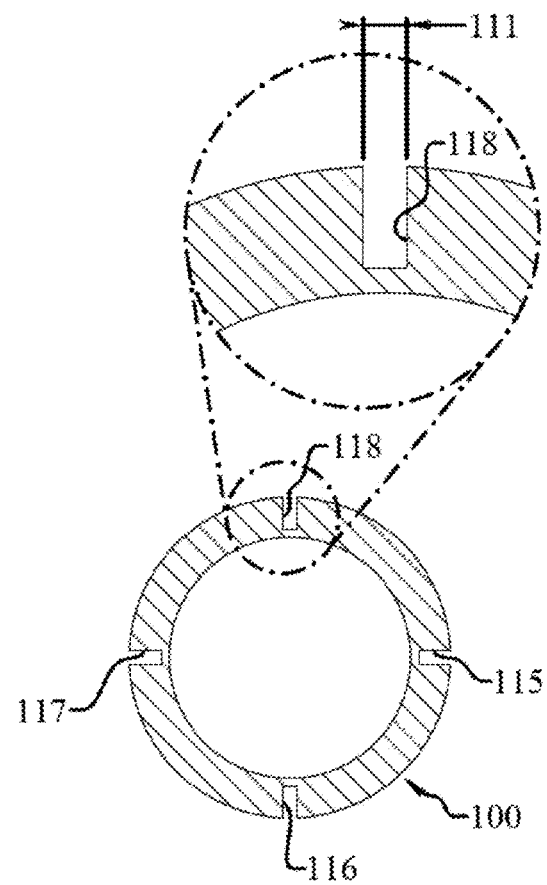
FIG. 44 is a cross-sectional and magnified view of another embodiment of a sleeve having channels.
Figure 55:
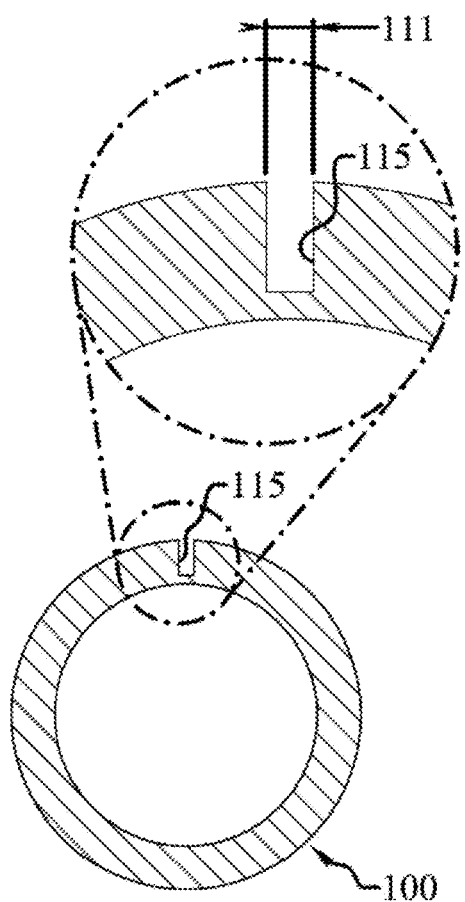
FIG. 55 is a cross-sectional and magnified view of another embodiment of a sleeve having a single channel.

As seen in FIGS. 43-46, embodiments of the sleeve (100) may incorporate one or more frangible sections that break apart during use to create distinct sleeve sections. The sleeve (100) may have at least one longitudinal sleeve channel (110) that provides a fracturable area on the sleeve (100). Each longitudinal sleeve channel (110) has a sleeve channel width (111) and sleeve channel length (112), as seen in FIGS. 43-44, that may be created by, but not limited to, milling, stamping, casting, and press forming during the creation of the sleeve (100). FIG. 43 illustrates an embodiment of sleeve (100) having at least one longitudinal sleeve channel (110) with the sleeve channel length (112) equal to 100% of the sleeve length (155), thereby allowing the sleeve (100) to fracture into full sleeve (100) sections. FIG. 44 is a cross sectional view of a sleeve (100) designed to fracture into four sections, having a sleeve first channel (115), a sleeve second channel (116), a sleeve third channel (117), and a sleeve forth channel (118). Depending on the application, variations in the first workpiece thickness (710) and the second workpiece thickness (810) may induce a need for other embodiments of fracturable sleeves (100). FIG. 55 is a cross sectional view of a sleeve (100) designed to fracture having a single sleeve first channel (115), however it may be formed with two channels, three channels, four channels, five channels, or even six, or more, channels.

Figure 45:
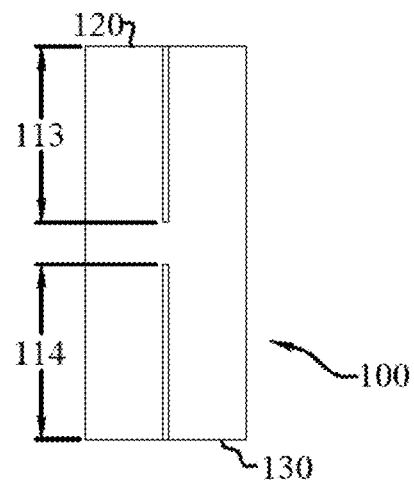
FIG. 45 is a plan view of another sleeve embodiment having channels.
Figure 46:
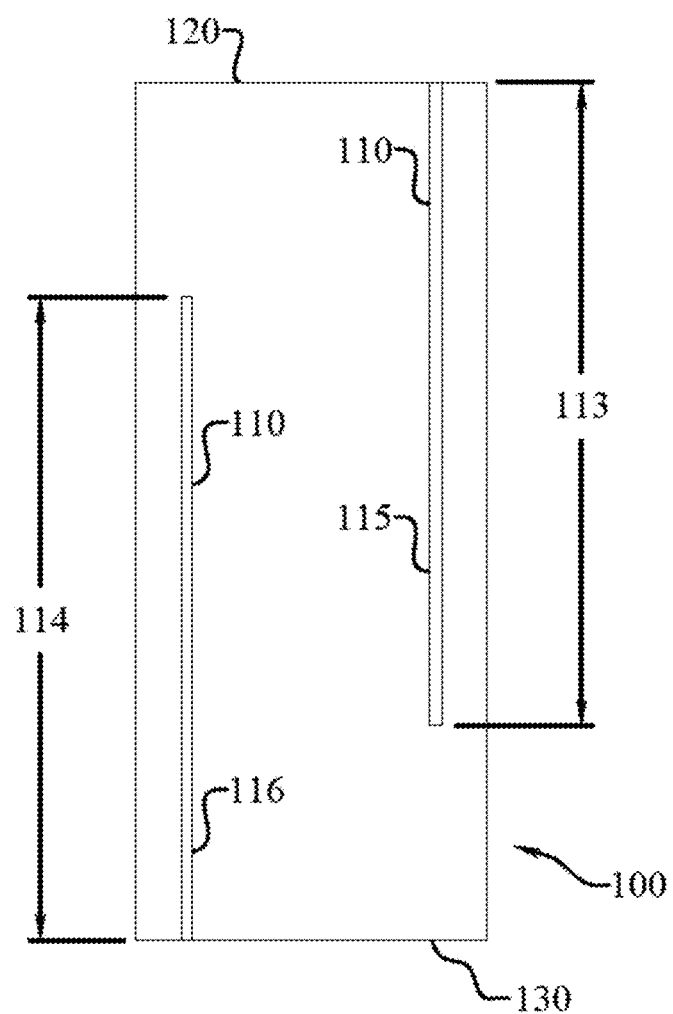
FIG. 46 is a plan view of another sleeve embodiment having channels.

One embodiment of sleeve (100), as shown in FIG. 45, incorporates one or more sleeve channels (110) that do not extend the entire length of the sleeve (100). One benefit of such an embodiment is that the additional load must be applied to the blind fastener to split the sleeve (100) into separate sections ensuring a tighter joint. One, or more, partial sleeve channels (110) may be located on the sleeve proximal end (120), having a sleeve proximal end channel length (113), and/or one, or more, partial sleeve channels (110) may be located on the sleeve distal end (130), having a sleeve distal end channel length (114). The partial sleeve channels (110) may align as seen in FIG. 45, or they be offset as seen in FIG. 46. In one embodiment at least two partial sleeve channels (110) extend from the sleeve proximal end (120) toward the sleeve distal end (130). This embodiment ensures that the sleeve (100) splits into at least two distinct pieces. In another embodiment at least two partial sleeve channels (110) extend from the sleeve distal end (130) toward the sleeve proximal end (120). In yet a further embodiment at least two distally extending partial channels align with at least two proximally extending partial channels, as seen in FIG. 45. In an even further embodiment at least three partial sleeve channels (110) extend from the sleeve proximal end (120) toward the sleeve distal end (130). This embodiment ensures that the sleeve (100) splits into at least three distinct pieces; and in another embodiment at least three partial sleeve channels (110) extend from the sleeve distal end (130) toward the sleeve proximal end (120). In yet a further embodiment at least three distally extending partial channels align with at least three proximally extending partial channels. In yet an even further embodiment at least four partial sleeve channels (110) extend from the sleeve proximal end (120) toward the sleeve distal end (130), similar to the section of FIG. 44. This embodiment ensures that the sleeve (100) splits into at least four distinct pieces; and in another embodiment at least four partial sleeve channels (110) extend from the sleeve distal end (130) toward the sleeve proximal end (120). In yet a further embodiment at least four distally extending partial channels align with at least four proximally extending partial channels.

In one embodiment the sleeve proximal end channel length (113) is less than 95% of the sleeve length (155), while in a further embodiment, the sleeve proximal end channel length (113) is 15-80% of the sleeve length (155), and in an even further embodiment, the sleeve proximal end channel length (113) is 30-60% of the sleeve length (155), while in an even further embodiment the sleeve proximal end channel length (113) is less than 50% of the sleeve length (155). Likewise, in another embodiment the sleeve distal end channel length (114) is less than 95% of the sleeve length (155), while in a further embodiment, the sleeve distal end channel length (114) is 15-80% of the sleeve length (155), and in an even further embodiment, the sleeve distal end channel length (114) is 30-60% of the sleeve length (155), while in an even further embodiment the sleeve distal end channel length (114) is less than 50% of the sleeve length (155). In some applications it may be desirable for the sleeve (100) to include partial sleeve channels (110) located on both the sleeve proximal end (120) and sleeve distal end (130), having a sleeve proximal end channel length (113) and a sleeve distal end channel length (114). In one such embodiment preferential loading is achieved when there is a separation distance between the ends of the channels that is 1-20% of the sleeve length (155), while in a further embodiment the separation distance is 5-10% of the sleeve length (155), which is enough to require additional fastener loading to split the sleeve (100) into sections.

The depth of any of the disclosed sleeve channels (110), full length or partial length, may also be used to control the fastener loading needed to split the sleeve (100) into sections. The depth, seen in FIG. 44, is preferably at least 50% of the maximum structural region wall thickness (172), seen in FIG. 20 and later described in detail. In a further embodiment the depth is 60-95% of the maximum structural region wall thickness (172), while in an even further embodiment the depth is 75-95% of the maximum structural region wall thickness (172).

Figure 49:
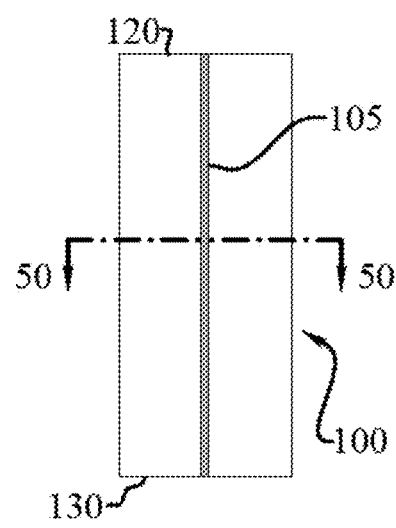
FIG. 49 is a plan view of another sleeve embodiment with bonded sleeve sections.
Figure 50:
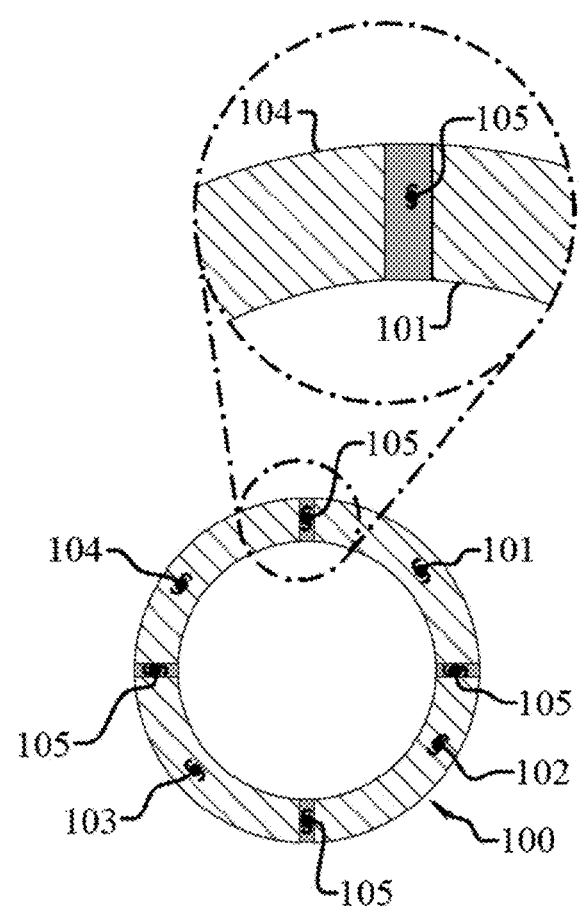
FIG. 50 is a cross-sectional view of another embodiment of a sleeve with bonded sleeve sections.

In another embodiment, the sleeve (100) may have separate sections that are bonded together by a sleeve bonding agent (105), as seen in FIGS. 49 and 50. The sleeve bonding agent (105) bonds the individual sleeve sections into a fracturable sleeve (100) unit which breaks apart into individual sleeve (100) sections when exposed to a predetermined load. The sleeve bonding agent (105) may include, but is not limited to, a directly applied adhesive or polymer applied between the sections as seen in FIGS. 49-50, an adhesive or polymer in which the sleeve (100) is dipped thereby covering a portion, or all, of the sleeve (100), and an injection cast polymer inner sleeve (100) surface, outer sleeve (100) surface or a completely embedded sleeve (100). Further, the sleeve bonding agent (105) may be soldering or brazing alloy, or even a weld material produced during a continuous, or a spot, welding process. Thus, in some embodiments the sleeve bonding agent (105) does not extend the full length of the individual sleeve sections.

Figure 31:
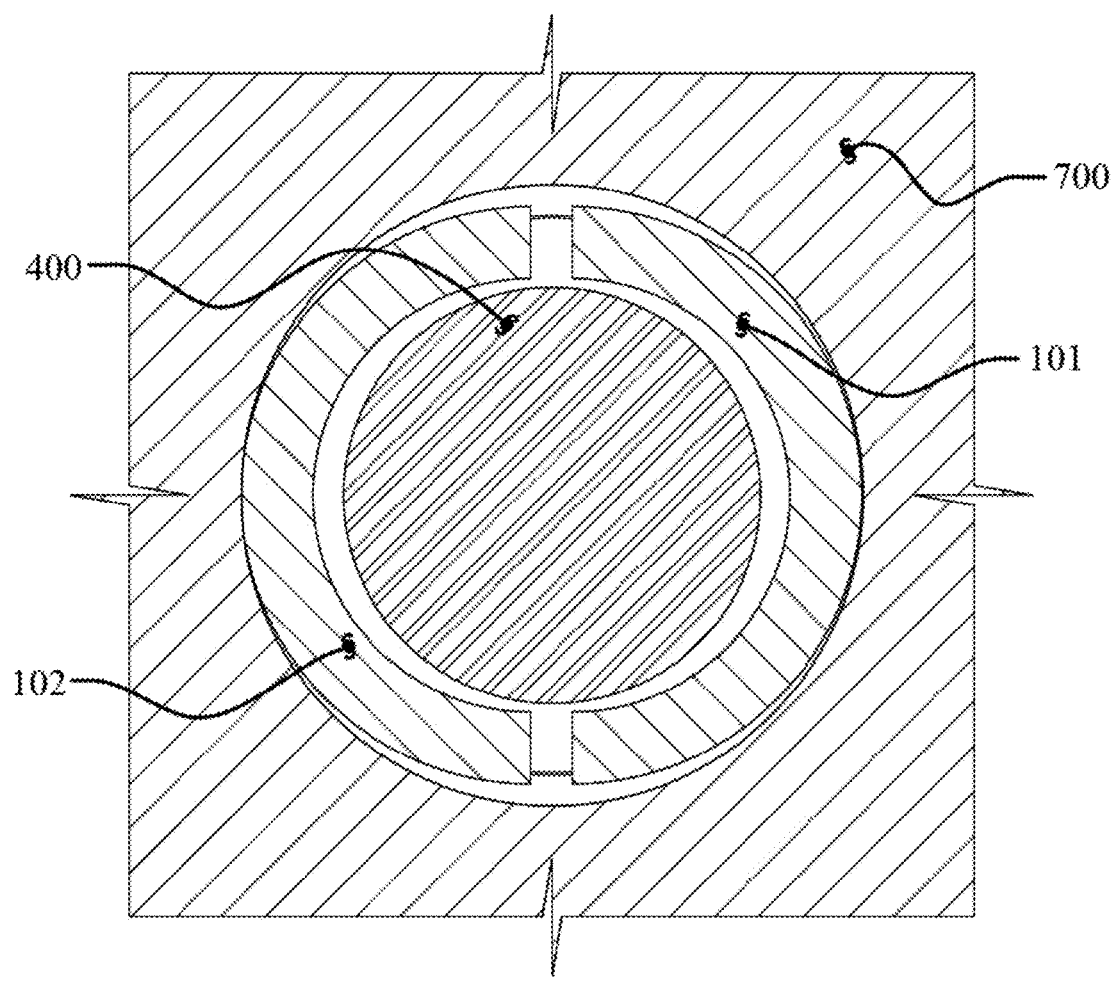
FIG. 31 is another embodiment of a cross-sectional view of a post-insertion fully-actuated blind fastener.
Figure 33:
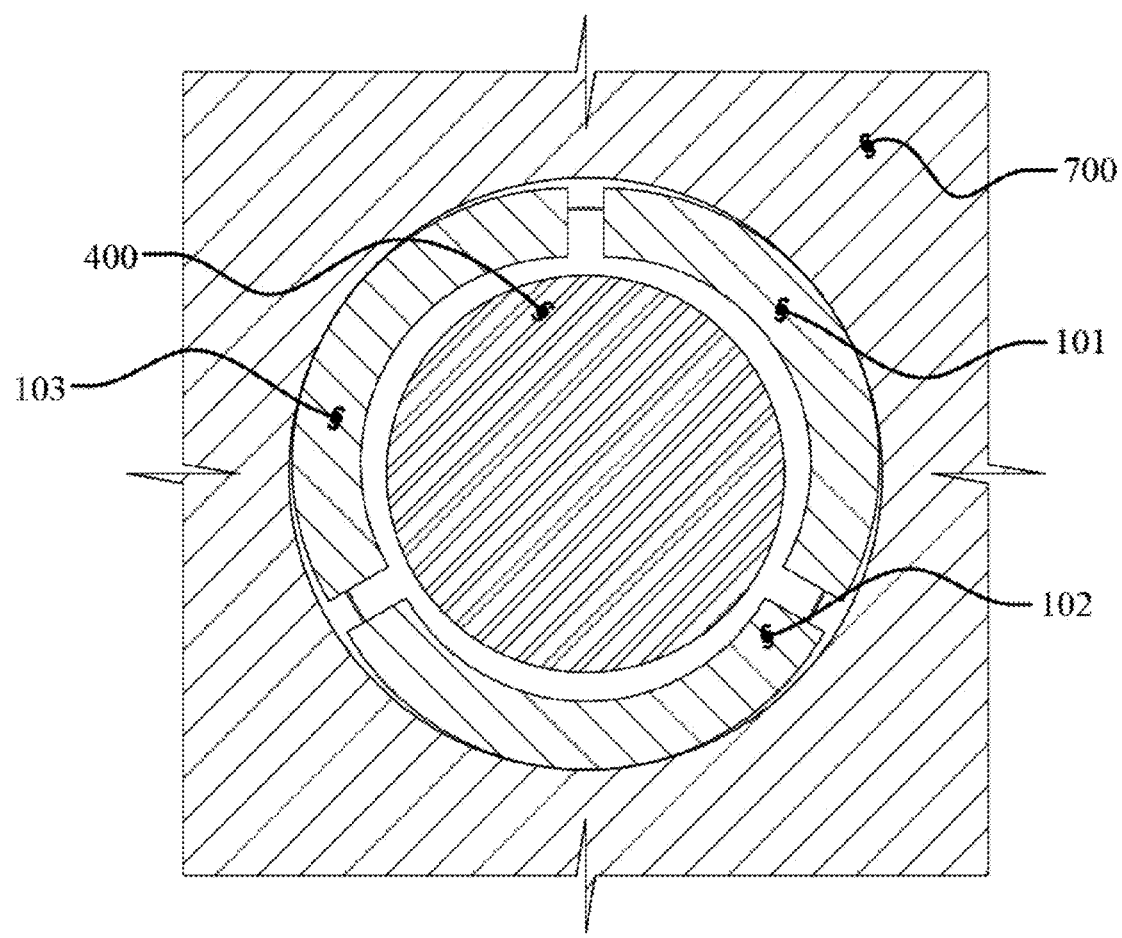
FIG. 33 is another embodiment of a cross-sectional view of a post-insertion fully-actuated blind fastener.
Figure 34:
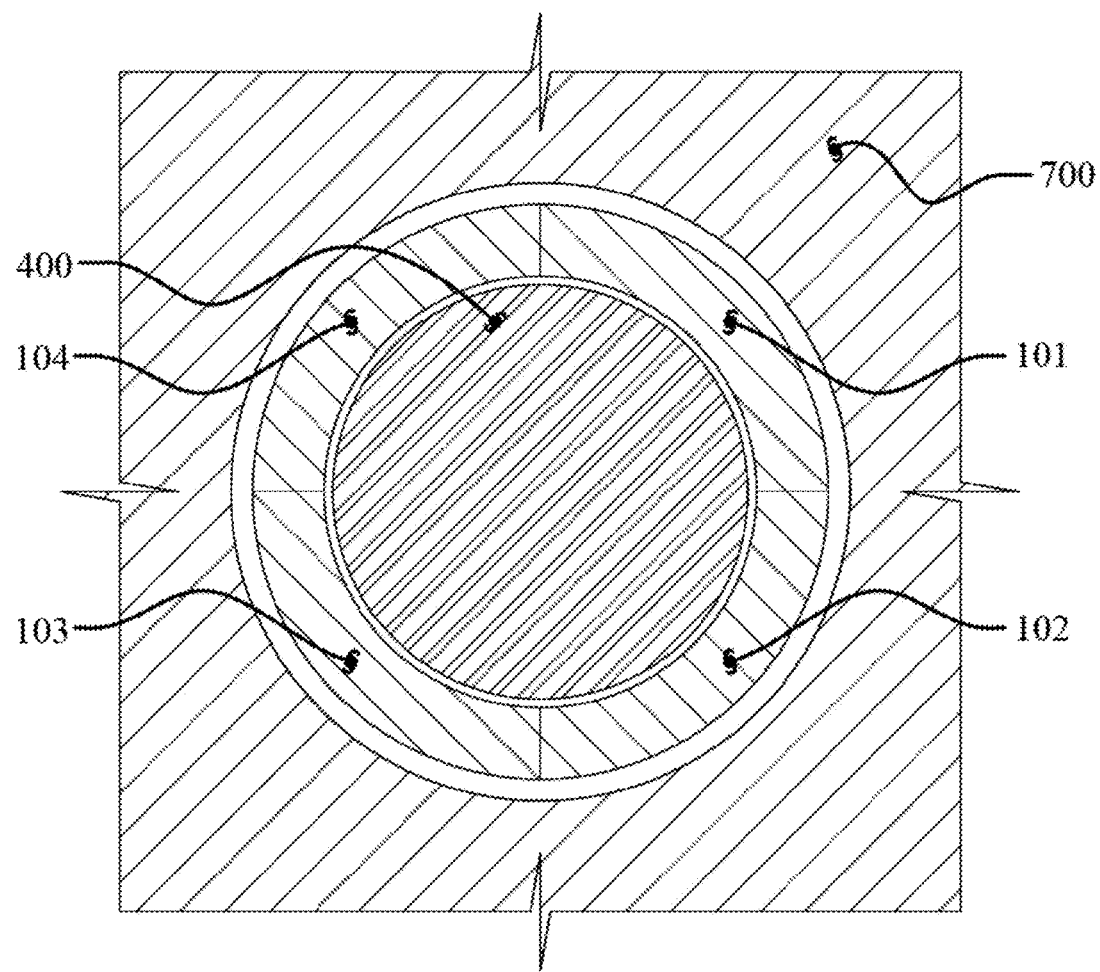
FIG. 34 is another embodiment of a cross-sectional view of a post-insertion pre-actuation blind fastener.
Figure 35:
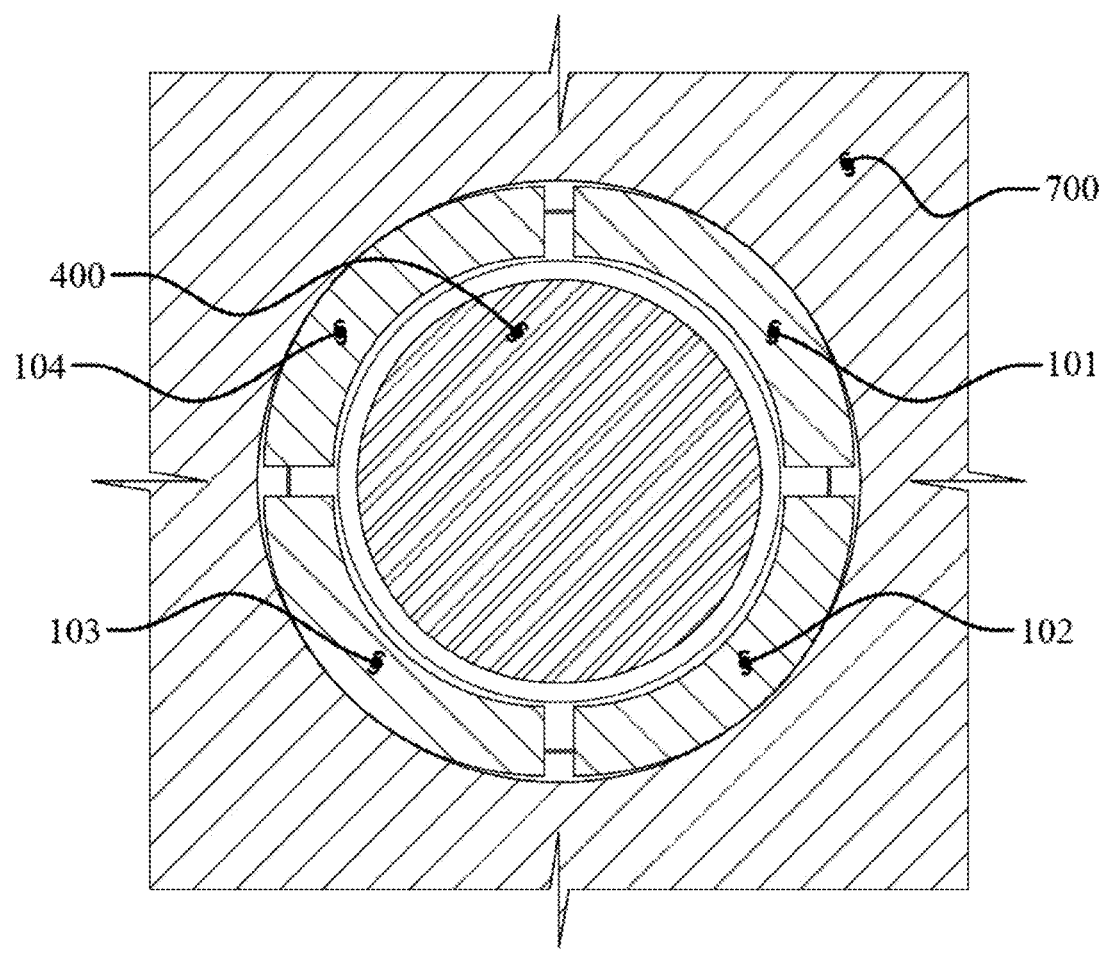
FIG. 35 is another embodiment of a cross-sectional view of a post-insertion fully-actuated blind fastener.

In another embodiment, the sleeve (100) may have pre-separated distinct sections that are held in place by one or more sleeve retainers (200), as seen in FIGS. 1-15, 19-20, 23-24, and 48, and in some embodiments a shroud (300). In one embodiment the sleeve (100) includes at least two distinct sections (101, 102), as seen in FIGS. 30-31, while in another embodiment the sleeve (100) includes at least three distinct sections (101, 102, 103), as seen in FIGS. 32-33, and in an even further embodiment includes at least four distinct sections (101, 102, 103, 104), as seen in FIGS. 34-35. The segmentation of the sleeve (100) allows the sleeve outer diameter (140) to expand when the blind fastener is actuated, as seen in FIGS. 31, 33, and 35, and provides edges of the distinct sections that bite into the workpieces (700, 800). The sleeve (100) has a sleeve inner diameter (150), seen in FIG. 6, forming a bore in which the expander (400) passes through.

As seen in FIGS. 19 and 20, in one embodiment the sleeve (100) has a retainer engagement region (160) having a retainer engagement region wall thickness (162), a retainer engagement length (164) and a retainer engagement region diameter (168). While the embodiment of FIG. 20 illustrates the sleeve retainer (200) located at the sleeve proximal end (120), it may be located anywhere along the length of the sleeve (100), as seen near the middle of the sleeve (100) in FIG. 21 and at the sleeve distal end (130) in FIG. 48.

Figure 47:
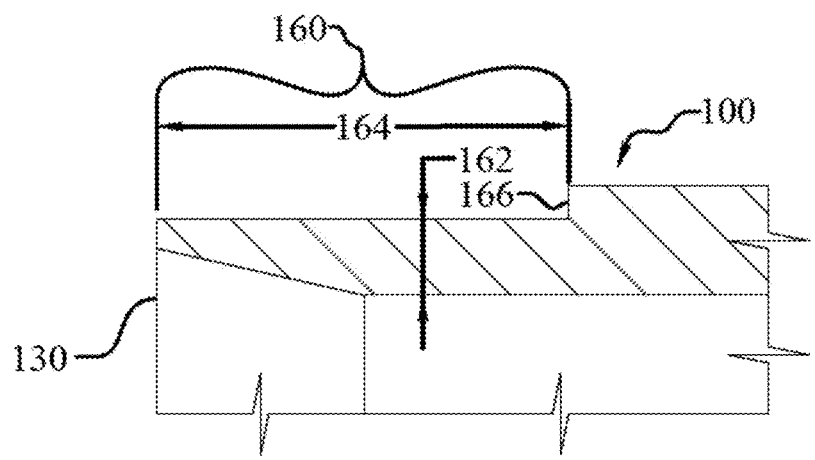
FIG. 47 is a partial cross-sectional view of another sleeve embodiment.

In some embodiments the sleeve (100) includes at least one retainer engagement region ledge (166), as illustrated in FIGS. 20 and 47. The engagement region ledge (166) provides a surface for the sleeve retainer (200) to abut and helps provide a smooth transition from the sleeve retainer (200) and sleeve (100). In such ledge embodiments the retainer engagement region wall thickness (162) is preferably at least 20% of a maximum structural region wall thickness (172), while in a further embodiment the retainer engagement region wall thickness (162) is 30-95% of the maximum structural region wall thickness (172), and in an even further embodiment the retainer engagement region wall thickness (162) is at least 50% of the maximum structural region wall thickness (172). A still further embodiment has a retainer engagement region wall thickness (162) of at least 65% of the maximum structural region wall thickness (172). The minimum retainer engagement region wall thickness (162) ensures that the retainer engagement region (160) will not crush longitudinally when subjected to severe loading. Additionally the retainer engagement region (160) may have a retainer engagement region wall thickness (162) such that when the retainer (200) is attached to the retainer engagement region (160), the sum of the retainer engagement region wall thickness (162) and the retainer thickness, which is half the distance between the sleeve engagement section outer diameter (216) and the sleeve engagement section inner diameter (214) seen in FIG. 20, is not more than the structural region wall thickness (172), thereby ensuring passage through a tight opening (720, 820) in the workpieces (700, 800).

Furthermore, in one embodiment the sleeve (100) has a retainer engagement region (160) located on the sleeve proximal end (120) allowing the sleeve retainer (200) to be affixed to the sleeve (100), as seen in FIG. 19. In a further embodiment, the retainer engagement region (160) is located in an area located between the sleeve proximal end (120) and the sleeve distal end (130), as seen in FIGS. 21 and 22. In another embodiment, the retainer engagement region (160) is located on the sleeve distal end (130) as seen in FIG. 47, which also serves to cover the sleeve distal end (130) as it flairs outward thereby providing many of the benefits discussed later herein with respect to the shroud (300) embodiment. In yet another embodiment, the retainer engagement region (160) includes the entire sleeve length (155), as seen in FIG. 36 and described later in more detail.

Figure 4:
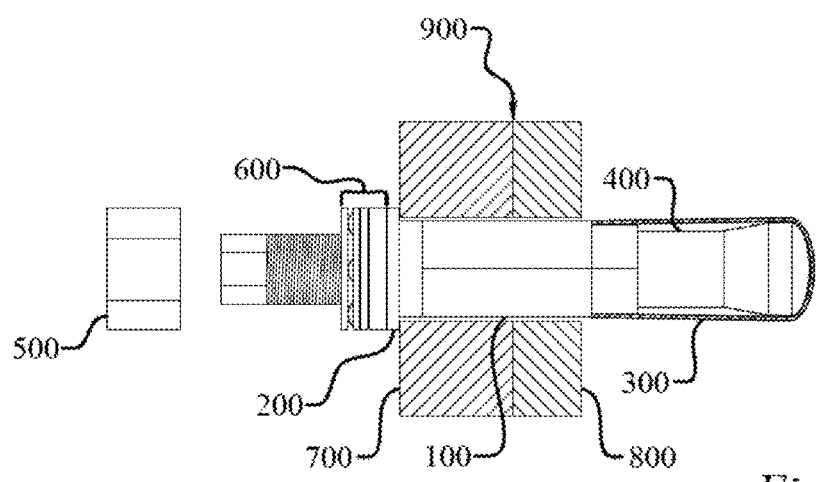
FIG. 4 is a plan view of an embodiment of a post-insertion pre-actuation blind fastener with the shroud and workpieces shown in section for clarity.

Additionally, the sleeve (100) has a structural region (170) with a structural region length (174) and a structural region wall thickness defined by the sleeve outer diameter (140) and the sleeve inner diameter (150), as illustrated by FIGS. 19 and 20. The structural region (170) has a structural region length (174) sufficiently long enough to engage the first workpiece (700) and second workpiece (800) when the blind fastener is placed through the overlapping first workpiece opening (720) and second workpiece opening (820) as illustrated in FIGS. 3 and 4. In order to accommodate a wide variety of workpiece thicknesses and configurations, the structural region length (174) is preferably at least 35% greater than an expansion section length (448), seen in FIG. 17 and discussed later in detail. While in another embodiment the structural region length (174) is preferably at least 50% greater than an expansion section length (448), and in yet a further embodiment the structural region length (174) is 50-95% greater than an expansion section length (448). Furthermore, when the blind fastener is in a fully actuated locked state, the sleeve structural region (170) and the expander (400) substantially fill the opening in the workpieces and impart a radial load on the workpiece openings, while resisting shear forces at a workpiece interface (900) located where the first workpiece opening (720) and second workpiece opening (820) abut, as seen in FIGS. 3, 4, 13 and 15. The structural region (170) of the sleeve (100) is that portion intended to carry the load at the shear plane of the workpiece interface (900), and includes the adjacent portions of the sleeve (100) having a sleeve outer diameter (140) within 5% of the maximum sleeve outer diameter (140), but this does not require the structural region (170) to have a perfectly smooth outer surface. For instance, the outer surface of the structural region (170) may have surface texturing or stippling to increase the grip as the outer surface comes in contact with the workpieces (700, 800); further, the outer surface of the structural region (170) may have channels in the outer surface, which may produce limited regions in which the sleeve outer diameter (140) is not within 5% of the maximum sleeve outer diameter (140) provided (a) the total volume of such channels is less than 25% of the volume of the structural region (170), and (b) in a series of five equally spaced transverse cross-sections through the structural region (170) at least three of the five transverse cross-sections have at least 50% of the cross-sectional perimeter is within 5% of the maximum sleeve outer diameter (140), thereby allowing limited longitudinal channels, as well as limited transverse channels, within the structural region (170).

Figure 5:
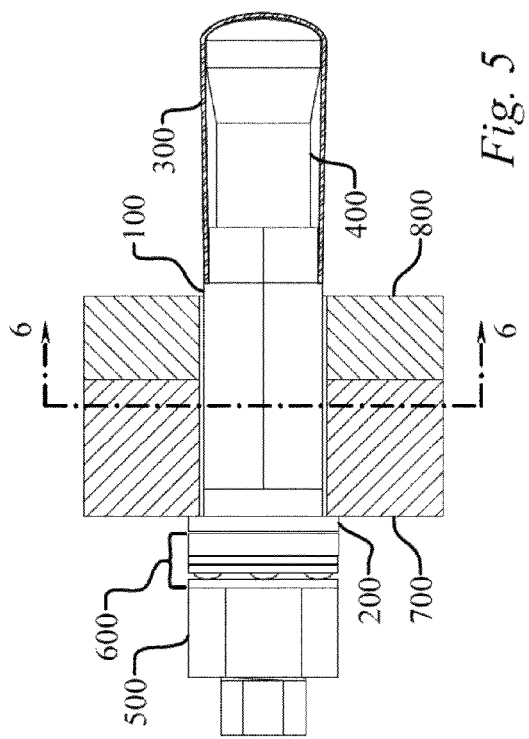
FIG. 5 is a plan view of an embodiment of a post-insertion pre-actuation blind fastener with the shroud and workpieces shown in section for clarity.

In one embodiment the structural region (170) has a structural region wall thickness (172), as seen in FIGS. 20 and 22. Further, the retainer engagement region wall thickness (162) of the retainer engagement region (160), as seen in FIGS. 19 and 20, has a minimum retainer engagement region wall thickness (162) that is at least 25% of the maximum structural region wall thickness (172) to ensure the retainer engagement region (160) does not compress longitudinally as the expander (400) is drawn into the structural region (170) of the sleeve (100). In another embodiment the sleeve (100) may also have a shroud engagement region (190) on which the shroud (300) may attach, as shown in FIGS. 19 and 20. The shroud engagement region (190) has a shroud engagement region length (192) that is sufficiently long enough to allow the shroud (300) to remain attached during the actuation and locking of the blind fastener. In reference to the shroud (300), the shroud has a proximal end (310), a shroud distal end (320) and a shroud thickness (330), as shown in FIGS. 1 and 20. The shroud (300) may be composed of an elastic material, or may have a hard protective cap with an elastic skirt on the shroud proximal end (310) that attaches to the shroud engagement region (190). Furthermore, the shroud (300) cooperates with sleeve shroud engagement region (190) and encloses at least a portion of the expander (400) and a portion of the sleeve (100), as seen in FIG. 5; while in a further embodiment the shroud (300) encloses the sleeve distal end (130) and the expander distal end (420) in the initial state, the expanded state, and the locked state; and in an even further embodiment the shroud (300) has a shroud proximal end (310), a shroud distal end (320), and a shroud thickness (330), whereby the shroud proximal end (310) is attached to the sleeve (100) and the shroud distal end (320) totally encloses and seals the sleeve distal end (130). In many embodiments at least a portion of the shroud (300) is elastic and applies a compressive force on to the sleeve (10).

Figure 48:
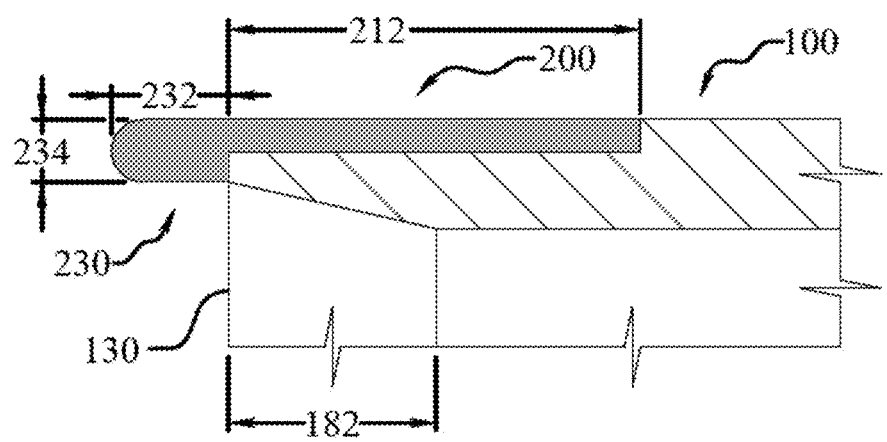
FIG. 48 is a partial cross-sectional view of another embodiment of a sleeve having a sleeve retainer.

The shroud (300) serves an important function of protecting cables from being damaged from the exposed surfaces of a blind fastener, however as previously disclosed this protective function may also be achieved via the sleeve retainer (200) when positioned at the sleeve distal end (130) as shown in FIG. 48. The shroud engagement region (190) may have a shroud engagement region ledge (194) against which the shroud proximal end (310) abuts as seen in FIGS. 19 and 20. Additionally the shroud engagement region (190) may have a shroud engagement region wall thickness (196) such that when the shroud (300) is attached to the shroud engagement region (190), the sum of the shroud engagement region wall thickness (196) and the shroud thickness (330) is not more than the structural region wall thickness (172). Furthermore, in another embodiment the shroud engagement region wall thickness (196) is at least 25% of the maximum structural region wall thickness (172) to ensure that the shroud engagement region (190) does not compress longitudinally as the expander (400) is drawn into the structural region (170) of the sleeve (100). In a further embodiment the shroud engagement region wall thickness (196) is 30-95% of the maximum structural region wall thickness (172), and in an even further embodiment the shroud engagement region wall thickness (196) is at least 50% of the maximum structural region wall thickness (172). One particular embodiment has a minimum shroud engagement region wall thickness (196) that is 25-50% of the maximum structural region wall thickness (172). A still further embodiment has a shroud engagement region wall thickness (196) of at least 65% of the maximum structural region wall thickness (172). In some embodiments the sleeve (100) includes a shroud engagement region (190) having a shroud engagement region length (192) that is at least 10% of the structural region length (174), and the shroud (300) cooperates with the shroud engagement region (190). In a further embodiment the shroud engagement region length (192) is 10-50% of the structural region length (174). The shroud engagement region (190) may be a circumferential recess in the exterior surface of the sleeve (100) thereby creating at least one shroud engagement region ledge (194) to shield at least one edge of the shroud (300).

The sleeve (100) may include a sleeve throat (180) having a throat length (182), a throat angle (184), and a throat wall thickness (186), as illustrated in FIG. 20. The throat wall thickness (186) tapers as it approaches the sleeve distal end (130), as illustrated in FIG. 20. In one embodiment, the mid-point of the sleeve throat (180) has a throat wall thickness (186) of not less than 25% of the maximum structural region wall thickness (172). In another embodiment, the mid-point of the sleeve throat (180) has throat wall thickness (186) of not more than 75% of the maximum structural region wall thickness (172), while in yet a further embodiment, the mid-point of the sleeve throat (180) has throat wall thickness (186) that is 25-75% of the maximum structural region wall thickness (172). The throat wall thickness (186) ensure that the shroud engagement region (190) can easily enter the sleeve throat (180) and begin the deformation of the sleeve (100), which is completed by the locking section (430), while not compressing longitudinally as the expander (400) is drawn into the sleeve (100).

Figure 7:
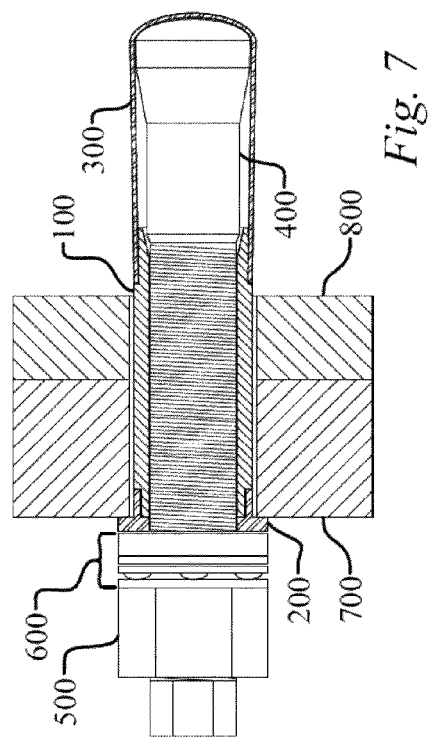
FIG. 7 is a partial cross-sectional view of an embodiment of a post-insertion pre-actuated blind fastener.

In one embodiment the sleeve throat length (182) is at least 25% of the length of the shroud engagement region (190), or the retainer engagement region length (164) when the sleeve retainer (200) when positioned at the sleeve distal end (130) as shown in FIG. 48. In another embodiment, the sleeve throat length (182) does not exceed 75% of the length of the shroud engagement region (190) or the retainer engagement region length (164). The sleeve throat length (182) and tapering throat wall thickness (186) forms a throat angle (184) which acts as a ramp within the sleeve throat (180) that helps ensure proper alignment and ingress of the expander (400) as it is drawn into the sleeve (100), as seen in FIG. 7. Furthermore, in one embodiment the throat angle (184) is 5-50 degrees, while in a further embodiment the throat angle (184) is 10-45 degrees, and in an even further embodiment the throat angle (184) is 15-30 degrees. The throat length (182) and throat angle (184) ensure that the shroud engagement region (190) can easily enter the sleeve throat (180) and begin the radial expansion and deformation of the sleeve (100) via the locking section (430), while not compressing longitudinally as the expander (400) is drawn into the sleeve (100).

Figure 42:
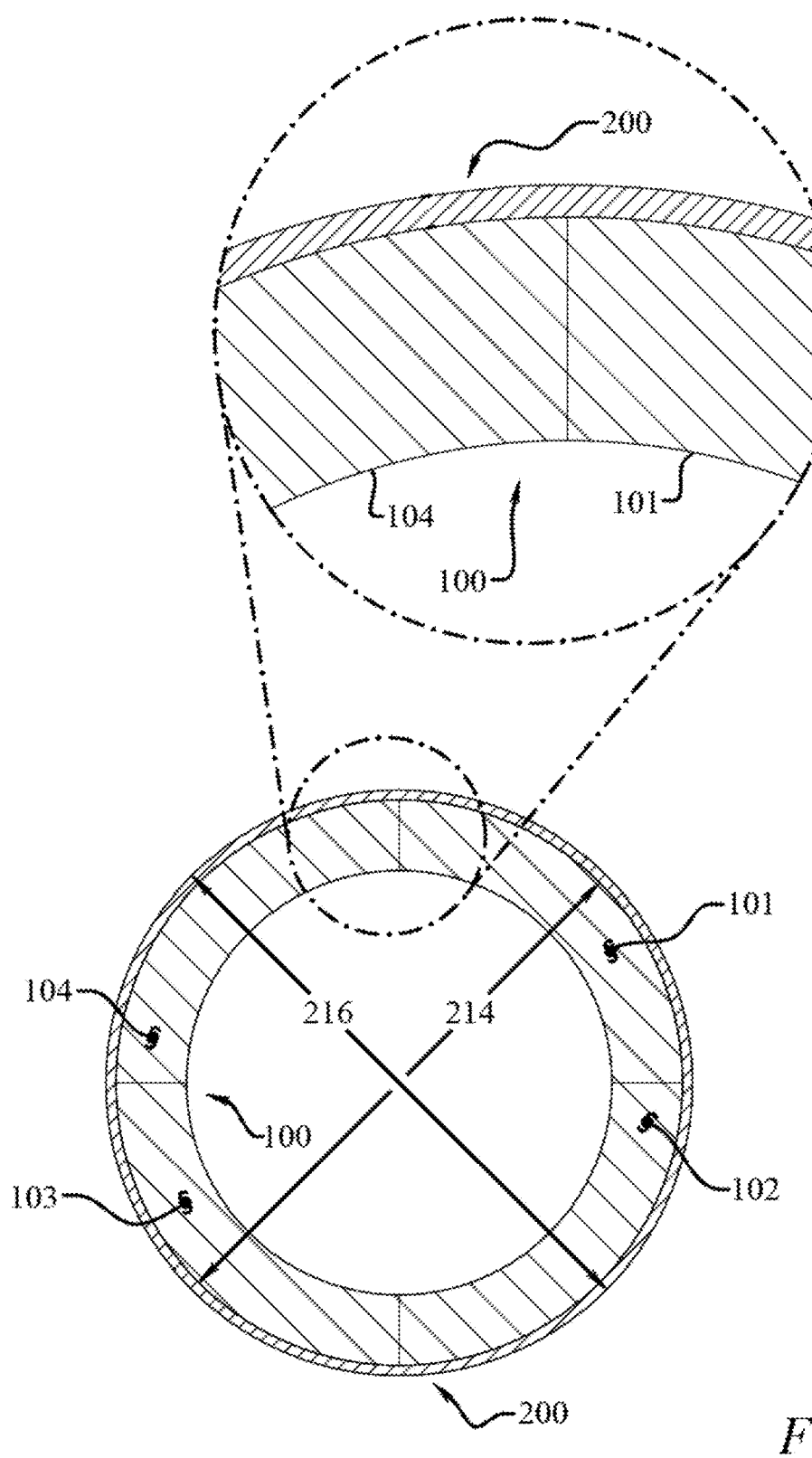
FIG. 42 is another cross-sectional view of another embodiment of a fully contracted sleeve retainer and a fully inserted sleeve.

The sleeve retainer (200) may be elastic in nature, contractible in nature, or non-elastic in nature, but applied with a preload, and has a sleeve engagement section (210) that cooperates with the retainer engagement region (160) to maintain the sleeve (100) in an initial state. As seen in FIGS. 19, 20 and 42, the sleeve engagement section (210) of the sleeve retainer (200) has a sleeve engagement section length (212), a sleeve engagement section inner diameter (214), a sleeve engagement section outer diameter (216), and a retainer thickness, which is one-half of the difference between the sleeve engagement section outer diameter (216) and the sleeve engagement section inner diameter (214). In one embodiment, the sleeve engagement section outer diameter (216) is not more than the sleeve outer diameter (140) when the sleeve retainer (200) is attached to the retainer engagement region (160). In another embodiment, the sleeve engagement section outer diameter (216) is 1-15% larger than the sleeve outer diameter (140) when the sleeve retainer (200) is attached to the retainer engagement region (160), thereby providing a consistent outer surface of the blind fastener that can easily enter workpiece openings that are extremely tight without snagging. In yet another embodiment, the sleeve engagement section outer diameter (216) is less than the sleeve outer diameter (140) when the sleeve retainer (200) is attached to the retainer engagement region (160). Additionally, in one embodiment the sleeve engagement section length (212) is approximately the same as the retainer engagement region length (164) in order to prevent overlapping of the sleeve engagement section (210) when the sleeve retainer (200) is affixed to the retainer engagement region (160) of the sleeve (100), while in a further embodiment the sleeve engagement section length (212) is less than the retainer engagement region length (164) in order to prevent overlapping of the sleeve engagement section (210) when the sleeve retainer (200) is affixed to the retainer engagement region (160) of the sleeve (100). The sleeve engagement section length (212) may be at least 10% of the structural region length (174), while in a further embodiment the sleeve engagement section length (212) is 10-50% of the structural region length (174), while in an even further embodiment the sleeve engagement section length (212) is a circumferential recess in the exterior surface of the sleeve (100) thereby creating at least one retainer engagement region ledge (166) to shield at least one edge of the sleeve retainer (200). The retainer engagement region (160) has a retainer engagement region wall thickness (162), and the structural region (170) has a structural region wall thickness (172), whereby in one embodiment the minimum retainer engagement region wall thickness (162) is at least 25% of the maximum structural region wall thickness (172) to ensure the retainer engagement region (160) does not compress longitudinally as the expander (400) is drawn into the sleeve (100). Even further, the minimum retainer engagement region wall thickness (162) is 25-50% of the maximum structural region wall thickness (172) provides the necessary strength. These relationships provide a sleeve retainer (200)

to sleeve (100) connection that is strong enough to withstand the forces encountered as the sleeve (100) is installed and radially expanded.

In another embodiment seen in FIG. 48, the sleeve retainer (200) may be located on, and overlap, the sleeve distal end (130) thereby forming a sleeve retainer protrusion (230). As previously mentioned, in this embodiment the sleeve retainer (200) provides the benefits previously described as being associated with the shroud (300) embodiment. The sleeve retainer protrusion has a sleeve retainer protrusion length (232) and a sleeve retainer protrusion width (234), as seen in FIG. 48. The retainer protrusion width (234) may have the same thickness as the fully contracted sleeve retainer (200). However, in one embodiment the retainer protrusion width (234) is greater than the height of the retainer engagement region ledge (166) and wraps around a portion of the sleeve distal end (130) further ensuring that the sleeve retainer (200) remains in place as the sleeve distal end (130) flares outward as the expander (400) is drawn into the sleeve (100) as seen in FIG. 15. Taking this even further, in the embodiment of FIG. 48 the retainer protrusion width (234) is equal to the height of the retainer engagement region ledge (166) and the throat wall thickness (186) at the sleeve distal end (130). Further, in another embodiment the sleeve retainer (200) has a sleeve engagement section length (212) that is at least as great as the sleeve throat length (182), thereby further reducing the likelihood that the sleeve retainer (200) moves out of position as the sleeve distal end (130) flares outward as the expander (400) is drawn into the sleeve (100). In an even further embodiment the sleeve engagement section length (212) is at least 50% greater than the sleeve throat length (182), and is at least 75% greater than the sleeve throat length (182) in another embodiment, while in a further embodiment the sleeve retainer protrusion length (232) is at least 5% of the retainer engagement region length (164). The retainer protrusion width (234) may have a thickness that is at least 15-30% greater than the sleeve retainer (200) sleeve engagement section outer diameter (216) minus the sleeve engagement section inner diameter (214). The sleeve retainer protrusion (230) provides the benefit of aiding in the alignment and installation of the blind protective fastener, and also helps shield wires, cables and other important infrastructure from sharp edges that may form on the expanding sleeve distal end (130) during installation.

As seen in FIGS. 19-20, in another embodiment the sleeve retainer (200) may have a retainer flange (220) having a retainer flange overhang (222) and a retainer flange thickness (224), which while illustrated at the sleeve proximal end (120) in FIGS. 19-20 could also be located at the sleeve distal end (130) as seen in FIG. 48. When positioned at the sleeve proximal end (120), the retainer flange overhang (222) helps seal both the internal structure of the workpieces and the blind fastener from the natural elements. Additionally, the retainer flange thickness (224) is sufficient to form a water tight gasket when the blind fastener is actuated to a locked state.

As seen in FIGS. 21-22, one embodiment may incorporate a single sleeve retainer (200). Alternatively, the embodiment of FIGS. 21-22 may also incorporate a sleeve distal end (130) sleeve retainer (200), such as that seen in FIG. 48, or the sleeve distal end (130) shroud (300) as illustrated in FIGS. 21-22. Further, the embodiment of FIGS. 19-20 may incorporate a sleeve proximal end (120) sleeve retainer (200), either with or without a retainer flange (200), in unison with a sleeve distal end (130) sleeve retainer (200), such as that seen in FIG. 48, or the sleeve distal end (130) shroud (300) as illustrated in FIGS. 19-20. Even further, in the embodiments of FIGS. 36-41, a single sleeve retainer (200) may encircle majority, or all, of the sleeve (100), as will be explained in greater detail later, which may be used alone or in combination with any of the disclosed sleeve retainer (200) and/or shroud (300) embodiments.

In some embodiments, seen in FIGS. 36-41, a sleeve retainer (200) may be made of a contractible material, which may be incorporated individually into the blind fastener or may be applied in addition to at least one other sleeve retainer (200). In this embodiment the sleeve retainer (200) has a sleeve engagement section (210), as seen in FIGS. 36 and 38, which cooperates with the retainer engagement region (160) after contraction to maintain the sleeve (100) in an initial state. The retainer engagement region (160) may be recessed as illustrated in FIGS. 19, 20, 21 and 48. Alternatively, the retainer engagement region (160) may be on a non-recessed sleeve (100) retainer engagement region (160), as illustrated in FIGS. 40, 41 and 42, which may simply be the exterior surface of the sleeve (100). In one contractible material sleeve retainer (200) embodiment the sleeve retainer (200) has a sleeve engagement section length (212) prior to contraction that is at least 25% of the retainer engagement region length (164), which means that in one embodiment the sleeve engagement section length (212) prior to contraction is at least 25% of the overall sleeve length (155). In a further contractible material sleeve retainer (200) embodiment the sleeve retainer (200) has a sleeve engagement section length (212) prior to contraction that is at least 50% of the retainer engagement region length (164), which means that in one embodiment the sleeve engagement section length (212) prior to contraction is at least 50% of the overall sleeve length (155). In yet another contractible material sleeve retainer (200) embodiment the sleeve retainer (200) has a sleeve engagement section length (212) prior to contraction that is at least 75% of the retainer engagement region length (164), which means that in one embodiment the sleeve engagement section length (212) prior to contraction is at least 75% of the overall sleeve length (155). While an even further contractible material sleeve retainer (200) embodiment has a sleeve engagement section length (212) prior to contraction that is at least 100% of the retainer engagement region length (164), which means that in one embodiment the sleeve engagement section length (212) prior to contraction is at least 100% of the overall sleeve length (155). Another embodiment is designed to encircle the entire sleeve length (155) post-contraction of the sleeve retainer (200), and therefore has a sleeve engagement section length (212) prior to contraction that is at least 110% of the retainer engagement region length (164), which means that in one embodiment the sleeve engagement section length (212) prior to contraction is at least 110% of the overall sleeve length (155), and thus at least partially wraps either the sleeve proximal end (120), the sleeve distal end (130), or both, upon contraction.

Such contractible material sleeve retainer (200) embodiments have a pre-contraction inner and outer sleeve engagement section diameter (214, 216), as seen in FIG. 42. Furthermore, the pre-contraction sleeve engagement section inner diameter (214) is at least 5% larger than the sleeve retainer engagement region diameter (168). During assembly the sleeve (100) is positioned inside the sleeve retainer (200), as seen in FIGS. 37 and 38, which may include the use of a temporary mandrel to position the sleeve (100), or the sleeve (100) may already be positioned on a tensioning section (450) of the expander (400). Then a sleeve retainer (200) contraction activation means (H) is applied to the sleeve retainer (200). The contraction activation means (H) may include, but is not limited to, heat activation and/or dehydration activation. For instance, in one embodiment, a heat activated sleeve retainer (200) may be a shrink wrap sleeve that may be made of, but is not limited to, PETG, PVC, OPS, PE, or PLA shrink films. In another embodiment, that uses dehydration activation, the sleeve retainer (200) may be a shrink wrap sleeve made of, but not limited to, gelatin and collagen materials.

In other embodiments that have shrink wrap covering 100% of the sleeve (100) outer surface, the shrink wrap sleeve retainer (200) presents a seamless outer surface thereby further reducing the likelihood of snagging any of the components of the blind fastener as it is installed. Additionally, the shrink wrap sleeve, or any portion of the sleeve retainer (200), may be printed with installation instructions and warnings for the end user, and may be color coded to easily inform the user of an attribute of the blind fastener. For instance in one embodiment the color of the contractible material sleeve retainer (200) is indicative of the length of the blind fastener, or the thickness of the workpiece joint that may be joined via the blind fastener; whereas in another embodiment the color is indicative of the diameter of the blind fastener, or the size of the opening in the workpieces that may be joined via the blind fastener.

Furthermore, in some embodiments the sleeve retainer (200) ensures the components of the sleeve (100) and expander (400) remain together during shipping and installation, which improves worksite safety, particularly when the blind fastener is in the process of being installed high above the ground. After the sleeve retainer (200) has been fully contracted the sleeve engagement section inner diameter (214) is approximately the same as the retainer engagement region diameter (168) wherein the sleeve retainer engagement section (210) is in physical contact with the retainer engagement region (160) and imparts a radially compressive load on the sleeve (100). In yet another embodiment the contractible sleeve retainer (200) covers a portion of the sleeve (100), a portion of the expander (400), and a portion of the nut (500); while in a further embodiment it also covers a washer system (600) located between the nut (500) and the sleeve (100) thereby holding all of the components of the blind fastener together in a predetermined relationship.

With reference to FIGS. 36-41, in one embodiment the fully contracted sleeve retainer (200) is provided on the retainer engagement region (160) located on the sleeve proximal end (120) and extends from the sleeve proximal end (120) towards the sleeve distal end (130). In another embodiment, the contracted sleeve engagement section length (212) is at least 25% of the sleeve length (155). In another embodiment, the contracted sleeve engagement section length (212) is at least 50% of the sleeve length (155). In yet another embodiment, the contracted sleeve engagement section length (212) is at least 75% of the sleeve length (155). In one embodiment, the fully contracted sleeve retainer (200) is provided on the retainer engagement region (160) located on the sleeve distal end (130) and extends from the sleeve distal end (130) towards the sleeve proximal end (120). In another embodiment, the contracted sleeve engagement section length (212) is at least 25% of the sleeve length (155). In yet another embodiment, the contracted sleeve engagement section length (212) is at least 50% of the sleeve length (155). In still another embodiment, the contracted sleeve engagement section length (212) is at least 75% of the sleeve length (155). In other embodiments the sleeve retainer (200) and retainer engagement region (160) maybe offset from the sleeve proximal end (120) or the sleeve distal end (130). In another embodiment, the sleeve retainer and retainer engagement region (160) maybe located at the sleeve length (155) midpoint, as seen in FIGS. 21 and 22. In yet another embodiment, the sleeve (100) may have at least two sleeve retainers (200). In one embodiment the sleeve (100) may be provided with two retainer engagement regions (160) and two sleeve retainers (200), having one retainer engagement region (160) and one sleeve retainer (200) located on the sleeve proximal end (120) and the other retainer engagement region (160) and sleeve retainer (200) located on the sleeve distal end (130). Alternatively, in another embodiment, the sleeve (100) may be provided with two retainer engagement regions (160) and sleeve retainers (200), having one retainer engagement region (160) and one sleeve retainer (200) located on the sleeve proximal end (120) or sleeve distal end (130) and the other retainer engagement region (160) and sleeve retainer (200) located on the sleeve length (155) midpoint. In yet another embodiment, the fully contracted sleeve retainer (200) fully encompasses and engages the retainer engagement region (160) wherein the retainer engagement region length (164) is substantially equal to the sleeve length (155).

The use of sleeve retainer (200) made of a contractible material installed, or shrunk, around at least a portion of the sleeve (100) after the sleeve (100) is positioned on the expander (400) offers several advantages. The compressive radial force exerted by the contractible sleeve retainer (200) forces the sleeve (100) against the expander (400) and keeps it in place. For example in FIG. 29 the contractible sleeve retainer (200) is applied after the sleeve (100) is positioned on the tensioning section (450) of the expander (400), which effectively locks the sleeve (100) on the tensioning section (450) because the sleeve inner diameter (150) is less than the expansion section diameter (442).

Referring again to FIGS. 36-41, the contractible sleeve retainer (200) may be sized to extend beyond an end, or both ends, of the sleeve (100), and thereby also engage a portion of the expander (400). In one embodiment the contractible sleeve retainer (200) is specifically sized to extend beyond one or both ends of the sleeve (100) and engage the expander (400) at each end of the sleeve (100). This is particularly beneficial in a further embodiment in which the blind fastener includes factory installed thread lubricant, often referred to as anti-seize or bolt lubricant. Thread lubricant is often essential to achieve the necessary tension in blind fasteners used in structural connections. For example, looking at the embodiment of FIGS. 26-28, a thread lubricant may be applied to a portion of the tensioning section (450), the sleeve (100) may be positioned over the thread lubricant, and then the contractible sleeve retainer (200) may be applied to cover the assembly. The thread lubricant may include compositions of oil, grease, wax, graphite, and/or molybdenum disulfide. In one embodiment the thread lubricant includes a solid lubricant in a paste formulation to provide a consistent coefficient of friction and a paste that does not evaporate and is resistant to washout. Such solid lubricants include, but are not limited to, $MoS_2$, white solids, graphite, copper, zirconium dioxide, and PTFE. In one paste embodiment the base oil is a glycol, and in an even further embodiment the paste includes a polyalkylene glycol base oil. The contractible sleeve retainer (200) retains the thread lubricant and is constructed of an oil resistant material that does not break-down when it is in contact with the thread lubricant, and thereby prevents the thread lubricant from coming in contact with the installer's hands, which is very beneficial considering that these blind fasteners are often installed several hundred feet above the ground. Additionally, in another embodiment the expander (400) incorporates an anti-friction coating to provide a dry lubrication that does not attract dirt and dust such as a dry film lubricant spray. In a further embodiment at least a portion of the nut (500) includes an anti-friction coating, which in one embodiment is applied to the side of the nut (500) in contact with the washer system (600). In another embodiment at least a portion of the washer system (600) includes an anti-friction coating, which in one embodiment is applied to the portion of the washer system (600) that is in contact with the nut (500).

Figure 8:
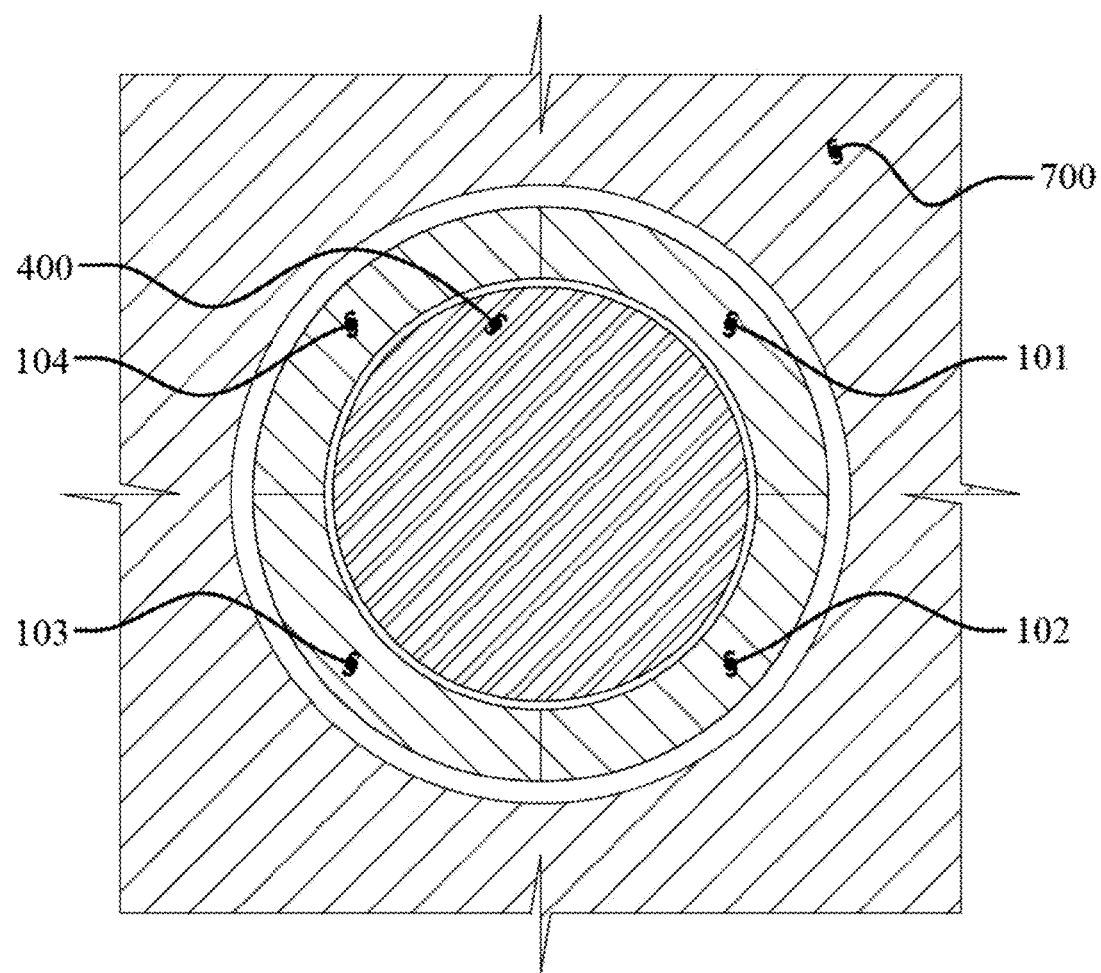
FIG. 8 is a cross-sectional view of an embodiment of a post-insertion pre-actuated blind fastener.

Alternatively, at least a portion of the sleeve retainer (200) may be elastic, which may include a sleeve retainer (200) having quasi-rubber band qualities and characteristics. In fact, the sleeve retainer (200) may be made of natural rubber, synthetic rubbers including, but not limited to, nitrile and butyl rubbers, and polymers. An elastic sleeve retainer (200) allows the sleeve engagement section (210) to stretch over the retainer engagement region (160), and also allows the sleeve (100) to expand when the expander (400) is drawn into the sleeve (100). Further, an elastic sleeve retainer (200) may be sized to remain in tension when cooperating with the retainer engagement region (160) to securely hold the two or more sleeve sections firmly in an aligned initial state, as seen in FIGS. 6 and 8.

Figure 6:
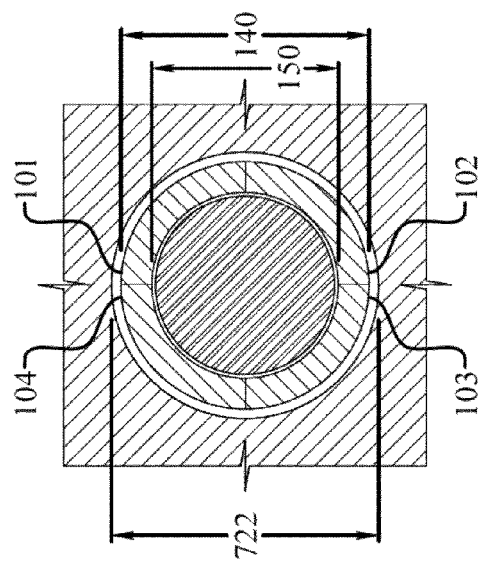
FIG. 6 is a cross-sectional view of an embodiment of a post-insertion pre-actuation blind fastener.
Figure 29:
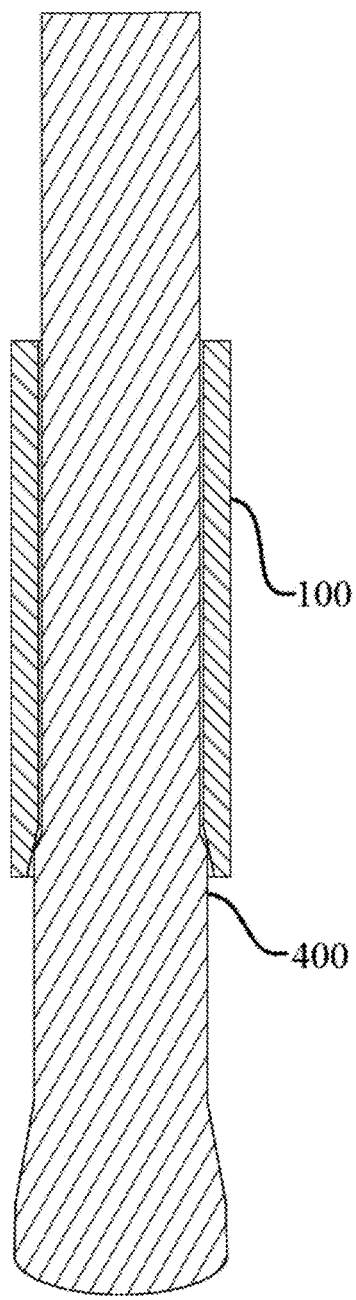
FIG. 29 is another embodiment of a cross-sectional view of a blind fastener.

Regardless of the type of sleeve retainer (200), the initial state of the sleeve (100), and the associated properties, are defined when the sleeve (100) is on the tensioning section (450) of the expander (400), as seen in FIG. 29, and in cross-section in FIG. 6. In some embodiments a multi-section sleeve (100) is assembled and then slid onto the tensioning section (450), while in other embodiments the multi-section sleeve (100) may be assembled on the tensioning section (450) and in effect using the expander (400) to aid in the assembly of the multi-section sleeve (100) until the sleeve retainer (200), or sleeve retainers (200), and/or shroud (300) are in position and keep the sleeve (100) in an assembled state. Regardless, at least one point along the sleeve length (155) has the sleeve inner diameter (150) in the initial state less than the maximum expansion section diameter (442), thereby preventing the majority of the sleeve (100) from coming in contact with the expansion section (440) until the blind fastener is in use, although as seen in FIG. 29 a portion of the sleeve throat (180), seen in FIG. 20, may extend beyond the expansion section transition (444) without resulting in an increase in the sleeve outer diameter (140). In the multi-section sleeve (100) embodiment of FIGS. 6 & 8, the edges of each sleeve section (101, 102, 103, 104) are in contact with the edges of the adjacent sleeve sections in the initial state, and a small gap is illustrated between the sleeve inner diameter (150) and the expansion section diameter (442). Thus, in this embodiment the sleeve retainer (200) and/or shroud (300) is applying a radial compressive force on the sleeve sections (101, 102, 103, 104) and maintaining their edges in contact, however in this position there is no radial compressive force transferred from the sleeve (100) to the expander (400) because the edges of the sleeve sections (101, 102, 103, 104) contact each other. However, one skilled in the art will appreciate that the sleeve sections (101, 102, 103, 104) may be sized so that the edges do not contact one another when positioned about the expansion section (440), and therefore the radial compressive force may be transferred from the sleeve (100) to the expander (400). In fact, in one embodiment the radial compressive force is large enough to overcome gravity and keep the sleeve (100) from sliding off the expander (400), even in the orientation of FIG. 29, rotated 180 degrees; and in one embodiment the radial compressive force is at least 1 lbf, while in a further embodiment it is at least 2.5 lbf, and in yet another embodiment it is at least 5 lbf. The sleeve (100) also has an expanded state which defines the characteristics of the sleeve (100) when a portion of the expansion section (440) of the expander (400) has been drawn into the structural region (170) of the sleeve (100) and expanding at least a portion of the structural region (170) of the sleeve (100) from the initial state to this expanded state. Further, as a portion of the locking section (430) is drawn past the sleeve distal end (130) toward the sleeve proximal end (120), it expands, or deforms, at least a portion of the sleeve distal end (130) to a locked state, as seen in FIGS. 13 and 15.

In the embodiments in which at least one point along the sleeve length (155) has the sleeve inner diameter (150) in the initial state less than the maximum expansion section diameter (442), thereby preventing the majority of the sleeve (100) from coming in contact with the expansion section (440) until the blind fastener is in use, one benefit is the to ease of installation of the blind fastener into the first and second workpiece openings (722, 822). Furthermore, the sleeve retainer (200) may be located on and overlap the sleeve distal end (130) thereby forming a sleeve retainer protrusion (230). The sleeve retainer protrusion has a sleeve retainer protrusion length (232) and a sleeve retainer protrusion width (234), as seen in FIG. 48. The retainer protrusion width (234) may have the same thickness as the fully contracted sleeve retainer (200). Alternatively, in one embodiment, the retainer protrusion width (234) may have a thickness that is at least 10-50% greater than the sleeve retainer (200) sleeve engagement section outer diameter (216) minus the sleeve engagement section inner diameter (214). In another embodiment, the retainer protrusion width (234) may have a thickness that is at least 15% to 30% greater than the sleeve retainer (200) sleeve engagement section outer diameter (216) minus the sleeve engagement section inner diameter (214). The sleeve retainer protrusion (230) provides the benefit of aiding in the alignment and installation of the blind protective fastener and also helps shield wires, cables and other important infrastructure from sharp edges that may form on the expanding sleeve distal end (130) during installation. The sleeve retainer (200) may cooperate with the sleeve proximal end (120), as seen in FIGS. 19 and 20, or may be located at other locations throughout the length of sleeve (100). One advantage of the sleeve retainer (200) located on the sleeve proximal end (120) is that it allows for a greater surface area of the structural region (170) to be in contact with the walls of the first and second workpiece openings (722, 822) and does not run the risk of aligning with the workpiece interface (900) which would create an elastic void in the shear plane. Further, in another embodiment the shroud (300), located at the opposite end of the blind fastener, may also be elastic and stretch over the shroud engagement region (190), and also allows the sleeve (100) to expand when the expander (400) is drawn into the sleeve (100). Further, the shroud (300) may be sized to remain in tension when cooperating with the shroud engagement region (190) to securely hold the two or more sleeve sections firmly in an aligned initial state, as seen in FIGS. 6 and 8. Thus, the sleeve retainer (200) may exert a retainer force on the sleeve (100), and if present, the shroud (300) may exert a shroud force on the sleeve (100). In one embodiment a first retainer force is applied to the sleeve proximal end (120) and a second retainer force is applied to the sleeve distal end (130); and the second retainer force is ±20% of the first retainer force to present a relatively balanced load on the sleeve (100). In yet a further embodiment these elements and their associated forces are located at opposite ends of the sleeve (100) and they are designed so that retainer force is ±50% of the shroud force, while in another embodiment the retainer force is ±25% of the shroud force, and in an even further embodiment the retainer force is ±10% of the shroud force. Such balanced compressive loading of the sleeve (100) ensures the individual sections of the sleeve (100) remain in the desired position in the initial state and simplify the assembly process.

In yet another embodiment, the sleeve retainer (200) may be made of a non-elastic non-contractible material such as, but not limited to, a non-elastic plastic or metal band, having a sleeve engagement section (210), which slips around, or is wrapped around, the retainer engagement area (160); wherein the retainer engagement region diameter (168) is approximately the same as the sleeve retainers (200) sleeve engagement section inner diameter (214). Furthermore, the sleeve retainer (200) may be further secured to the sleeve (100) by a layer of adhesive located between the retainer engagement area (160) and the sleeve engagement section (210).

Figure 17:
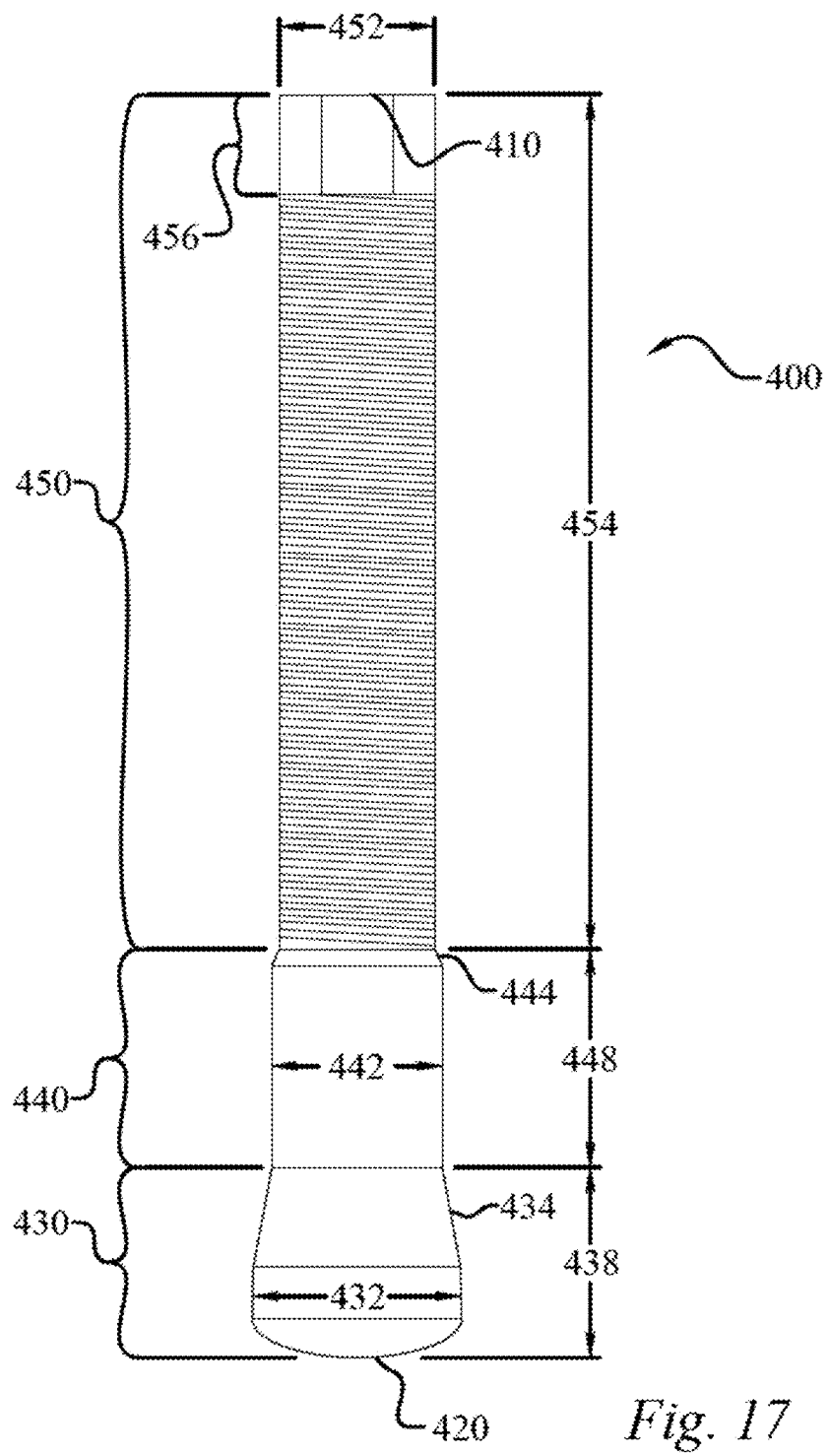
FIG. 17 is a plan view of an expander embodiment.
Figure 18:
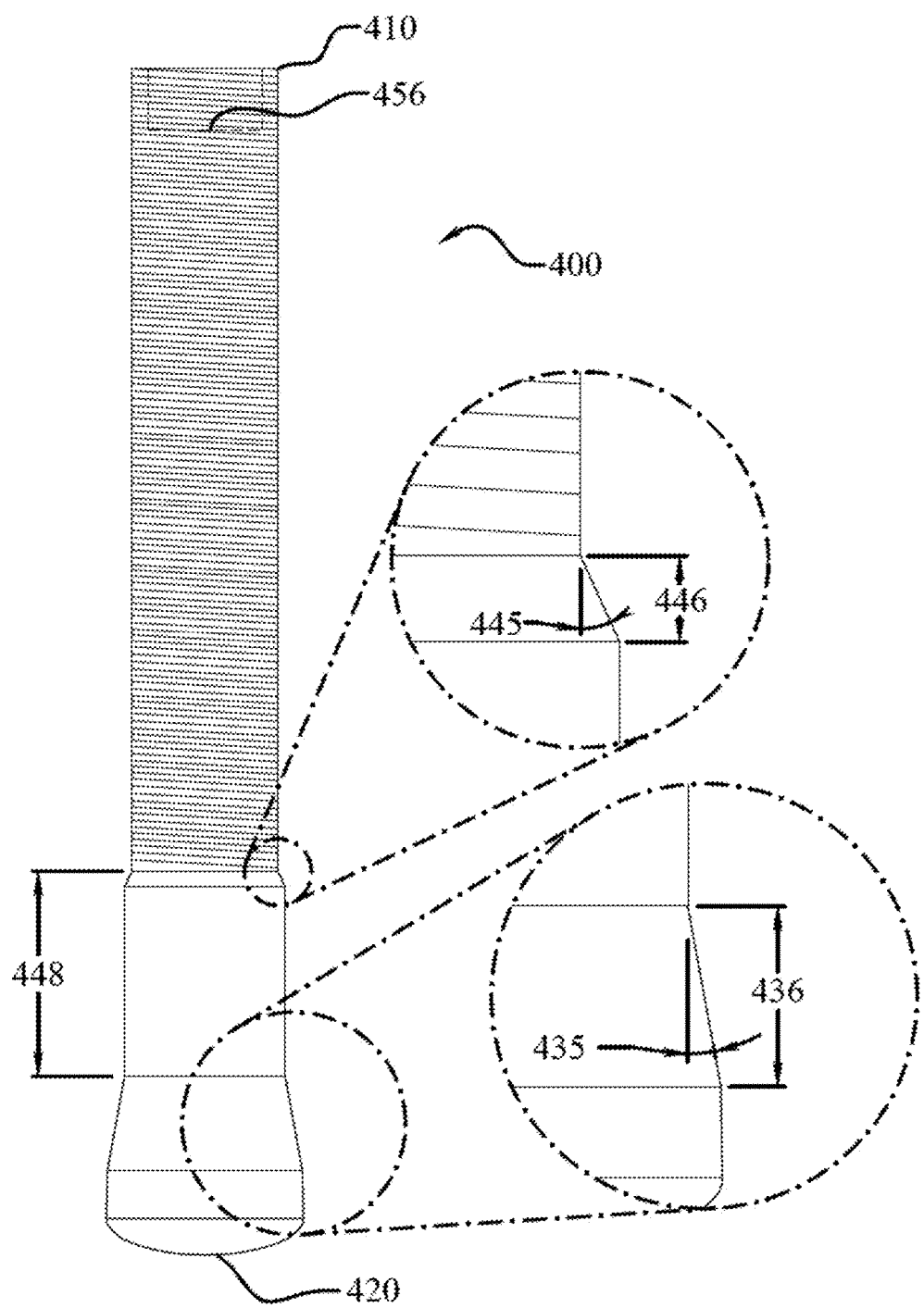
FIG. 18 is a plan view of another expander embodiment.

Now turning to the expander (400), as seen in FIGS. 17, 18, 25, and 26, it has an expander proximal end (410), an expander distal end (420), a tensioning section (450), a locking section (430), and an expansion section (440) between the tensioning section (450) and the locking section (430). The tensioning section (450) has a tensioning section diameter (452) and a tensioning section length (454). Additionally, the locking section (430) has a locking section diameter (432), and the expansion section (440) has an expansion section diameter (442) and an expansion section transition (444), as illustrated in FIG. 17. In some embodiments the tensioning section (450) may include a tensioning section gripping region (456), which may be an external surface as seen in FIG. 17, or an internal socket as seen in FIG. 18.

All of the disclosed relationships herein, including the lengths, angles, diameters, thicknesses, strength, elongation, and hardness, among the various portions of the expander (400) and the various portions of the sleeve (100), play an important role in the ease of installation and performance of the blind bolt, particularly when the blind fastener must be installed with a preload of at least 70,000 lbf. As previously touched upon one application of the blind fastener is in tower construction, and specifically in wind turbine tower construction. In such applications the tower is structural steel, and therefore the bolting in the tower splices must come under the Research Council on Structural Connections. This is the North American body that writes the design and installation specifications which govern all bolted structural steel connections. The only way to ensure that the bolts are going to survive in service is to get them uniformly tightened, read tensioned or loaded, to a very high percentage of their strength, which is the best insurance against loosening because the correctly tensioned bolts will not see very much change in tension as the external service loads vary. Correctly tensioned fasteners only experience a small percentage change in tension as external loads vary and therefore have an extremely long, practically infinite, fatigue life. However, if the fasteners are not tensioned correctly they will experience a large percentage change in tension, cyclically, and their residual clamping force will gradually diminish. Once the clamping force has dropped significantly, every cycle of external load will change the force in the fastener by a very high percentage, and the fatigue life of the fastener will limit its serviceability. Unlike many fasteners, the present blind fastener is specifically designed to encourage proper tensioning of the expander (400) and radial expansion of the sleeve (100) to engage the workpieces (700, 800), while still improving upon the ease of installation and incorporating protective features. In one particularly effective embodiment the expansion section diameter (442) is at least 7.5% greater than the tensioning section diameter (452), and the locking section diameter (432) is at least 15% greater than the expansion section diameter (442), while the structural region (170) has a structural region wall thickness (172) that is less than a difference between the locking section diameter (432) and the tensioning section diameter (452). While the previous embodiment includes a minimum relationship between the expansion section diameter (442) and the tensioning section diameter (452), as well as the locking section diameter (432) and the expansion section diameter (442), another embodiment recognizes preferred performance in a range with an upper boundary. In this embodiment the expansion section diameter (442) is no more than 15% greater than the tensioning section diameter (452); while in an even further embodiment the locking section diameter (432) is no more than 30% greater than the expansion section diameter (442), thereby providing a blind fastener that does not require drastically oversized workpiece openings (720, 820) and improves shear load distribution to the blind fastener at the workpiece interface (900).

With reference to FIGS. 17, 18, and 20, the locking section (430) has a locking section transition length (436) and a locking section transition angle (435), the expansion section (440) has an expansion section transition length (446) and an expansion section transition angle (445), and the structural region (170) of the sleeve (100) has a structural region length (174). The relationships of these lengths and angles promotes preferred loading of the expander (400) to achieve the necessary preload, as well as expansion of sleeve (100) to engage the workpieces (700, 800). In one such embodiment the locking section transition length (436) is at least twice the expansion section transition length (446), and the expansion section length (448) is at least 25% of the structural region length (174).

In a further embodiment the expansion section length (448) is 25-75% of the structural region length (174), further providing great flexibility for the blind fastener and assuring a solid plane of the sleeve (100) and the expansion section (440) at the workpiece interface (900). As seen in FIG. 20, the sleeve distal end (130) has a sleeve throat (180) having a throat length (182) and a throat angle (184). In one embodiment the throat angle (184) is 5-50 degrees, and the throat angle (184) is less than the expansion section transition angle (445), seen in FIG. 18, thereby providing a rather distinct point of expansion of the sleeve (100), which allows for gradual loading of the expander (400) as the expansion section transition (444) wedges the sleeve (100) radially against the workpieces (700, 800) as the expander (400) is drawn into the sleeve (100). Additionally, this virtually immediate engagement of the interior of the sleeve (100) with the expansion section (440), within five rotations of the nut (500) around the tensioning section (450), and the associated engagement of the exterior of the sleeve (100) with the workpieces (700, 800) allows the blind fastener to be installed with a single tool rotating the nut (500), without the need for a second specialized tool to hold the sleeve (100) and/or expander (400) and prevent them from rotating. While the sleeve (100) and/or expander (400) may rotate initially for five seconds or less, by the time the nut (500) has rotated around the tensioning section (450) five times the sleeve (100) will have engaged the workpieces (700, 800) and the expansion section (440) will have engaged the sleeve (100) such that sleeve (100) and the fastener (400) no longer rotate.

In another embodiment the relationships of these lengths and angles achieve engagement within three rotations of the nut (500) around the tensioning section (450) in a time period of less than two seconds. In a further embodiment embracing the initial rapid radial expansion of the sleeve (100) over the expansion section transition (444) and later gradual deformation of the sleeve distal end (130) by the locking section transition (434) and final loading of the expander (400), the locking section transition angle (435) is less than 50% of the expansion section transition angle (445). In an even further embodiment the throat angle (184) is greater than locking section transition angle (435); while in another embodiment the throat angle (184) is at least 5 degrees less than the expansion section transition angle (445), and the throat angle (184) is no more than 15 degrees greater than locking section transition angle (435). This preferential loading is exhibited in another embodiment in which the throat length (182) is greater than the expansion section transition length (446), and the locking section transition length (436) is greater than the expansion section transition length (446). In one particular embodiment the length of the expander (400) from the expander proximal end (410) to the expander distal end (420) is at least 100 mm, while in another embodiment it is at least 150 mm, and is at least 200 mm in a further embodiment. Additionally, in one embodiment of the blind fastener the tensioning section diameter (452) is at least 0.75", while in another embodiment it is at least 1.25", and is at least 2.0" in a further embodiment. Such long lengths and large diameters require unique relationships to ensure ease of installation, engagement of the sleeve (100), and the ability to achieve the necessary tension in the expander (400); relationships that are largely irrelevant to conventional length and diameter blind bolt assemblies. The surface of the locking section transition (434) may include a friction enhancing surface pattern to reduce the likelihood of the sleeve (100) and expander (400) rotating with respect to one another once the locking section transition (434) has engaged the sleeve (100). In one such embodiment the surface pattern is a friction promoting stippling pattern, whereas in another embodiment it includes a series of longitudinal channels.

Figure 23:
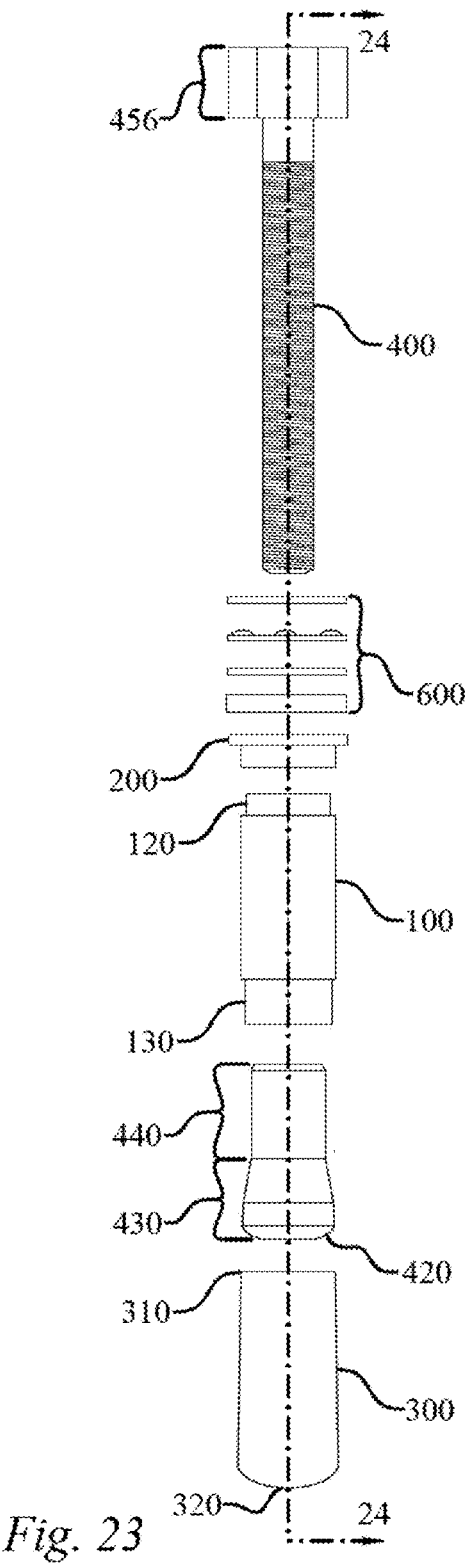
FIG. 23 is another embodiment of an exploded view of a blind fastener.
Figure 24:
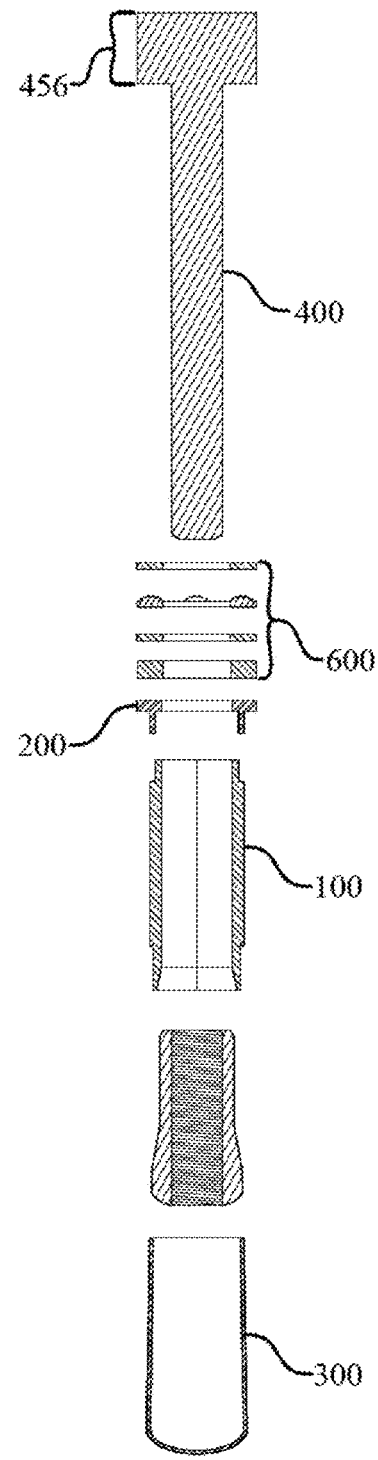
FIG. 24 is another embodiment of a cross-sectional exploded view of a blind fastener.

Further, in one embodiment the tensioning section diameter (452) is 75 to 95% the diameter of the expansion section (440). The tensioning section (450) may utilize a threaded system, shown in FIGS. 17, 18, 23 and 25, to actuate the expander (400) while putting the blind fastener in a locked state by rotational forces applied to either the nut (500), or in some embodiments the tensioning section gripping region (456). Testing has shown that an advantage of the present invention is that a tensioning section gripping region (456) is not actually required to prevent the expander (400) from rotating as the nut (500) is turned to draw the expander (400) into the sleeve (100). The tight fit of the expander (400) and the edges of the sleeve (100) cooperate to prevent the expander (400) from rotating as the nut (500) rotates and draws the expander (400) into the sleeve (100). In one particular embodiment at least a portion of the expander (400) is composed of material having a Rockwell B-Scale hardness that is at least 10 units higher than the Rockwell B-Scale hardness of the sleeve (100), while in a further embodiment the Rockwell B-Scale hardness differential is at least 15 units, and in an even further embodiment the Rockwell B-Scale hardness differential is at least 20 units. In even further embodiments the tensioning section gripping region (456) may be in the form of bolt head, as seen in FIGS. 23 and 24, or recessed in the expander proximal end (410), as seen in FIG. 18.

Figure 10:
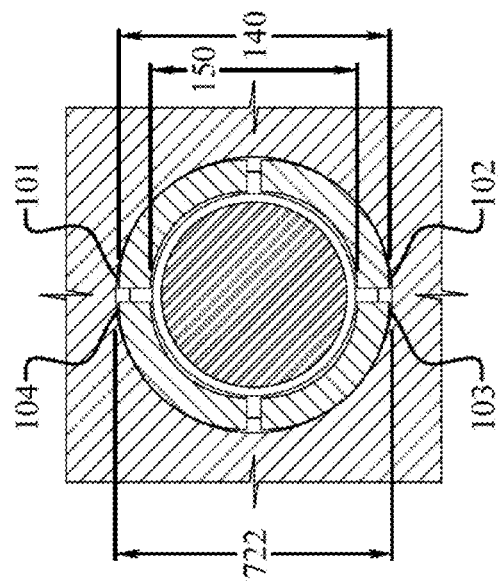
FIG. 10 is a cross-sectional view of an embodiment of a post-insertion partial-actuated blind fastener.
Figure 9:
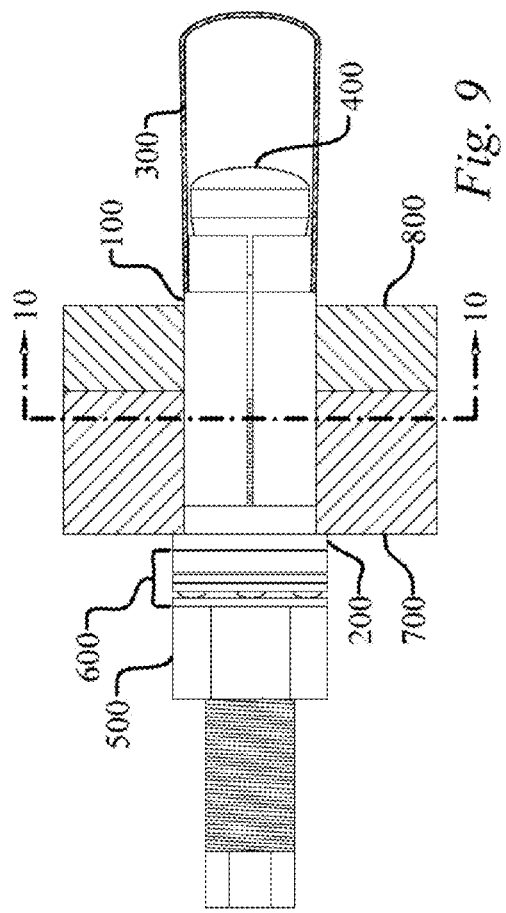
FIG. 9 is a plan view of an embodiment of a post-insertion partial-actuated blind fastener with the shroud and workpieces shown in section for clarity.
Figure 11:
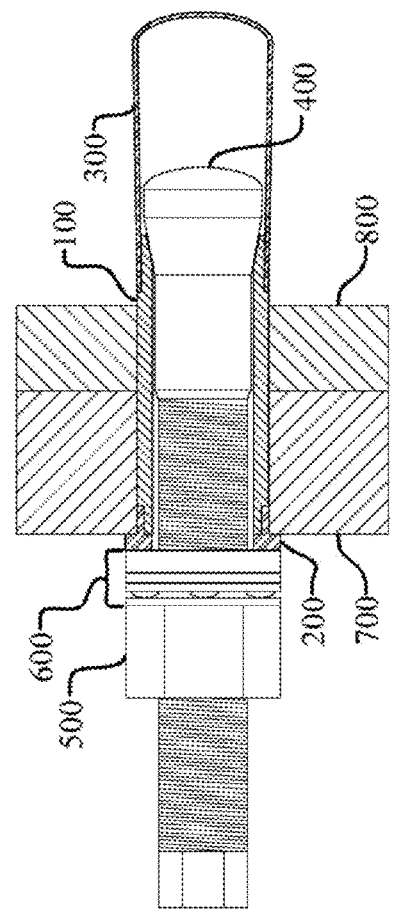
FIG. 11 is a partial cross-sectional view of an embodiment of a post-insertion partial-actuated blind fastener.

The expansion section (440) serves the purpose of expanding the sleeve (100) so that the sleeve outside diameter (140) is approximately the same as the first workpiece opening diameter (722) and second workpiece opening diameter (822), as illustrated in FIGS. 9-11, while exerting a substantial radial load on the openings (720, 820). In one embodiment, the pre-installed sleeve inner diameter (150) is 3 to 20% smaller than the expansion section diameter (442). In another embodiment, the pre-installed sleeve inner diameter (150) is 5 to 15% smaller than the expansion section diameter (442). In yet another embodiment, the expansion section diameter (442) is 5 to 20% smaller than the locking section diameter (432). In another embodiment the expansion section diameter (442) is 7.5 to 15% smaller than the locking section diameter (432). However, in an alternative set of embodiments the pre-installed sleeve inner diameter (150) is approximately equal to, or larger than, the expansion section diameter (442); thus in a further embodiment the pre-installed sleeve inner diameter (150) is 0.1 to 10% larger than the expansion section diameter (442), while in another embodiment it is 1 to 5% larger than the expansion section diameter (442), and in an even further embodiment it is 2.5 to 5% larger than the expansion section diameter (442).

In order to ensure proper alignment and ingress of the expander (400), the expansion section (440) has an expansion section transition (444), as seen in FIG. 18, having an expansion section transition angle (445) and expansion section transition length (446). In combination, the section transition angle (445) and expansion section transition length (446) form a ramp that engages the sleeve throat (180), thereby feeding the expansion section (440) into the sleeve (100) when the protective blind faster is actuated. Furthermore, in one embodiment the expansion section transition angle (445) is 5-50 degrees, while in a further embodiment the expansion section transition angle (445) is 10-45 degrees, and in an even further embodiment the expansion section transition angle (445) is 15-30 degrees. In one embodiment the expansion section transition angle (445) is equal to the throat angle (184). A further variation incorporates an expansion section transition angle (445) that is at least 1 degree greater than the throat angle (184), but preferably less than 5 degrees greater than the throat angle (184).

The locking section diameter (432) may be 5-25% larger than expansion section diameter (442), but the locking section diameter (432) may be equal to, or less than the sleeve outer diameter (140). In another embodiment, the locking section diameter (432) is 1-10% smaller than the sleeve outer diameter (140). These unique relationships of the diameters ensure that the components of the blind fastener are compactly configured for installation, yet the expansion section (440) serves to expand the sleeve (100) so that the sleeve (100) and the expansion section (440) completely fill the first workpiece opening (720) and second workpiece opening (820) to create a solid metal shear plane at the workpiece interface (900).

Figure 25:
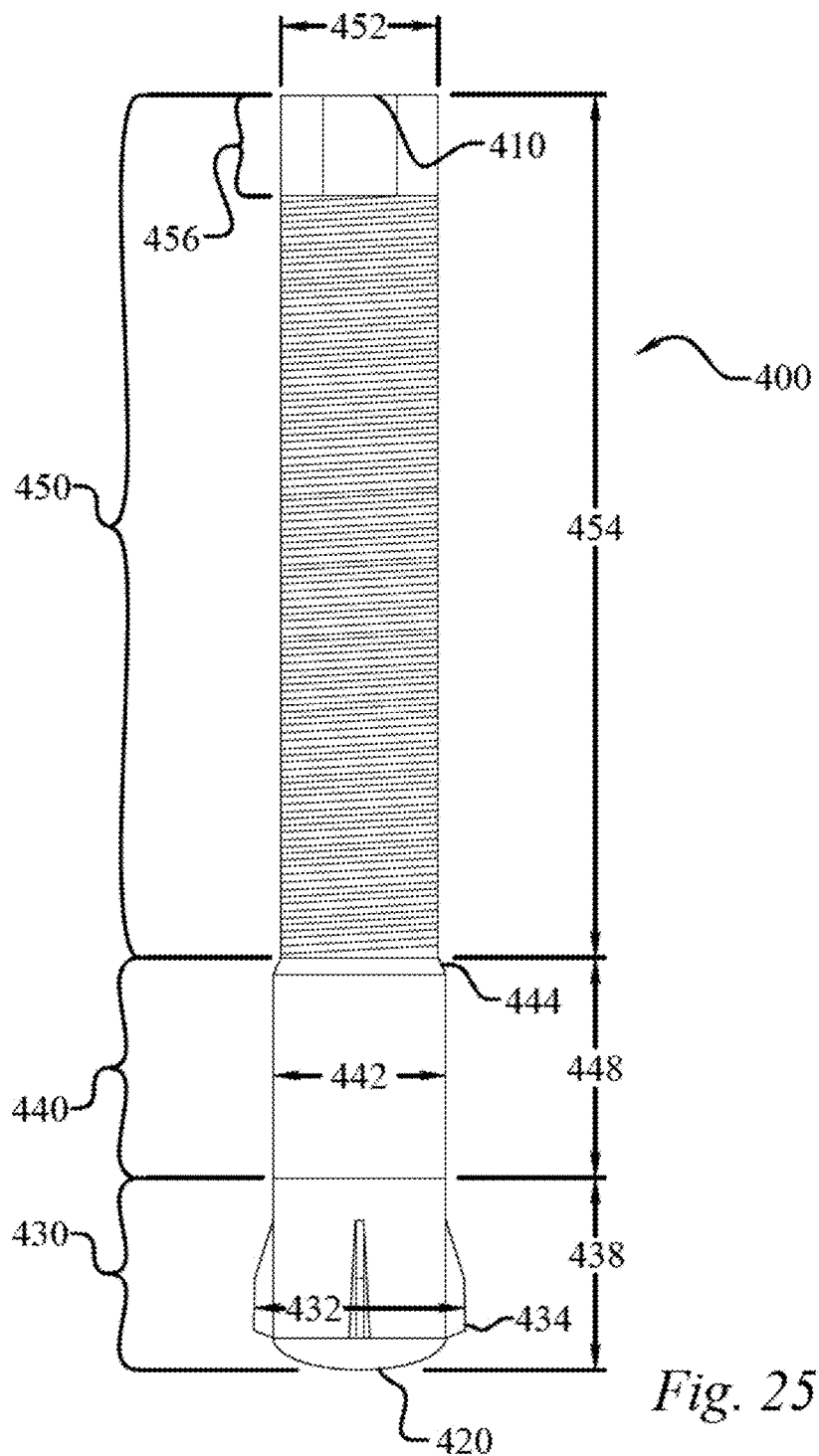
FIG. 25 is a plan view of another expander embodiment.

Furthermore, the locking section (430) has an overall locking section length (438) that includes a locking section transition (434) that has a locking section transition angle (435) and a locking section transition length (436), as illustrated in FIGS. 17 and 18. In combination, the locking section transition angle (435) and a locking section transition length (436) form a ramp that engages the sleeve proximal end (120) and deforms the sleeve (100), thereby locking the blind fastener into place. In another embodiment, the locking section (430) includes a plurality of individual ramps, each having their own the locking section transition angle (435) and a locking section transition length (436), as seen in FIG. 25. In one embodiment the locking section transition angle (435) is 5-50 degrees, while in a further embodiment the locking section transition angle (435) is 10-45 degrees, and in an even further embodiment the locking section transition angle (435) is 15-30 degrees. In one embodiment the locking section transition angle (435) is equal to the throat angle (184). A further variation incorporates a locking section transition angle (435) that is at least 1 degree greater than the throat angle (184), but preferably less than 5 degrees greater than the throat angle (184).

Furthermore, in one embodiment, the locking section diameter (432), seen in FIG. 17, is 0-5% smaller than the sleeve (100) retainer engagement region diameter (168), seen in FIG. 20. In another embodiment, the locking section diameter (432) is 1-20% larger than the sleeve (100) retainer engagement region diameter (168). In yet another embodiment, the locking section diameter (432) is 5-15% larger than the sleeve (100) retainer engagement region diameter (168).

In an alternative embodiment of the blind fastener, the expander (400) is composed of a tensioning section (450) that is separate and distinct from an expansion section (440), as seen in FIGS. 23 and 24. In this embodiment, tensioning section (450) engages threads in a bore located in the part composed of the expansion section (440) and locking section (430). As the tensioning section (450) is actuated, the part composed of the expansion section (440) and locking section (430) is drawn into the sleeve (100), thereby locking the blind protective fastener into place.

Referring back to FIG. 17, one particular embodiment has an expansion section diameter (442) that is 7.5-15% greater than the tensioning section diameter (452), and a locking section diameter (432) that is 15-30% greater than the expansion section diameter (442). In a further embodiment the locking section transition length (436) is at least twice the expansion section transition length (446), and the expansion section length (448) is at least 25% of the structural region length (174). In yet a further embodiment the expansion section length (448) is 25-75% of the structural region length (174). Another embodiment incorporates a locking section transition length (436) that is greater than the shroud engagement region length (192). These relationships provide preferred radial and longitudinal loading of the sleeve (100), while facilitating smooth ingress of the expander (400) into the sleeve (100) and preferred deflection of the sleeve distal end (130) for secure locking of the workpieces.

In one embodiment, seen in FIG. 26, the expander (400) includes a region of expander indicia (460) that is discernable by a person, such as an inspector or foreman, analyzing the installed blind fastener using binoculars from a distance of at least 100 yards. The expander indicia (460) easily informs a user of an attribute of the blind fastener. For instance in one embodiment the expander indicia (460) is a color coded region on the expander (400). In one embodiment the color of the expander (400) is indicative of the length of the blind fastener, or the thickness of the workpiece joint that may be joined via the blind fastener; whereas in another embodiment the color is indicative of the diameter of the blind fastener, or the size of the opening in the workpieces that may be joined via the blind fastener. For example, in one embodiment the expander indicia (460) is indicative of the allowable joint thickness to be joined via a specific blind fastener, and the indicia (460) is visible from long distances. Thus, an inspector would be able to remain on the ground consulting the blueprints of a new tower and then look up at the constructed tower and identify whether the blind fastener identified on the plans was indeed the one used in construction. In one embodiment the expander indicia (460) covers at least 25% of the exposed surface area of the tensioning section (450), located external to the workpieces (700, 800) and nut (500); while in a further embodiment the expander indicia (460) covers at least 50% of the exposed surface area; and in yet a further embodiment the expander indicia (460) covers at 1.0 square inch of the tensioning section (450). In one embodiment the color coded expander indicia (460) also corresponds with the color coding of the sleeve retainer (200), thereby creating a system in which the installer can easily identify the proper blind fastener for a particular locations and install it, and then the inspector can easily verify from a distance that the proper blind fastener was indeed installed.

Figure 51:
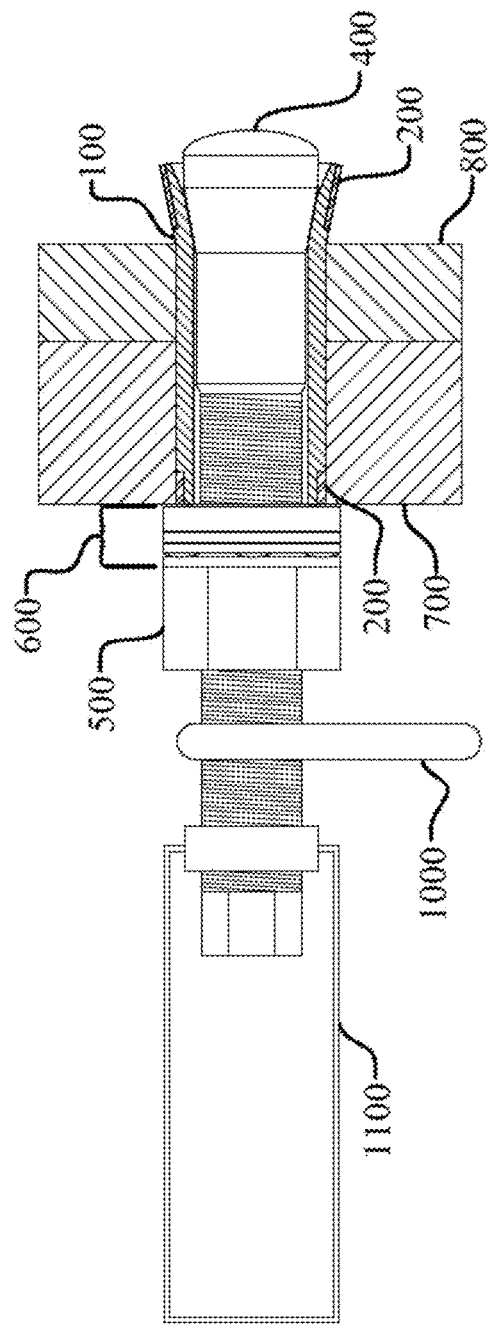
FIG. 51 is a partial cross-sectional view of an embodiment of a post-insertion fully-actuated blind fastener.

Additionally, as seen in FIG. 51, the externally exposed portion of the expander (400) may serve many important functions. For instance, the tensioning section (450), which is generally threaded, may provide an extra inch or more of available real estate along the exposed portion of the tensioning section (450) to attach any number of accessories, including, but not limited to, an anchor (1000), or an attachment device (1100), such as the illustrated step. Such anchors (1000) are particularly important during the construction of a tower and provide workers with virtually limitless locations to tie-off their safety lines. Additionally the anchors (1000) may be used with suspension equipment such as a suspended hoist work platform, lift, or bosun's chair. Further, this blind fastener design's extra inch or more of available real estate along the exposed portion of the tensioning section (450) provides great flexibility for later reinforcing of the tower, for instance as the technology of wind generators advances and necessitate the tower to support greater loads.

In one particular embodiment the blind fastener has a sleeve (100) having a sleeve proximal end (120), a sleeve distal end (130), a sleeve outer diameter (140), a sleeve inner diameter (150), a retainer engagement region (160), and a structural region (170), as seen in FIGS. 19 and 20. Additionally, the blind fastener has a sleeve retainer (200) having a sleeve engagement section (210) that cooperates with the retainer engagement region (160) to maintain the sleeve (100) in an initial state. In addition to the sleeve retainer (200), the blind fastener has an expander (400) having an expander proximal end (410), an expander distal end (420), a tensioning section (450), a locking section (430), and an expansion section (440) between the tensioning section (450) and the locking section (430), wherein the expansion section (440) has an expansion section diameter (442) and an expansion section transition (444), as seen in FIG. 17, and at least one point along the length of the sleeve (100) has the sleeve inner diameter (150) in the initial state less than the maximum expansion section diameter (442). Furthermore, the blind fastener may have a shroud (300) that cooperates with a portion of the sleeve (100) and encloses at least a portion of the expander (400) and a portion of the sleeve (100), as seen in FIGS. 5, 7, 9, 11, 13 and 15. The blind fastener has a nut (500) wherein a portion of the expander (400) passes through the sleeve (100) to cooperate with the nut (500) so that relative rotation of the expander (400) and nut (500) draws the expander distal end (420) toward the sleeve proximal end (120), thereby drawing a portion of the expansion section (440) of the expander (400) into the structural region (170) of the sleeve (100), as seen in FIG. 11, and expanding at least a portion of the structural region (170) of the sleeve (100) from the initial state to an expanded state, as seen in FIG. 12. This also draws a portion of the locking section (430) past the sleeve distal end (130) toward the sleeve proximal end (120) and expands at least a portion of the sleeve distal end (130) to a locked state whereby the sleeve distal end (130) has been deformed to the point that it is larger than the opening in the workpieces and therefore cannot be withdrawn, as seen best in FIG. 15. In some embodiments a shroud (300), or a portion of a sleeve distal end (120) sleeve retainer (200) as seen in FIG. 48, encloses a portion of the sleeve (100) in the locked state as seen in FIGS. 13 and 15. Thus, the shroud (300), or sleeve distal end (120) sleeve retainer (200), must accommodate both the radial expansion from the initial state to the expanded state as the expansion section (440) forces the sleeve (100) outward and into contact with the workpieces, as well as accommodate the change in shape of the sleeve distal end (130) as the locking section (430) bends the sleeve distal end (130) outward.

In one embodiment the blind fastener's minimum sleeve inner diameter (150) increases at least 2.5% from the initial state to the expanded state to fill both the first and second workpiece openings (722, 822). The expanding sleeve serves to eliminate any movement in the workpieces in relation to one another due to loose fitting fasteners; reduces the likelihood of fasteners failings due to shear loading on the fastener; and allows the blind fastener to lock into place. As seen in FIGS. 9, 10, and 11, the blind fastener has expanded so that the shear plane, located at the workpiece interface (900), is effectively completely filled with the structural material of the sleeve (100) and expansion section (440). Further, the blind fastener has forced the first workpiece (700) and the second workpiece (800) together to reduce the likelihood of any voids in this high stress area. The ability to have radial expansion of the sleeve (100) from the initial state to the expanded state ensures that workers will not oversize the openings in the workpieces, as is often the case, which leads to loose joints, misalignment, and shear plane problems. Another embodiment provides even further flexibility by having the blind fastener's minimum sleeve inner diameter (150) increase at least 3.5% from the initial state to the expanded state to fill both the first and second workpiece openings (722, 822); while an even further embodiment has found a preferential range of expansion of minimum sleeve inner diameter (150) to be 2.5-5% from the initial state to the expanded state.

Figure 16:
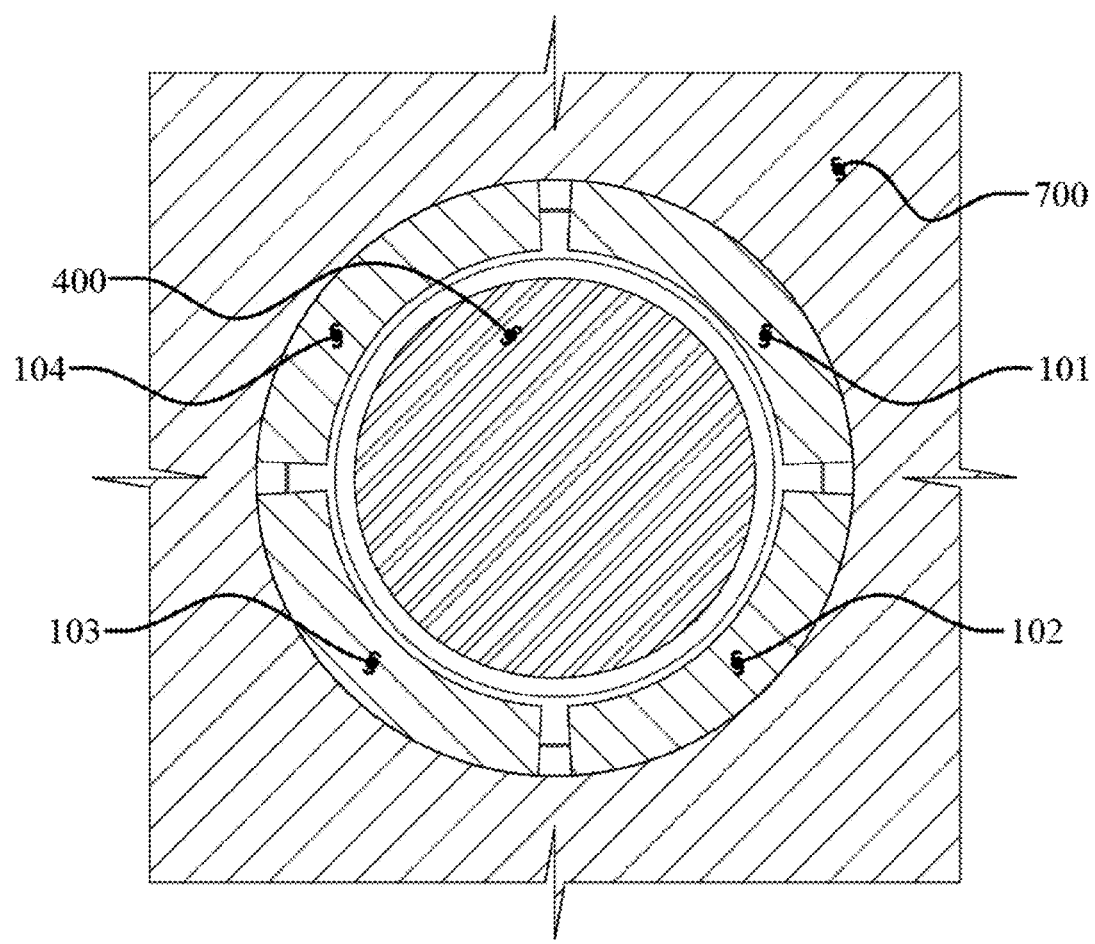
FIG. 16 is a cross-sectional view of an embodiment of a post-insertion fully-actuated blind fastener.

In the embodiment of FIG. 5, the blind fastener has been inserted into the workpieces but has not yet been actuated, meaning the expansion section (440) of the expander (400) has not yet been drawn into the sleeve (100), as shown in FIG. 7. Therefore, in one embodiment, as seen in FIG. 8, at least a portion of the edges of each sleeve section (101, 102, 103, 104) are in contact with the edges of the adjacent sleeve sections in the initial state, and a portion of any, or all, of the sleeve sections (101, 102, 103, 104) may be in contact with a portion of the tensioning section (450) of the expander (400). In fact, in one embodiment at least 50% of the surface area of the edges of each sleeve section (101, 102, 103, 104) are in contact with the adjacent sleeve section's edge, and at least a portion of abutting edges are substantially parallel. In a further embodiment, in the unactuated state, the interior surface of each sleeve section is in contact with the exterior surface of the threads of the tensioning section (450) throughout at least 50% of the sleeve length (155). In yet another embodiment illustrated in FIGS. 6 and 8, 100% of the surface area of the edges of each sleeve section (101, 102, 103, 104) are in contact with the adjacent sleeve section's edge, and at least a portion of abutting edges are substantially parallel in the unactuated state, and the interior surface of each sleeve section is in contact with the exterior surface of the threads of the tensioning section (450) throughout at least 75% of the sleeve length (155). FIGS. 9-12 illustrate the changes to FIGS. 5-8 when the blind fastener is partially-actuated, meaning that the expansion section (440) has entered the sleeve (100) and resulted in radial expansion of the sleeve (100). Further, FIGS. 13-16 illustrate the changes to FIGS. 5-12 when the blind fastener is fully-actuated, meaning that at least a portion of the locking section (430) has entered the sleeve (100) and resulted in further radial expansion of at least a portion of the sleeve throat (180). In series of figures of just one possible embodiment since the radius of curvature of the interior surface of the sleeve sections (101, 102, 103, 104) is within 5% of the radius of curvature of the exterior surface of the tensioning section (450), a small gap between the inner surface of the sleeve sections (101, 102, 103, 104) and the exterior surface of the expansion section (440) appears in the partially-actuated state seen in FIG. 12 until the sleeve sections (101, 102, 103, 104) are slightly bent as the tensile load is further applied to the blind fastener and the fully-actuated state is reached, as seen in FIG. 16, and there is complete surface contact between the inner surface of the sleeve sections (101, 102, 103, 104) and the exterior surface of the expansion section (440), as well as the exterior surface of the sleeve sections (101, 102, 103, 104) and the interior surface of the workpieces (700, 800). This deformation of the sleeve (100) allows the blind fastener system to compensate for any irregularities in the workpiece openings (720, 820).

Figure 57:
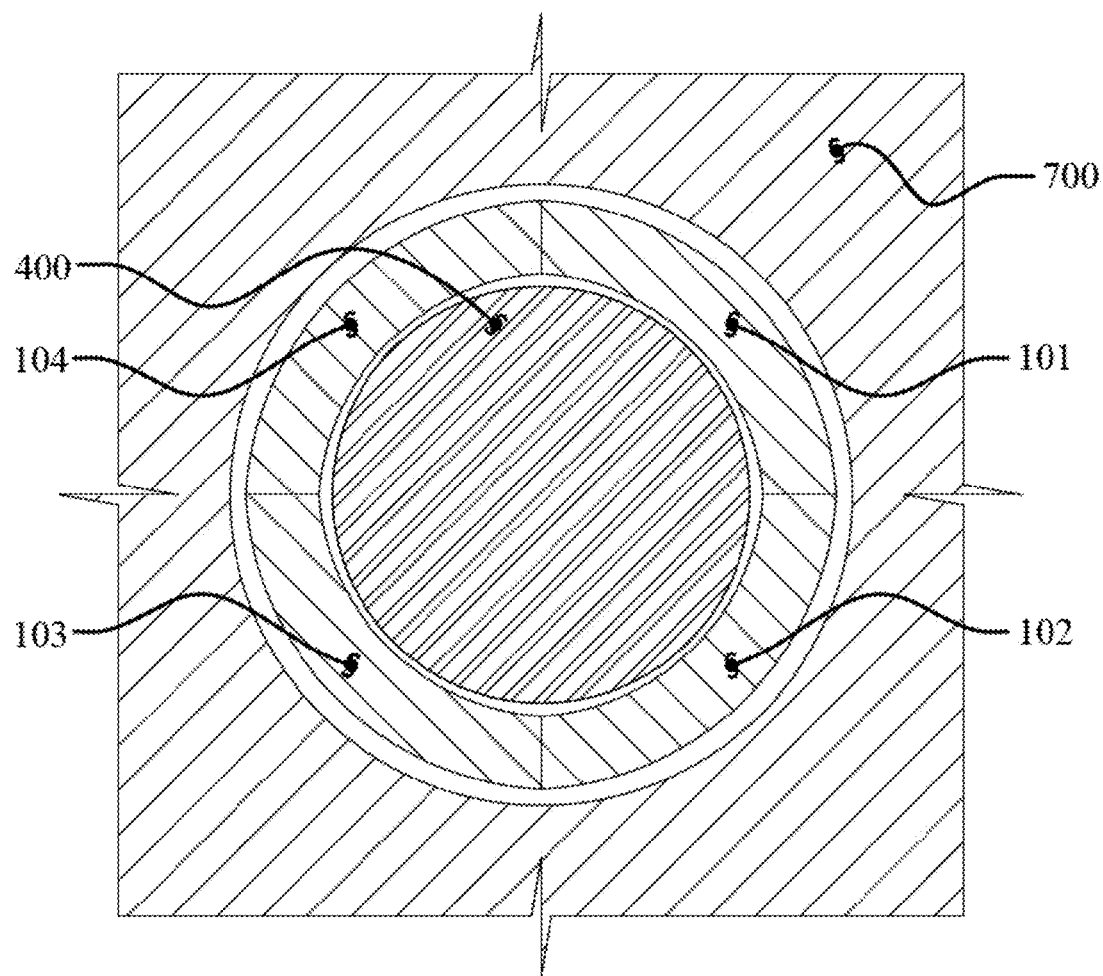
FIG. 57 is a cross-sectional view of an embodiment of a post-insertion pre-actuated blind fastener.
Figure 58:
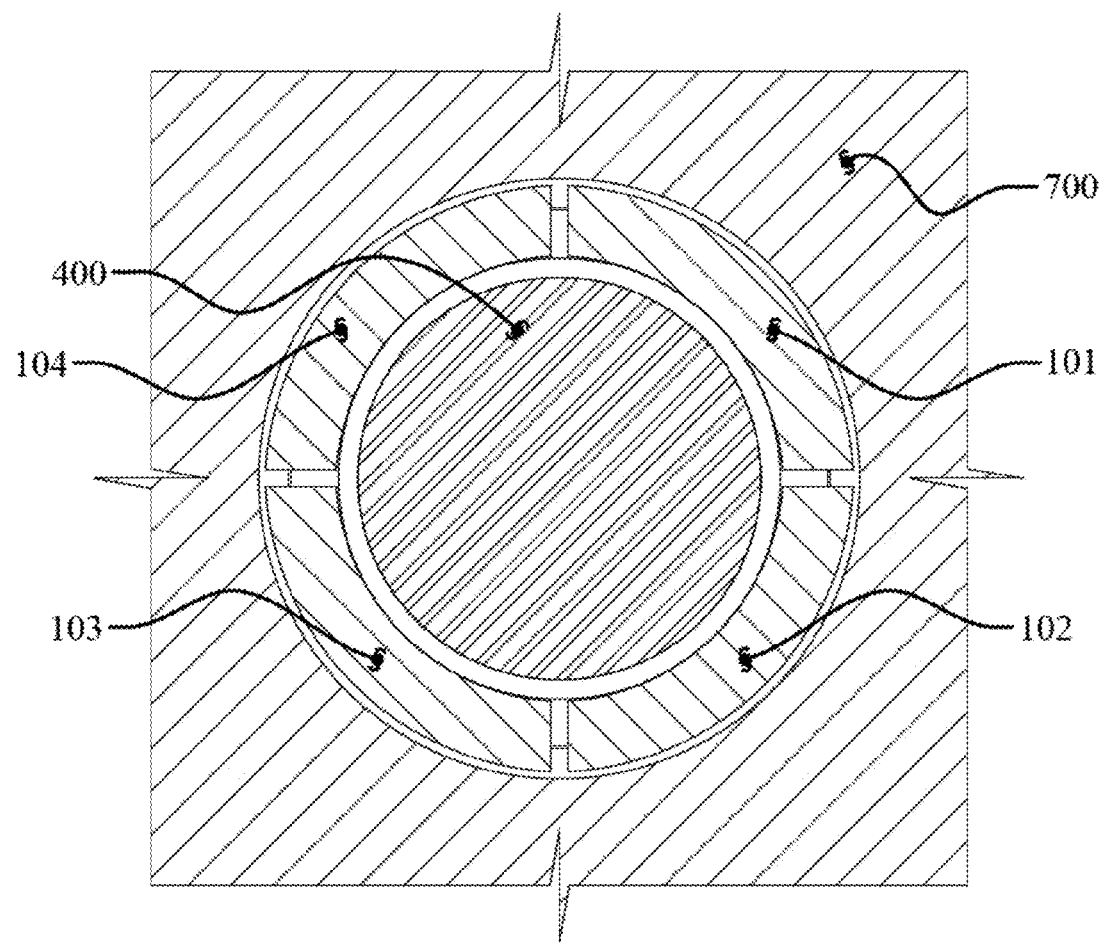
FIG. 58 is a cross-sectional view of an embodiment of a post-insertion partial-actuated blind fastener.
Figure 59:
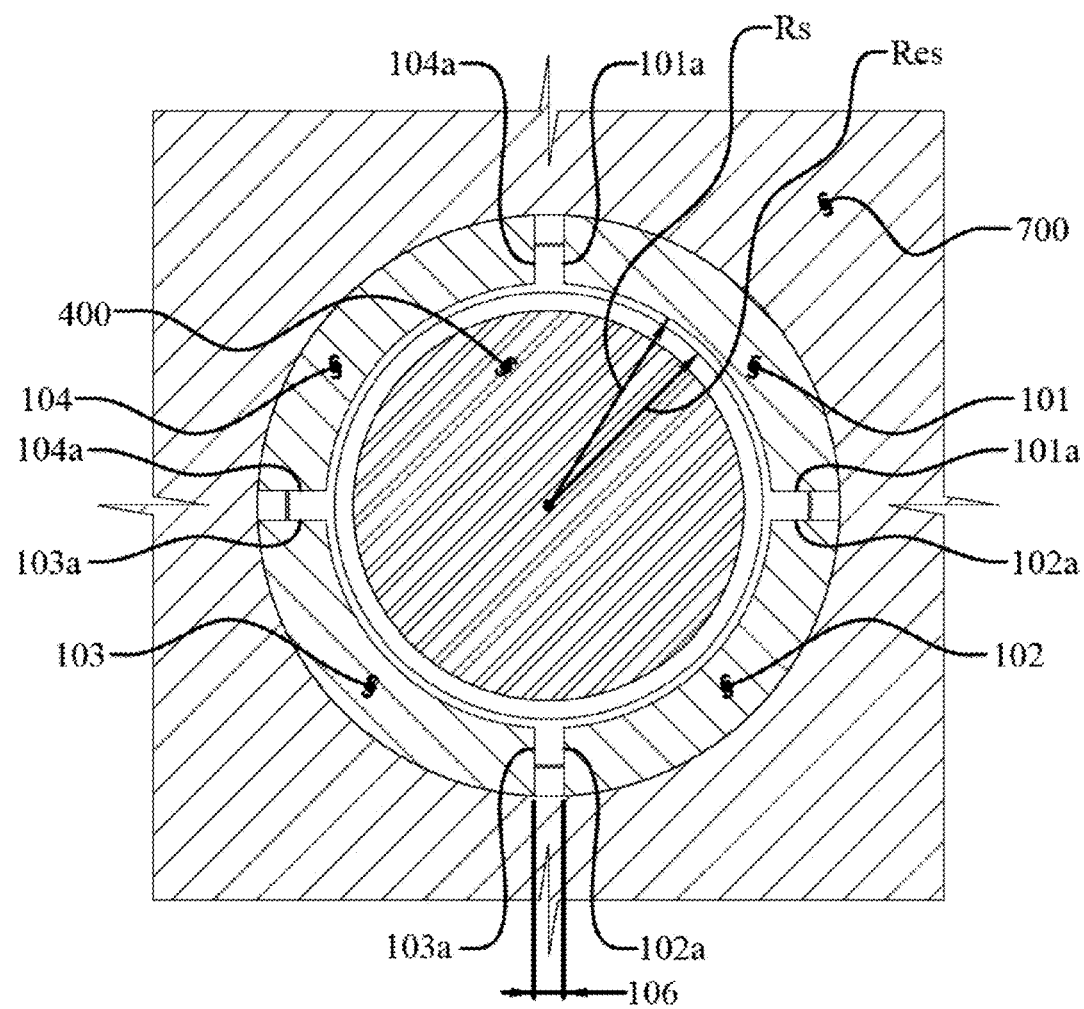
FIG. 59 is a cross-sectional view of an embodiment of a post-insertion fully-actuated blind fastener.

However, such deformation changes the loading profile of the blind fastener and may be undesirable in embodiments having greater sleeve thicknesses and material strength. Thus, in another embodiment, shown in the series of FIGS. 57-59, which is analogous to FIGS. 8, 12, and 16 of the previously discussed embodiment, wherein FIG. 57 is the cross-section in which the blind fastener has been inserted into the workpieces but has not yet been actuated, meaning the expansion section (440) of the expander (400) has not yet been drawn into the sleeve (100), as shown in FIG. 7; while FIG. 58 is the cross-section in which the blind fastener is partially-actuated, meaning that the expansion section (440) has entered the sleeve (100) and resulted in radial expansion of the sleeve (100); and FIG. 59 is the cross-section in which the blind fastener is fully-actuated, meaning that at least a portion of the locking section (430) has entered the sleeve (100) and resulted in further radial expansion of at least a portion of the sleeve throat (180). In this embodiment the sleeve (100) is designed to have a predetermined desired curvature when full-actuated without any bending or deformation of the sleeve (100), or individual sleeve sections (101, 102, 103, 104). Thus, as seen in FIG. 59, in one embodiment the interior surface of the sleeve (100), or one or more of the sleeve sections (101, 102, 103, 104), has a sleeve radius of curvature (Rs), and the exterior surface of the expansion section (440) has an expansion section radius of curvature (Res). In one particular embodiment each of the one or more sleeve sections has a sleeve radius of curvature (Rs) that is ±5% of the expansion section radius of curvature (Res) throughout at least 25% of the structural region length (174); while in a further embodiment majority of the sleeve sections have a sleeve radius of curvature (Rs) that is ±5% of the expansion section radius of curvature (Res) throughout at least 50% of the structural region length (174); while in an even further embodiment all of the sleeve sections have a sleeve radius of curvature (Rs) that is ±5% of the expansion section radius of curvature (Res) throughout at least 75% of the structural region length (174).

In a further embodiment each of the one or more sleeve sections has a sleeve radius of curvature (Rs) that is ±2.5% of the expansion section radius of curvature (Res) throughout at least 25% of the structural region length (174); while in a further embodiment majority of the sleeve sections have a sleeve radius of curvature (Rs) that is ±2.5% of the expansion section radius of curvature (Res) throughout at least 50% of the structural region length (174); while in an even further embodiment all of the sleeve sections have a sleeve radius of curvature (Rs) that is ±2.5% of the expansion section radius of curvature (Res) throughout at least 75% of the structural region length (174). In an even further embodiment each of the one or more sleeve sections has a sleeve radius of curvature (Rs) that is equal to the expansion section radius of curvature (Res) throughout at least 25% of the structural region length (174); while in a further embodiment majority of the sleeve sections have a sleeve radius of curvature (Rs) that is equal to the expansion section radius of curvature (Res) throughout at least 50% of the structural region length (174); while in an even further embodiment all of the sleeve sections have a sleeve radius of curvature (Rs) that is equal to the expansion section radius of curvature (Res) throughout at least 75% of the structural region length (174). Additionally, in the fully-actuated state of FIG. 59, with each sleeve section in contact with the expansion section (440), there is a section gap (106) between the adjacent sidewalls of the individual sleeve sections. Specifically, in the four sleeve section embodiment of FIG. 59, the first sleeve section (101) has two first sleeve section sidewalls (101*a*), likewise the second sleeve section (102) has two second sleeve section sidewalls (102*a*), the third sleeve section (103) has two third sleeve section sidewalls (103*a*), and the fourth sleeve section (104) has two fourth sleeve section sidewalls (104*a*). The section gap (106) is the minimum distance between the adjacent section sidewalls. In one particular embodiment effective loading and shear resistance is achieved when each section gap (106) is less than the maximum structural region wall thickness (172); while in a further embodiment each section gap (106) is less than 50% of the maximum structural region wall thickness (172); while in an even further embodiment each section gap (106) is 10-50% of the maximum structural region wall thickness (172); and in a still further embodiment each section gap (106) is 20-40% of the maximum structural region wall thickness (172). In one embodiment the maximum structural region wall thickness (172) is 2-10 mm, and each section gap (106) is less than 6 mm; while in a further embodiment the maximum structural region wall thickness (172) is 2-6 mm, and each section gap (106) is no more than 4 mm; while in a further embodiment the maximum structural region wall thickness (172) is 3-5 mm, and each section gap (106) is no more than 3 mm, and no more than 2 mm in an even further embodiment. The curvature and size of each sleeve section are designed to provide a compact size when in the un-actuated state, as seen in FIG. 57, to achieve the disclosed relationships that allows for reduced size opening in the workpieces while ensuring easy installation of the blind fastener. In another embodiment the sleeve length (155) is 30-120 mm, the structural region length (174) is 20-100 mm, the tensioning section length (454) is 60-145 mm, the expansion section length (448) is 25-75 mm, the tensioning section diameter (452) 12-30 mm, the expansion section diameter (442) is 15-35 mm, the locking section diameter (432) is 20-40 mm; while in a further embodiment the structural region length (174) is 25-60 mm, the tensioning section length (454) is 80-120 mm, the expansion section length (448) is 35-65 mm, the tensioning section diameter (452) 15-25 mm, the expansion section diameter (442) is 20-30 mm, the locking section diameter (432) is 25-35 mm.

In the multi-section sleeve (100) embodiment of FIGS. 6 & 8, the edges of each sleeve section (101, 102, 103, 104) are in contact with the edges of the adjacent sleeve sections in the initial state, and a small gap is illustrated between the sleeve inner diameter (150) and the expansion section diameter (442). Thus, in this embodiment the sleeve retainer (200) and/or shroud (300) is applying a radial compressive force on the sleeve sections (101, 102, 103, 104) and maintaining their edges in contact, however in this position there is no radial compressive force transferred from the sleeve (100) to the expander (400) because the edges of the sleeve sections (101, 102, 103, 104) contact each other. However, one skilled in the art will appreciate that the sleeve sections (101, 102, 103, 104) may be sized so that the edges do not contact one another when positioned about the expansion section (440), and therefore the radial compressive force may be transferred from the sleeve (100) to the expander (400).

In another embodiment the sleeve retainer (200) and/or the shroud (300) are adhesively attached to the sleeve (100) to further ensure the desired positioning, and in the case of the shroud (300), so that the expander (400) cannot simply slide out of the sleeve (100), even when oriented vertically without the nut (500) in place, thereby offering great safety advantages during installations in which the workpiece openings are high above the ground. Thus, in one embodiment the shroud (300) will retain and confine the expander (400) even when the shroud (300) is subjected to a force of at least 2 lbf along the longitudinal axis of the expander (400), which ensures that the shroud (300) will support the weight of the expander (400) when oriented vertically without the nut (500) in place. In an even further embodiment the shroud (300) will retain and confine the expander (400) even when the shroud (300) is subjected to a force of at least 5 lbf along the longitudinal axis of the expander (400), which ensures that the shroud (300) will retain the expander (400) without the nut (500) in place even if force is applied to the expander (400) during installation.

In a further embodiment of the blind fastener, the sleeve retainer (200) cooperates with the sleeve proximal end (120) and further includes a retainer flange (220) extending radially beyond the maximum sleeve outer diameter (140) in the initial state by a retainer flange overhang (222), as seen in FIGS. 19 and 20, and is at least 10% of the maximum sleeve outer diameter (140) in the initial state, and at least 25% of sleeve engagement section length (212). The retainer flange overhang (222) creates a weather-tight seal and provides stability to the sleeve (100). In another embodiment the retainer flange (220) has a longitudinal retainer flange thickness (224), as seen in FIG. 20, that is at least 25% of sleeve engagement section length (212) ensuring adequate material is present to create a good seal when exposed to the loads common with such blind fasteners. Additionally, the inner diameter of the retainer flange (220), through which the expander (400) passes, may be sized so that it is less than the sleeve inner diameter (150) in the initial state, as can be imagined in FIGS. 19 and 20, so that a portion of the retainer flange (220) engages the tensioning section (450). One benefit of this embodiment is that the retainer flange (220)

effectively grips the tensioning section (450) and keeps the sleeve (100) in place during transport and initial installation.

In another embodiment the retainer engagement region (160) has a retainer engagement region wall thickness (162), and the structural region (170) has a structural region wall thickness (172), as seen in FIG. 20. In this embodiment, the minimum retainer engagement region wall thickness (162) is at least 25% of the maximum structural region wall thickness (172) to ensure the retainer engagement region (160) does not compress longitudinally as the expansion section (440) of the expander (400) is drawn into the structural region (170) of the sleeve (100). In a further embodiment the minimum the retainer engagement region wall thickness (162) is 25-50% of the maximum structural region wall thickness (172). In yet another embodiment the retainer engagement region (160) is a circumferential recess in the exterior surface of the sleeve (100) thereby creating at least one retainer engagement region ledge (166) to shield at least one edge of the sleeve retainer (200). In yet another embodiment, the retainer engagement region ledge (166) has a ledge width that is 25-50% of the maximum structural region wall thickness (172).

In one embodiment the shroud (300), and/or the sleeve retainer (200), is waterproof. In an even further embodiment, either, or both, the shroud (300) and sleeve retainer (200) have at least a portion composed of thermoplastic polyurethane, natural rubber, urethane, neoprene, nitrile, butyl, EPDM, styrene butadiene, silicone, hypalon, or viton. In another embodiment at least a portion of the shroud (300), and/or the sleeve retainer (200), is composed of material having a tensile strength of at least 1000 psi, an elongation % of at least 150%, a tear-strength of at least 500-1000 pounds per linear inch, and a service temperature rating of at least 150 degrees Fahrenheit. In an even further embodiment at least a portion of the shroud (300), and/or the sleeve retainer (200), is composed of material having a tensile strength of at least 4000 psi and an elongation % of at least 300%. In an even further embodiment the sleeve retainer (200) and the shroud (300) may create a substantially sealed environment and retain a lubricant within the blind fastener, and therefore they may be composed of elastomeric materials that are resistant to breaking down in the presence of lubricants, such as thermoplastic polyurethane, nitrile rubber, silicone, fluoro-elastomers, EPDM, and perfluoro-elastomers.

The sleeve (100) may include a shroud engagement region (190) having a shroud engagement region length (192) that is at least 10% of the structural region length (174), and the shroud (300) cooperates with the shroud engagement region (190). In a further embodiment the shroud engagement region length (192) is 10-50% of the structural region length (174), while in an even further embodiment the shroud engagement region (190) is a circumferential recess in the exterior surface of the sleeve (100) thereby creating at least one shroud engagement region ledge (194) to shield at least one edge of the shroud (300). The shroud engagement region (190) has a shroud engagement region wall thickness (196), and the structural region (170) has a structural region wall thickness (172), whereby in one embodiment the minimum shroud engagement region wall thickness (196) is at least 25% of the maximum structural region wall thickness (172) to ensure the shroud engagement region (190) does not compress longitudinally as the expander (400) is drawn into the sleeve (100). Even further, the minimum shroud engagement region wall thickness (196) is 25-50% of the maximum structural region wall thickness (172) provides the necessary strength while also facilitating bending of the sleeve (100) for locking. These relationships provide a shroud (300) to sleeve (100) connection that is strong enough to withstand the forces encountered as the sleeve (100) deforms to a locked state.

In the embodiments illustrated in FIGS. 3-5, 7, 9, 11, 13 and 15 the shroud (300) encloses the sleeve distal end (130) and the expander distal end (420) in the initial state, the expanded state, and the locked state. Therefore in these embodiments the shroud (300) must be constructed to accommodate the change in shape of the sleeve (100) associated with the different states. In some embodiments the shroud (300) is elastic and it stretches to continue to cover the edges of the sleeve (100) even as the edges are flared outward to the locked state, thereby ensuring any apparatus on the blind side of the workpieces is not exposed to sharp metallic edges of the sleeve (100). In one particular embodiment the shroud proximal end (310) is attached to the sleeve (100) and the shroud distal end (320) totally encloses and seals the sleeve distal end (130). Alternatively, the shroud (300) does not have to incorporate elastic elements. Rather the shroud (300) may be configured so that there is space between the shroud distal end (320) and the expander distal end (420). The space accommodates the changes in shape of the sleeve (100). One embodiment ensures that the extra space in the shroud (300) does not result in a baggy shroud (300) that may be a hindrance as the blind fastener is fed into a blind hole. In fact, in one such embodiment the extra shroud (300) length may be folded and adhered internal to the shroud (300) so that it is not presented until the sleeve (100) deforms into the locked state.

The blind fastener is designed for ease of installation in a hole that is not much larger than the blind fastener. Therefore, in one embodiment the initial state the exterior surface of the shroud (300) does not extend radially beyond the maximum sleeve outer diameter (140).

Regardless of whether the shroud (300) is elastic or not, in one embodiment the shroud thickness (330) is no greater than the thickness of the sleeve engagement section (210), thereby ensuring the shroud (300) does not extend radially outward beyond the maximum sleeve outer diameter (140) and reducing the likelihood of snagging the shroud (300) as the blind fastener is fed through the first and second workpiece openings (722, 822).

In yet another embodiment the nut (500) cannot be removed from the expander (400). This may be accomplished in a number of methods including, but not limited to, striking the expander proximal end (410) after the nut (500) is in place to slightly enlarge the proximal end so that the nut (500) cannot pass over the enlarged end, placing a spot weld adjacent the expander proximal end (410) after the nut (500) is in place so that the nut (500) cannot pass over the weld material, and/or attaching a blocking member to the expander proximal end (410) after the nut (500) is in place so that the nut (500) cannot pass over the blocking member.

Some embodiments incorporate a washer system (600), which may consist of one or more washers. One such embodiment is a hardened washer and a self-indicating direct tension indicator. The illustrated embodiments show a three washer system (600) having a self-indicating direct tension indicator between two hardened washers.

In one embodiment the sleeve (100) has an ultimate tensile strength that is within ±50% of the ultimate tensile strength of the expander (400), while in a further embodiment the sleeve (100) has an ultimate tensile strength that is within ±25% of the ultimate tensile strength of the expander (400). Still further, in another embodiment the ultimate tensile strength of at least one of the expander (400) or sleeve (100) is at least 800 MPa, while in a further embodiment the ultimate tensile strength at least one of the expander (400) and the sleeve (100) is at least 100 MPa less than the other component. In a further embodiment the expander (400) has an ultimate tensile strength that is at least 25% greater than the ultimate tensile strength of the sleeve (100); while in a further embodiment it is at least 35% greater. In one embodiment the ultimate tensile strength of the expander (400) is at least 800 MPa, while the ultimate tensile strength of the sleeve (100) is less than 650 MPa; while in yet another embodiment the ultimate tensile strength of the expander (400) is at least 1000 MPa and the ultimate tensile strength of the sleeve (100) is less than 550 MPa. Still further, in another embodiment the Brinell Hardness (Tungsten Carbide Ball 3000 KG) of the expander (400) is greater than that of the sleeve (100); in fact, in a further embodiment the Brinell Hardness (Tungsten Carbide Ball 3000 KG) of the expander (400) is at least 10% greater than that of the sleeve (100), and, in another embodiment, is at least 25% greater than that of the sleeve (100). In yet another embodiment the percent elongation to break of the expander (400) is at least 30% less than that of the sleeve (100); and in an even further embodiment the percent elongation to break of the expander (400) is at least 50% less than that of the sleeve (100) while still having a elongation to break of the expander (400) that is at least 8 percent. These unique relationships between the properties of the sleeve (100) and the expander (400) facilitate the preferred deformation and loading of the components to achieve the required tensioning of the expander (400) in structural tower installations where an inspector must verify that the expander (400) has been tensioned to at least 70 kips.

Figure 52:
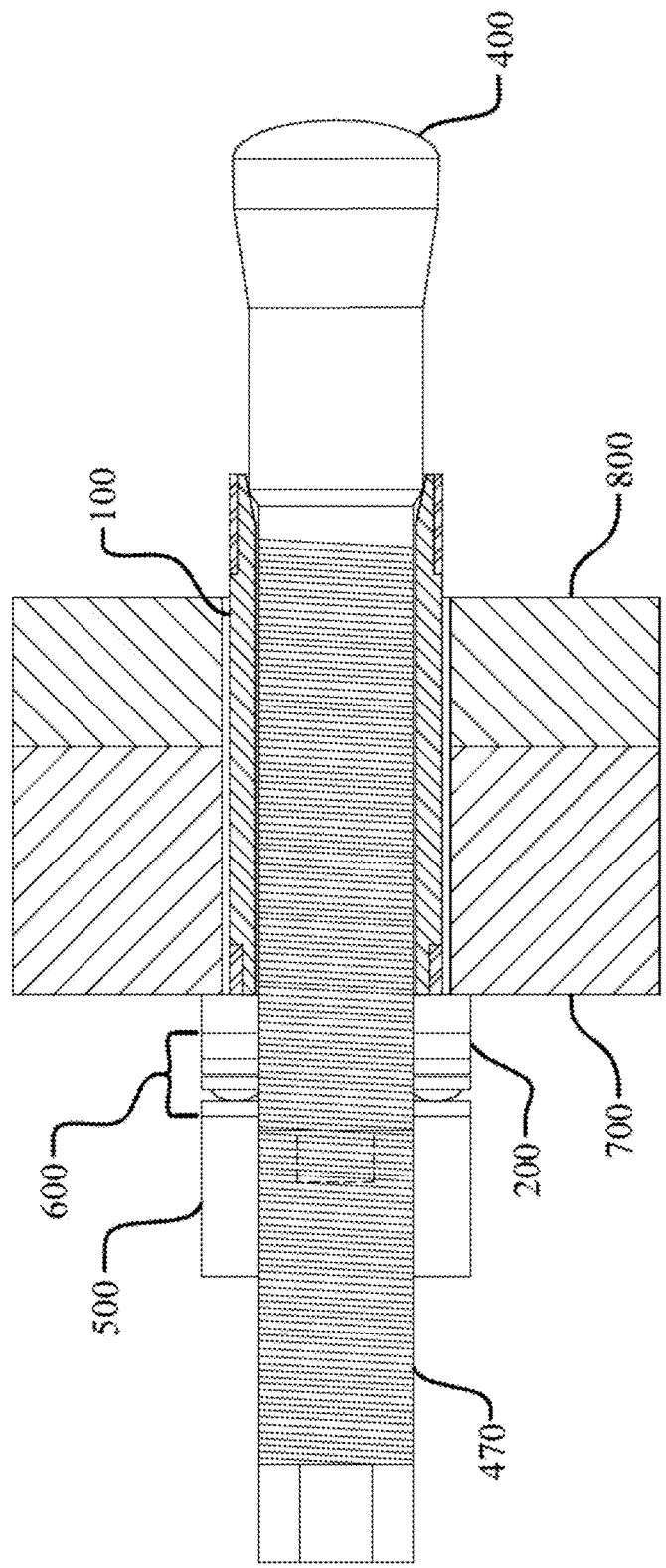
FIG. 52 is a partial cross-sectional view of an embodiment of a post-insertion un-actuated blind fastener.
Figure 53:
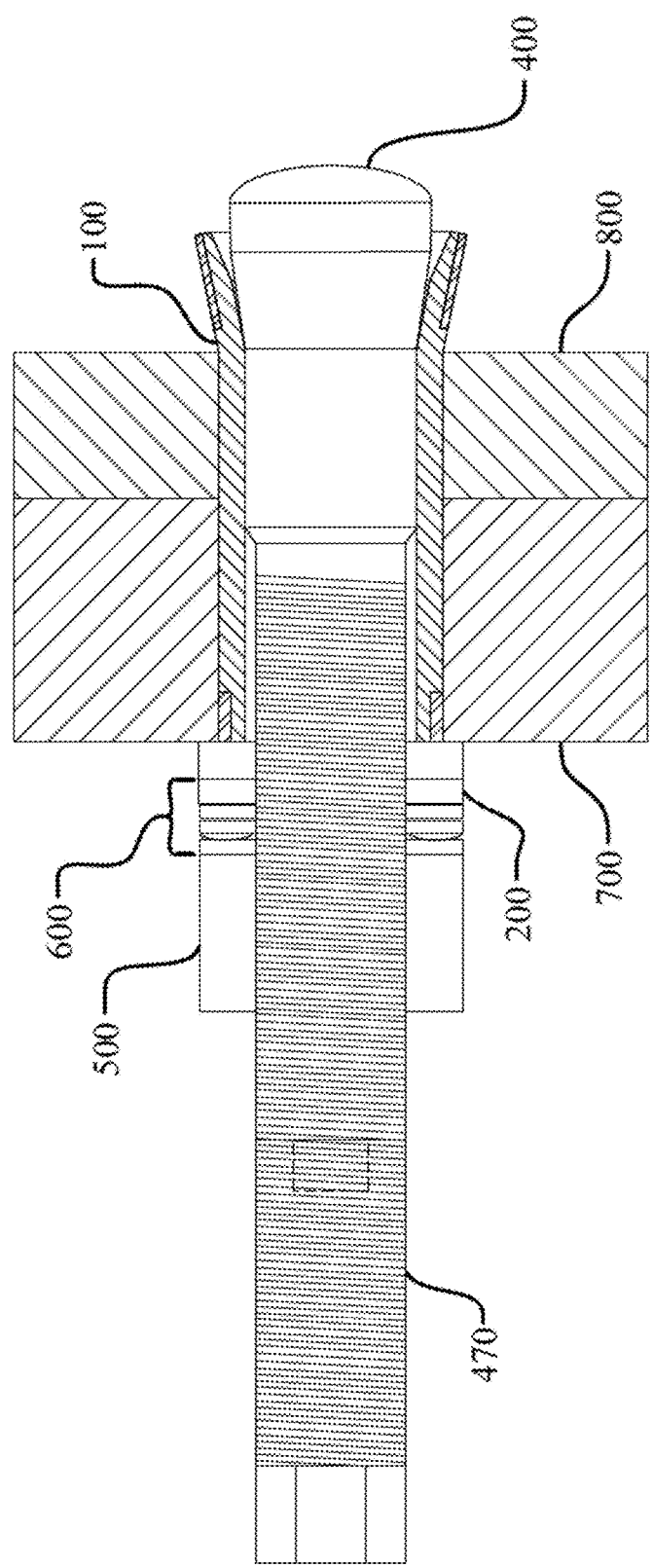
FIG. 53 is a partial cross-sectional view of an embodiment of a post-insertion fully-actuated blind fastener.
Figure 54:
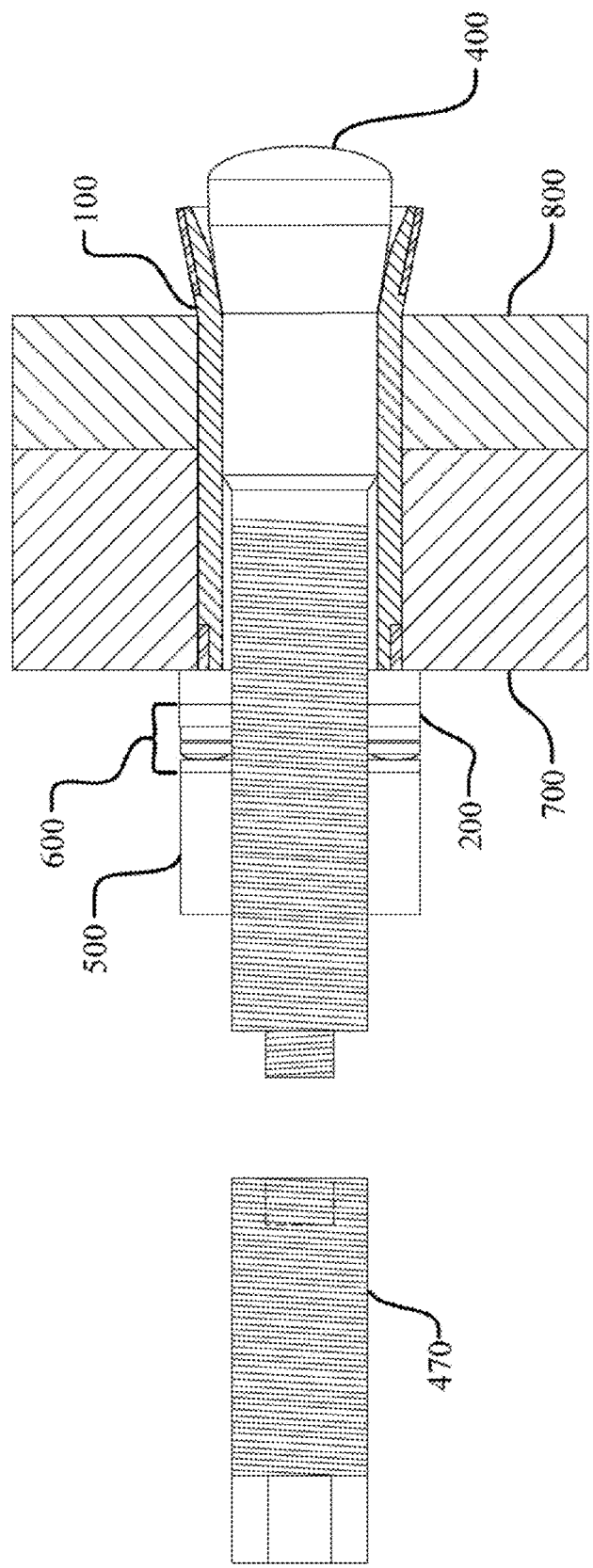
FIG. 54 is a partial cross-sectional view of an embodiment of a post-insertion fully-actuated blind fastener.

As seen in FIGS. 52-54, the expander (400) may have a removable expander portion (470). In one embodiment the removable expander portion (470) is a portion of the tensioning section (450). In one particular embodiment a length of the removable expander portion (470) is at least 25% of the tensioning section length (454), while in a further embodiment the length of the removable expander portion (470) is at least 40% of the tensioning section length (454), and in a further embodiment the length of the removable expander portion (470) is at least 50% of the tensioning section length (454). The removable expander portion (470) may be joined to the expander (400) in any number of ways, however the illustrated embodiment incorporates cooperating male and female sections having threads opposite of those on the exterior surface of the tensioning section (450), which when joined cooperates with the bolt (500). The removable expander portion (470) may be removed after installation to reduce the amount of the expander (400) that extends beyond the bolt (500). In one embodiment the removable expander portion (470) is composed of a different material than the rest of the expander (400). In fact in one embodiment the removable expander portion (470) has an ultimate tensile strength that is at least 100 MPa less than that of the expansion section (440); and in a further embodiment the removable expander portion (470) has an ultimate tensile strength that is at least 200 MPa less than that of the expansion section (440). The removable expander portion (470) may be composed of a material having a density that is at least 25% less than the density of the expansion section (440); while in a further embodiment the density of the removable expander portion (470) is at least 50% less that the density of the expansion section (440). In yet a further embodiment the removable expander portion (470) is composed of non-metallic material, which in one embodiment is a polymeric material. For example, the removable expander portion (470) may be composed of magnesium alloys, aluminum/aluminum alloys, titanium alloys, carbon steels, stainless steels, PH (precipitation-hardenable) alloys, copper alloys, and nickel alloys, just to name a few. Non-metallic embodiments may be composed of materials such as a polycaprolactam, a polyhexamethylene adipinamide, or a copolymer of hexamethylene diamine adipic acid and caprolactam, however other embodiments may include polypropylene (PP), nylon 6 (polyamide 6), polybutylene terephthalates (PBT), thermoplastic polyurethane (TPU), PC/ABS alloy, PPS, PEEK, and semi-crystalline engineering resin systems, some of which may be fiber reinforced.

Numerous alterations, modifications, and variations of the embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims.

We claim:

1. A blind fastener, comprising:
    a sleeve (100) having a sleeve proximal end (120), a sleeve distal end (130), a sleeve length (155), a sleeve outer diameter (140), a sleeve inner diameter (150) and a structural region (170) having a structural region length (174);
    an expander (400) having an expander proximal end (410), an expander distal end (420), a tensioning section (450), a locking section (430), and an expansion section (440) between the tensioning section (450) and the locking section (430), wherein the expansion section (440) has an expansion section diameter (442), an expansion section length (448) that is at least 25% of the structural region length (174), and an expansion section transition (444), and a portion of the sleeve (100) has the sleeve inner diameter (150), in an initial state, at least 3% less than the maximum expansion section diameter (442); and
    a nut (500);
    wherein a portion of the expander (400) passes through the sleeve (100) to cooperate with the nut (500) so that relative rotation of the expander (400) and nut (500):
    (i) draws the expander distal end (420) toward the sleeve proximal end (120);
    (ii) thereby drawing a portion of the expansion section (440) of the expander (400) into the structural region (170) of the sleeve (100) and expanding at least a portion of the structural region (170) of the sleeve (100) from the initial state to an expanded state; and
    (iii) thereby drawing a portion of the locking section (430) past the sleeve distal end (130) toward the sleeve proximal end (120) and deforming at least a portion of the sleeve distal end (130) to a locked state.

2. The blind fastener of claim 1, wherein the locking section (430) has a locking section diameter (432), and the tensioning section (450) has a tensioning section diameter (452), wherein the expansion section diameter (442) is at least 7.5% greater than the tensioning section diameter (452), and the locking section diameter (432) is at least 15% greater than the expansion section diameter (442), and wherein the structural region (170) has a structural region wall thickness (172) that is less than a difference between the locking section diameter (432) and the tensioning section diameter (452).

3. The blind fastener of claim 2, wherein the expansion section diameter (442) is no more than 15% greater than the tensioning section diameter (452).

4. The blind fastener of claim 3, wherein the locking section diameter (432) is no more than 30% greater than the expansion section diameter (442).

5. The blind fastener of claim 1, wherein the locking section (430) has a locking section transition length (436) and a locking section transition angle (435), the expansion section (440) has an expansion section transition length (446) and an expansion section transition angle (445), wherein the locking section transition length (436) is at least twice the expansion section transition length (446).

6. The blind fastener of claim 5, wherein the expansion section length (448) is 25-75% of the structural region length (174).

7. The blind fastener of claim 1, wherein the sleeve (100) includes at least two distinct sections (101, 102).

8. A blind fastener, comprising:
a sleeve (100) having a sleeve proximal end (120), a sleeve distal end (130), a sleeve length (155), a sleeve outer diameter (140), a sleeve inner diameter (150) and a structural region (170) having a structural region length (174);
an expander (400) having an expander proximal end (410), an expander distal end (420), a tensioning section (450), a locking section (430), and an expansion section (440) between the tensioning section (450) and the locking section (430), wherein the expansion section (440) has an expansion section diameter (442) and an expansion section transition (444), and a portion of the sleeve (100) has the sleeve inner diameter (150), in an initial state, less than the maximum expansion section diameter (442), wherein the locking section (430) has a locking section transition length (436) and a locking section transition angle (435), the expansion section (440) has an expansion section transition length (446) and an expansion section transition angle (445), wherein the locking section transition length (436) is at least twice the expansion section transition length (446), and the expansion section length (448) is 25-75% of the structural region length (174); and
a nut (500);
wherein a portion of the expander (400) passes through the sleeve (100) to cooperate with the nut (500) so that relative rotation of the expander (400) and nut (500):
(i) draws the expander distal end (420) toward the sleeve proximal end (120);
(ii) thereby drawing a portion of the expansion section (440) of the expander (400) into the structural region (170) of the sleeve (100) and expanding at least a portion of the structural region (170) of the sleeve (100) from the initial state to an expanded state;
(iii) thereby drawing a portion of the locking section (430) past the sleeve distal end (130) toward the sleeve proximal end (120) and deforming at least a portion of the sleeve distal end (130) to a locked state; and
wherein the sleeve distal end (130) has a sleeve throat (180) having a throat length (182) and a throat angle (184), wherein the throat angle (184) is 5-50 degrees, and the throat angle (184) is less than the expansion section transition angle (445).

9. The blind fastener of claim 8, wherein the locking section transition angle (435) is less than 50% of the expansion section transition angle (445).

10. The blind fastener of claim 8, wherein the throat angle (184) is greater than locking section transition angle (435).

11. The blind fastener of claim 10, wherein the throat angle (184) is at least 5 degrees less than the expansion section transition angle (445), and the throat angle (184) is no more than 15 degrees greater than locking section transition angle (435).

12. The blind fastener of claim 8, wherein the throat length (182) is greater than the expansion section transition length (446), and the locking section transition length (436) is greater than the expansion section transition length (446).

13. A blind fastener, comprising:
a sleeve (100) having a sleeve proximal end (120), a sleeve distal end (130), a sleeve length (155), a sleeve outer diameter (140), a sleeve inner diameter (150), a structural region (170), and at least two distinct sections (101, 102);
an expander (400) having an expander proximal end (410), an expander distal end (420), a tensioning section (450), a locking section (430), and an expansion section (440) between the tensioning section (450) and the locking section (430), wherein the expansion section (440) has an expansion section diameter (442) and an expansion section transition (444), and a portion of the sleeve (100) has the sleeve inner diameter (150), in an initial state, less than the maximum expansion section diameter (442); and
a nut (500);
wherein a portion of the expander (400) passes through the sleeve (100) to cooperate with the nut (500) so that relative rotation of the expander (400) and nut (500):
(i) draws the expander distal end (420) toward the sleeve proximal end (120);
(ii) thereby drawing a portion of the expansion section (440) of the expander (400) into the structural region (170) of the sleeve (100) and expanding at least a portion of the structural region (170) of the sleeve (100) from the initial state to an expanded state;
(iii) thereby drawing a portion of the locking section (430) past the sleeve distal end (130) toward the sleeve proximal end (120) and deforming at least a portion of the sleeve distal end (130) to a locked state; and
a sleeve retainer (200) having a sleeve engagement section (210) that cooperates with a retainer engagement region (160) in the sleeve (100) to maintain the at least two distinct sections (101, 102) in a predetermined relationship.

14. The blind fastener of claim 13, wherein at least a portion of the sleeve retainer (200) is elastic and the sleeve retainer (200) exerts a compressive force on the sleeve (100).

15. The blind fastener of claim 13, wherein the sleeve retainer (200) is contractible when activated.

16. The blind fastener of claim 14, wherein a portion of the sleeve retainer (200) is in tension when cooperating with the retainer engagement region (160) and the sleeve (100) is located around the tensioning section (450).

17. The blind fastener of claim 13, wherein the sleeve engagement section (210) has a sleeve engagement section length (212), a sleeve engagement section inner diameter (214), and a sleeve engagement section outer diameter (216), the sleeve engagement section (210) wraps circumferentially around the sleeve (100), the structural region (170) of the sleeve (100) has a structural region length (174), the retainer engagement region (160) has a retainer engagement region length (164), and both the retainer engagement region length (164) and the sleeve engagement section length (212) are at least 10% of the structural region length (174).

18. The blind fastener of claim 17, wherein the sleeve retainer (200) extends beyond the sleeve distal end (130) forming a sleeve retainer protrusion (230) having a sleeve retainer protrusion length (232) and a sleeve retainer protrusion width (234), wherein the sleeve retainer protrusion length (232) is at least 5% of the retainer engagement region length (164).

19. The blind fastener of claim 13, wherein the retainer engagement region (160) has a retainer engagement region wall thickness (162), and the structural region (170) has a structural region wall thickness (172), whereby the minimum retainer engagement region wall thickness (162) is at least 25% of the maximum structural region wall thickness (172) to ensure the retainer engagement region (160) does not compress longitudinally as the expansion section (440) of the expander (400) is drawn into the structural region (170) of the sleeve (100).

20. The blind fastener of claim 19, wherein the retainer engagement region (160) is a circumferential recess in the exterior surface of the sleeve (100) thereby creating at least one retainer engagement region ledge (166) to shield at least one edge of the sleeve retainer (200).

\* \* \* \* \*